United States Patent [19]

Boney et al.

[11] 4,334,268
[45] Jun. 8, 1982

[54] MICROCOMPUTER WITH BRANCH ON BIT SET/CLEAR INSTRUCTIONS

[75] Inventors: Joel F. Boney; Edward J. Rupp, II, both of Austin; James S. Thomas, Manor, all of Tex.

[73] Assignee: Motorola, Inc., Schaumburg, Ill.

[21] Appl. No.: 35,138

[22] Filed: May 1, 1979

[51] Int. Cl.³ .............................................. G06F 9/32
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,990,052 | 11/1976 | Gruner | 364/200 |
| 4,053,944 | 10/1977 | Dixon | 364/200 |
| 4,107,781 | 8/1978 | Barrett et al. | 364/200 |
| 4,124,893 | 11/1978 | Joyce et al. | 364/200 |

*Primary Examiner*—Gareth D. Shaw
*Assistant Examiner*—Thomas M. Heckler
*Attorney, Agent, or Firm*—Anthony J. Sarli, Jr.; Vince Ingrassia; Jeffrey Van Myers

[57] ABSTRACT

A single-chip microcomputer comprises a central processor unit (100), a random access memory (110), a read only memory (120), internal timing circuitry including a timer counter (131), and three I/O data ports (140, 150, and 160). Included within the instruction set of the microcomputer are a branch on bit set instruction and a branch on bit clear instruction. The branch on bit set instruction is a three-byte instruction in which the first byte represents the op code including a designation of a particular bit to be examined, the second byte represents the address of a memory location in which the designated bit is to be examined, and the third byte represents an offset which when combined with the contents of the program counter designates a memory location to which a branch is to be taken if the designated bit is in fact set. For the branch on bit clear instruction, a branch is performed when the particular bit examined is determined not to be set. The branch on bit set and branch on bit clear instructions facilitate serial I/O operations by the microcomputer.

14 Claims, 83 Drawing Figures

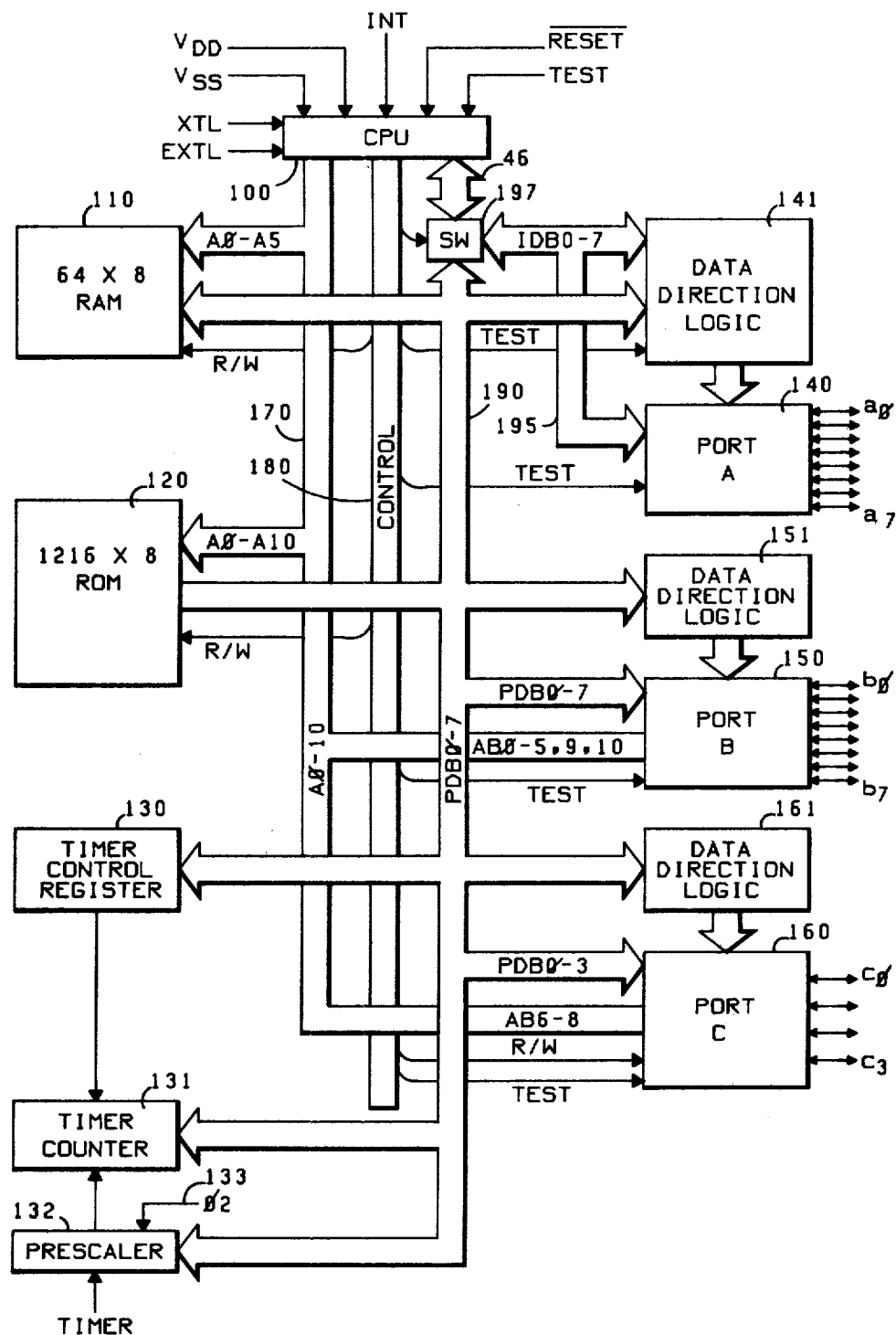

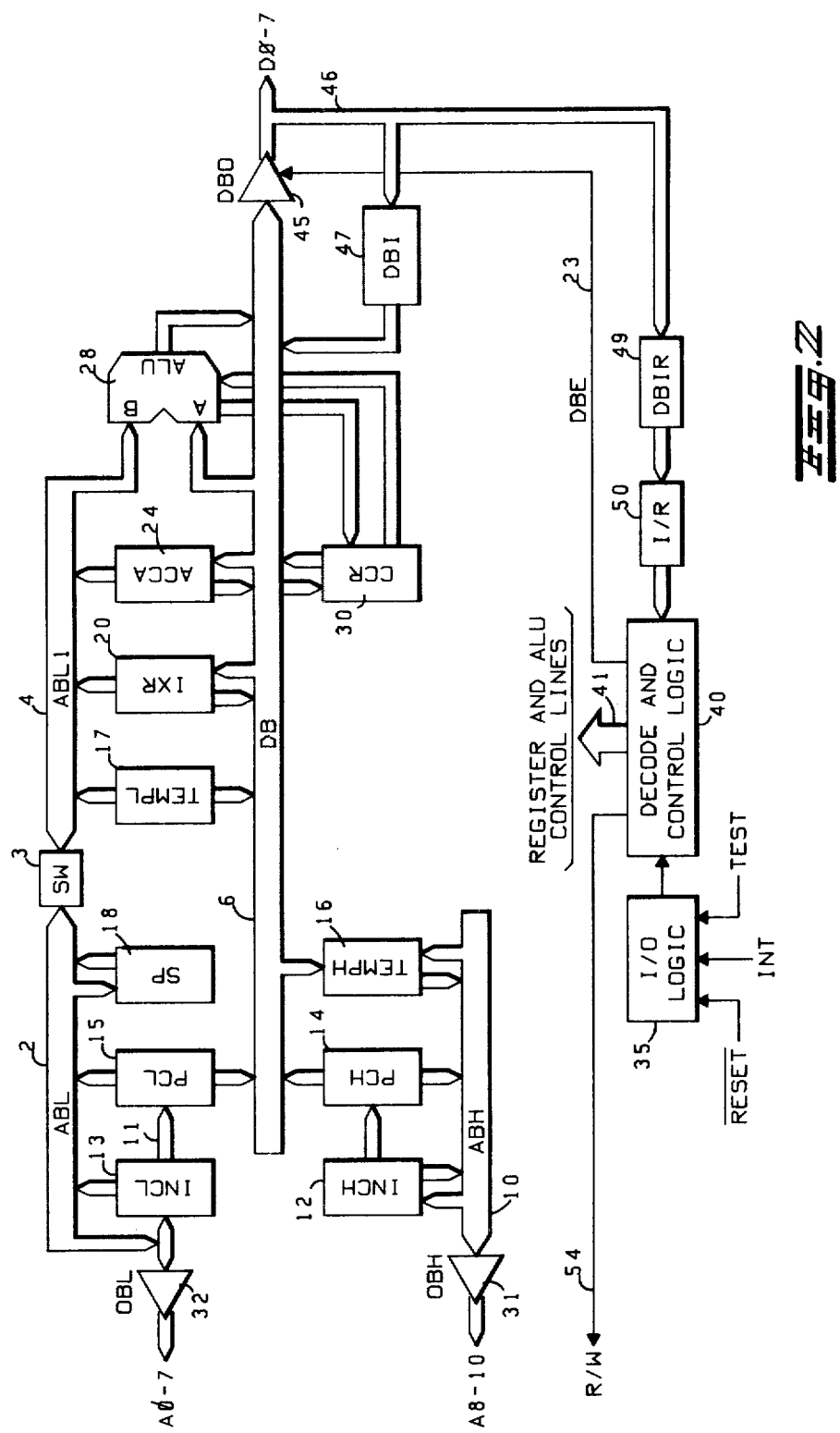

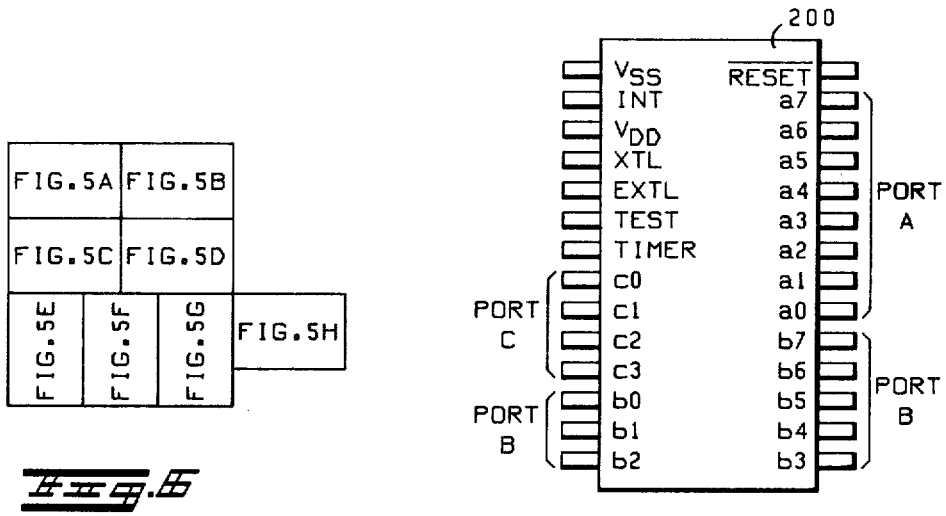

Fig. 3

| | | TEST AND BRANCH | SET OR CLR | | | | | | | OP CODE MAP | | | | | | | |
|---|---|---|---|---|---|---|---|---|---|---|---|---|---|---|---|---|---|
| | | BIT DIRECT | | BRA | DIR | ACC | IXR | IND 1 BY | IND NOBY | INH | INH | IMM | DIR | EXT | IND 2 BY | IND 1 BY | IND NOBY |
| | HI | 0000 | 0001 | 0010 | 0011 | 0100 | 0101 | 0110 | 0111 | 1000 | 1001 | 1010 | 1011 | 1100 | 1101 | 1110 | 1111 |
| LO | | 0 | 1 | 2 | 3 | 4 | 5 | 6 | 7 | 8 | 9 | A | B | C | D | E | F |
| 0000 | 0 | BRSET | BSET | BRA | NEG | | | | | RTI | | | | SUB | | | |
| 0001 | 1 | BRCLR | BCLR | | | | | | | RTS | | | | CMP | | | |
| 0010 | 2 | BRSET | BSET | BHI | | | | | | | | | | SBC | | | |
| 0011 | 3 | BRCLR | BCLR | BLS | COM | | | | | SWI | | | | CPX | | | |
| 0100 | 4 | BRSET | BSET | BCC | LSR | | | | | | | | | AND | | | |
| 0101 | 5 | BRCLR | BCLR | BCS | | | | | | | | | | BIT | | | |
| 0110 | 6 | BRSET | BSET | BNE | ROR | | | | | | | | | LDA | | | |
| 0111 | 7 | BRCLR | BCLR | BEQ | ASR | | | | | TAX | | | | STA | | | |
| 1000 | 8 | BRSET | BSET | BHCC | LSL | | | | | CLC | | | | EOR | | | |
| 1001 | 9 | BRCLR | BCLR | BHCS | ROL | | | | | SEC | | | | ADC | | | |
| 1010 | A | BRSET | BSET | BPL | DEC | | | | | CLI | | | | OR | | | |
| 1011 | B | BRCLR | BCLR | BMI | | | | | | SEI | | | | ADD | | | |
| 1100 | C | BRSET | BSET | BMC | INC | | | | | RSP | | | | JMP | | | |
| 1101 | D | BRCLR | BCLR | BMS | TST | | | | | NOP | BSR | | | JSR | | | |
| 1110 | E | BRSET | BSET | BIL | | | | | | | | | | LDX | | | |
| 1111 | F | BRCLR | BCLR | BIH | CLR | | | | | TXA | | | | STX | | | |

Fig. 4

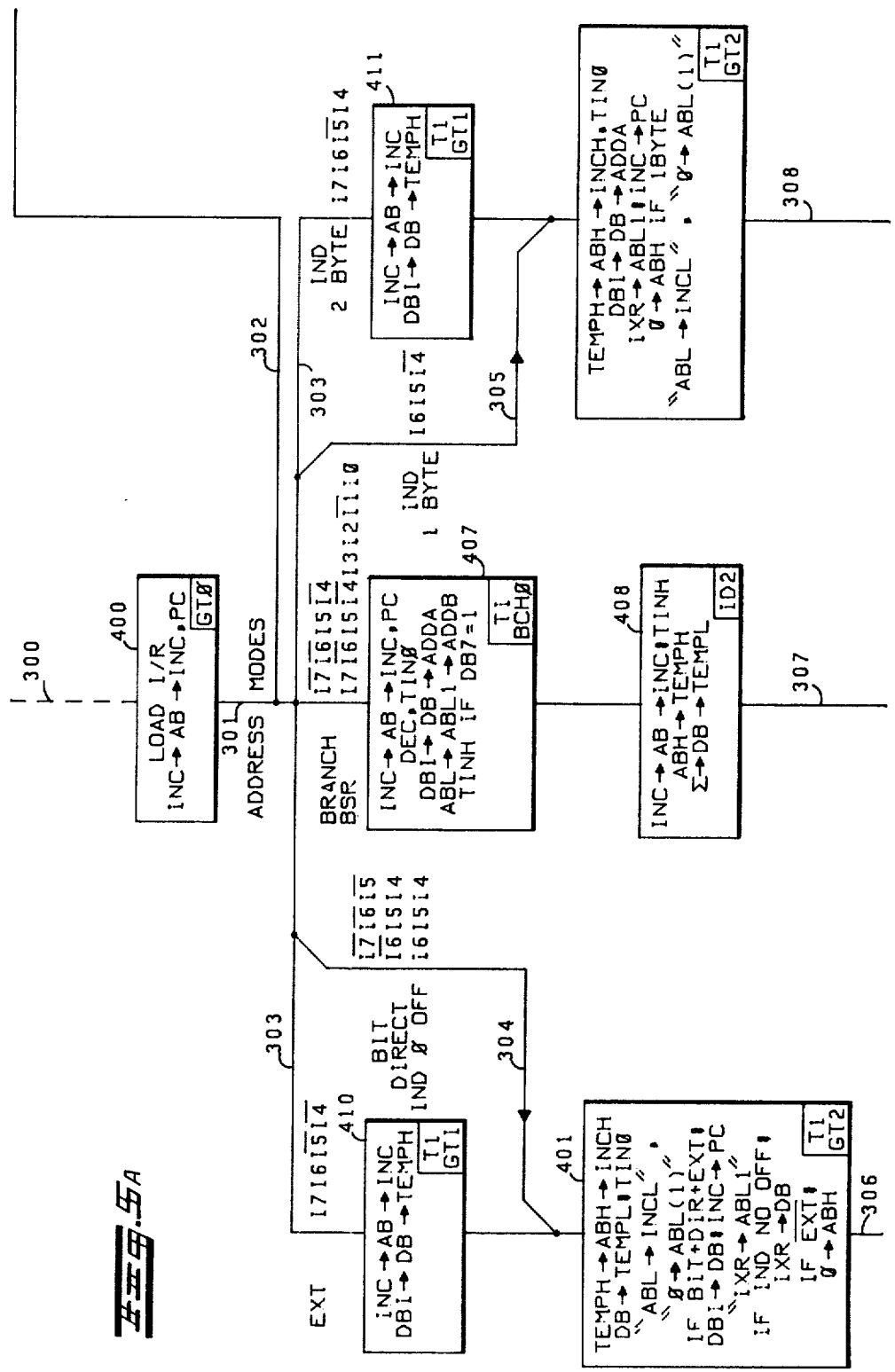

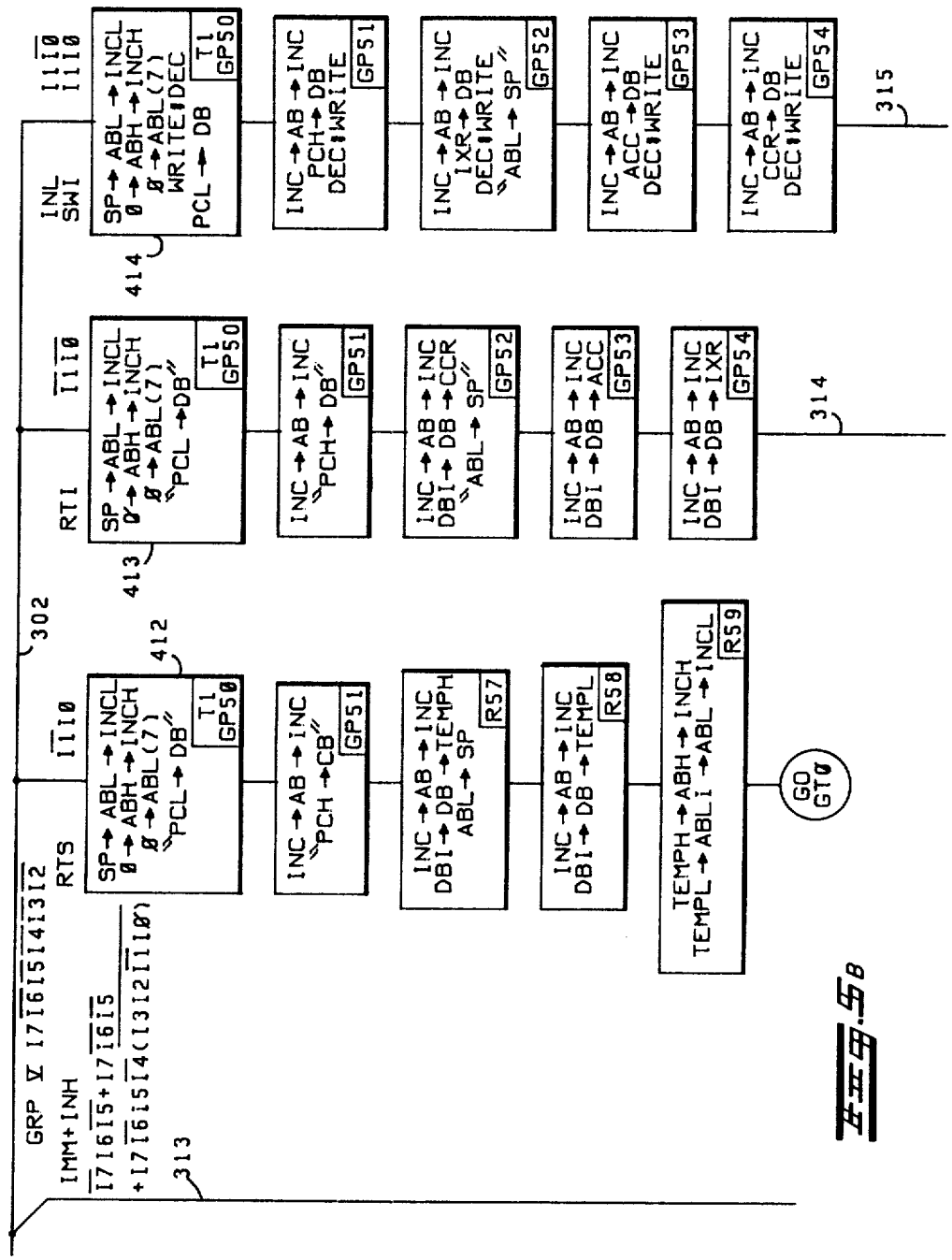

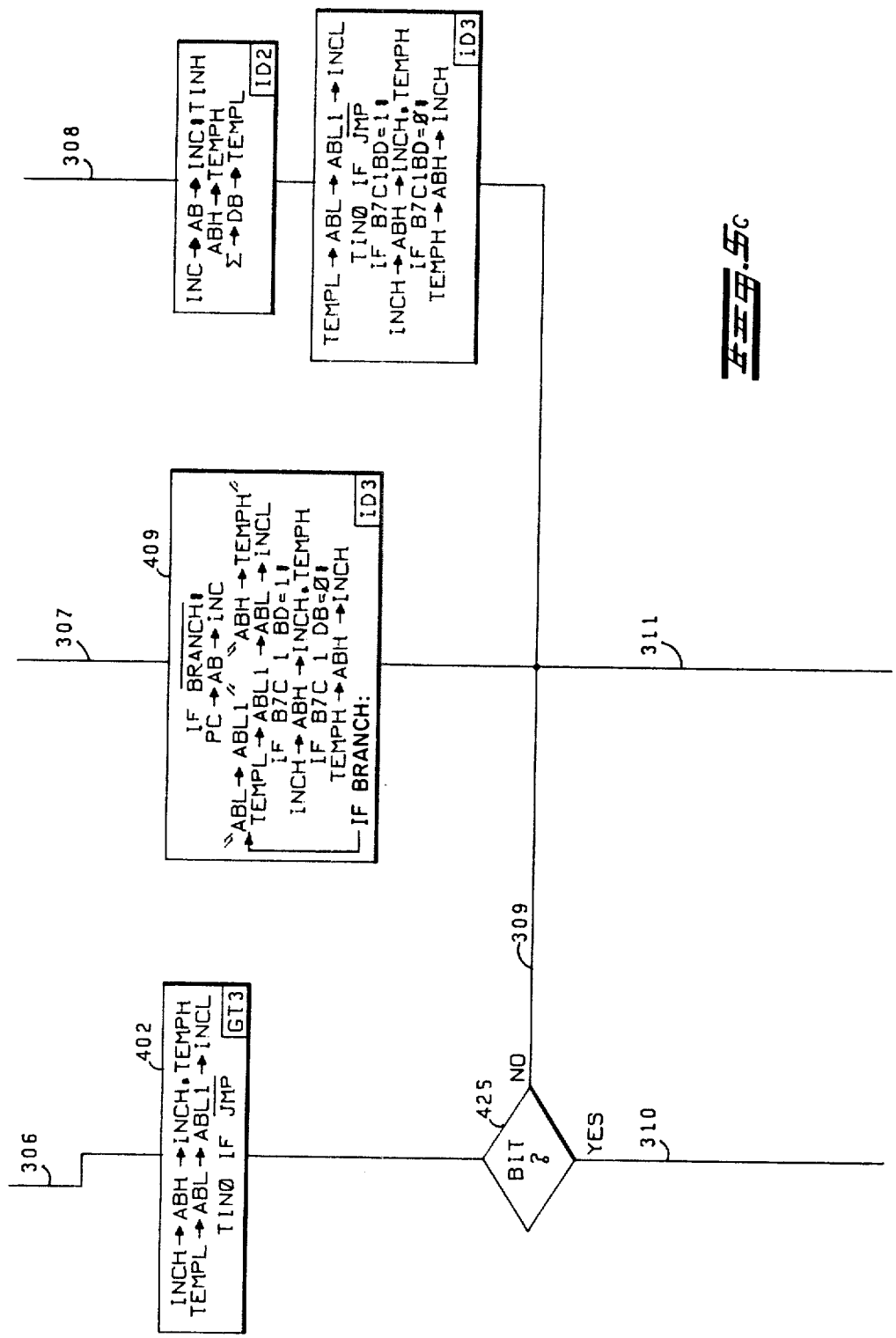

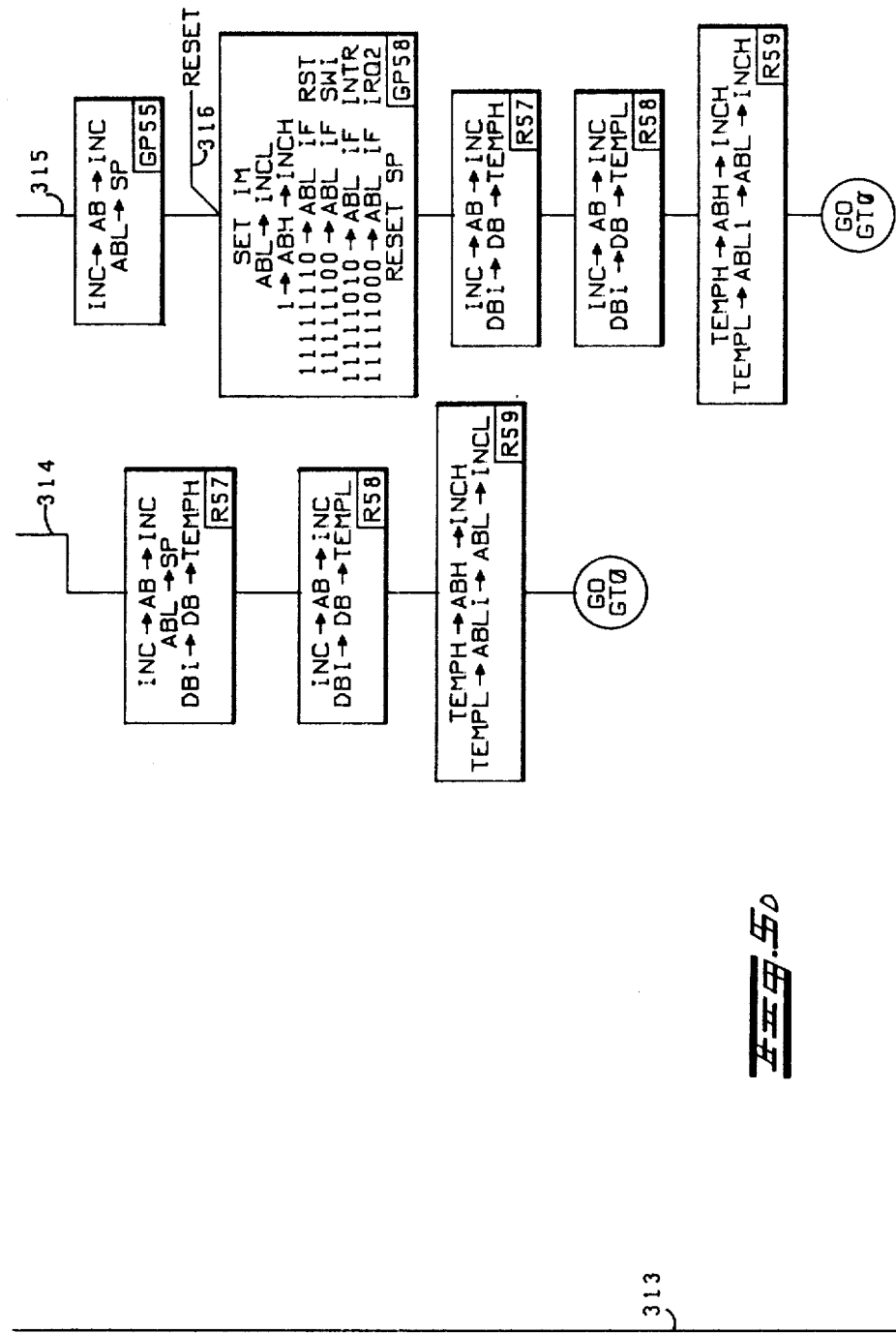

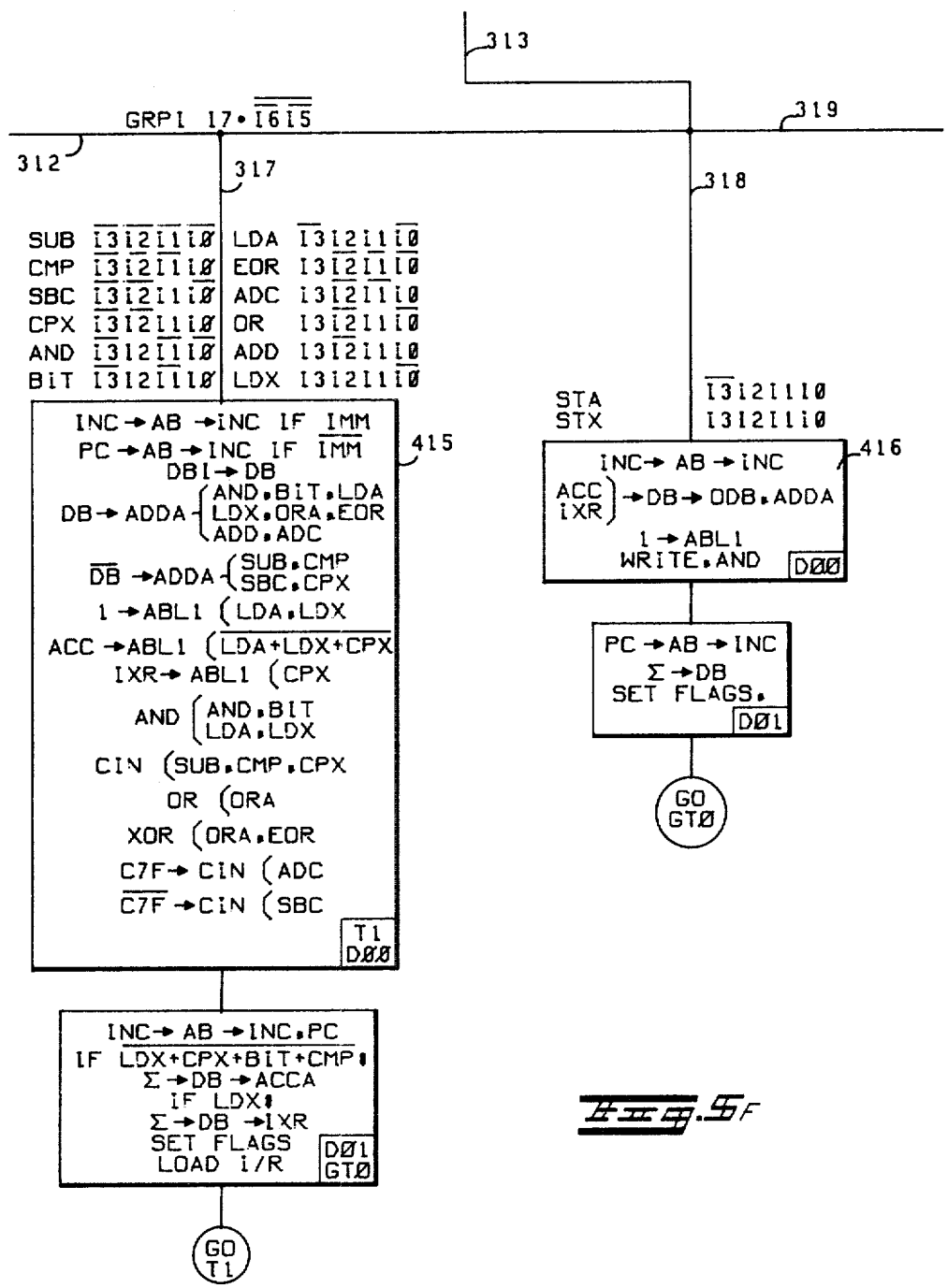

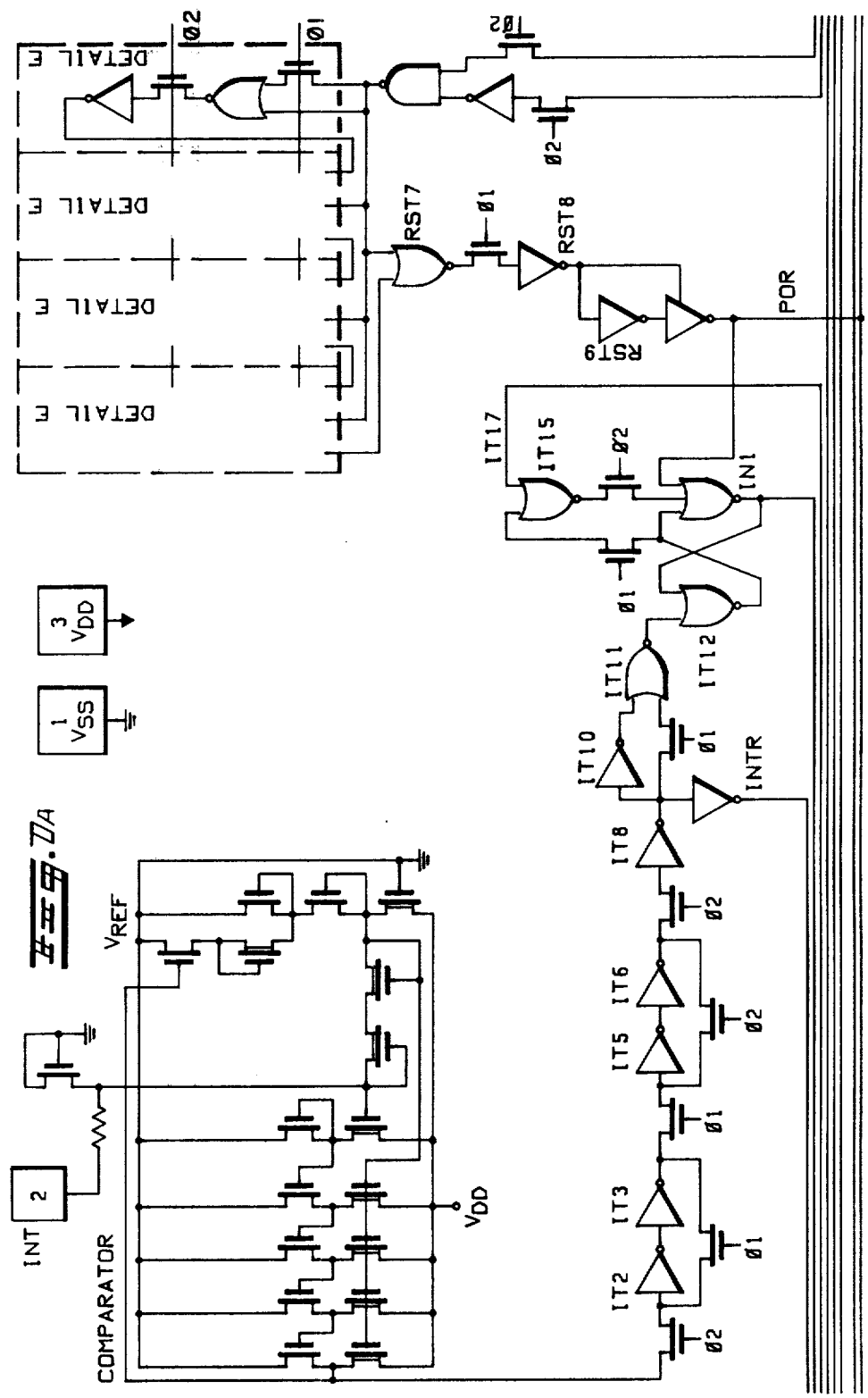

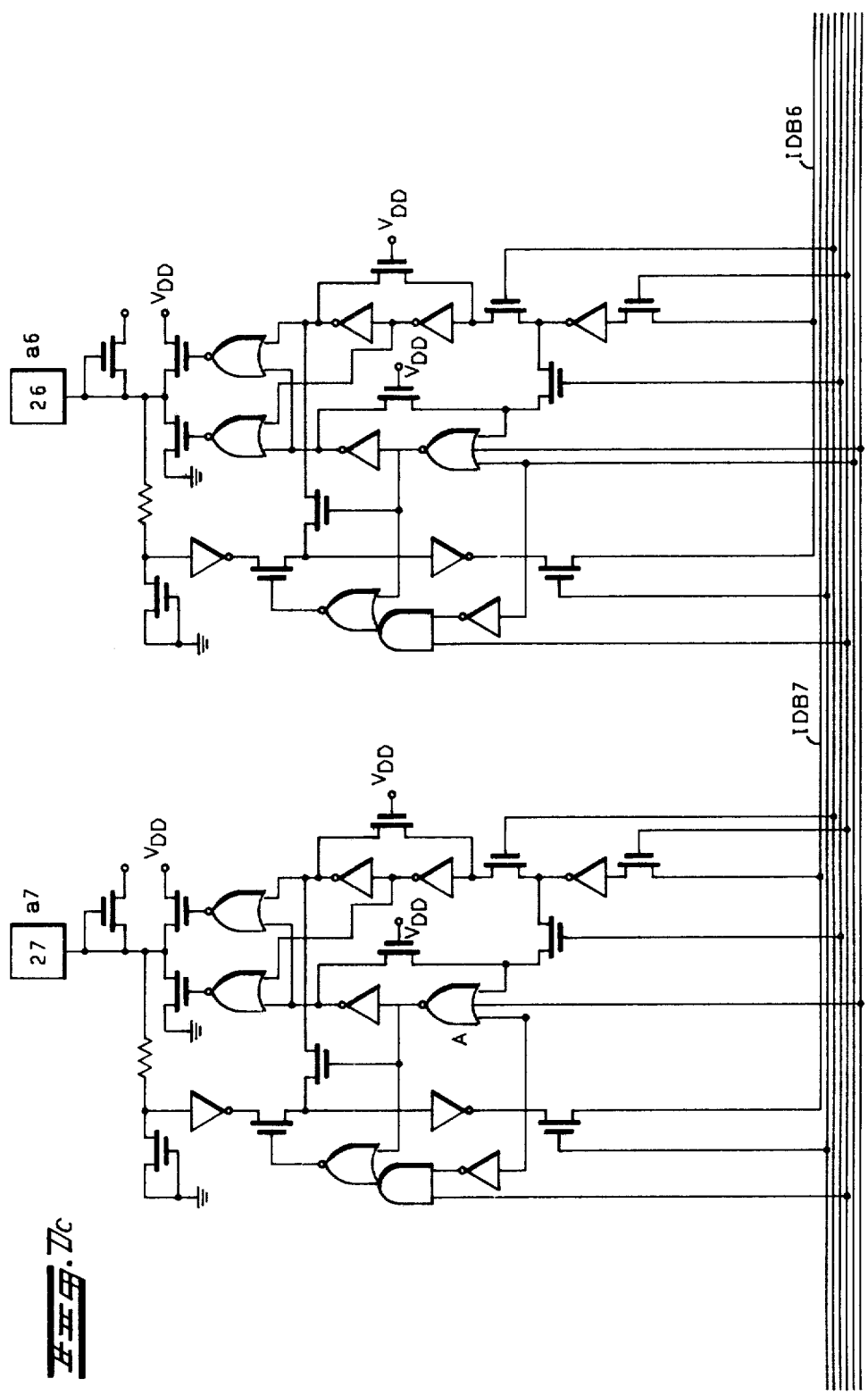

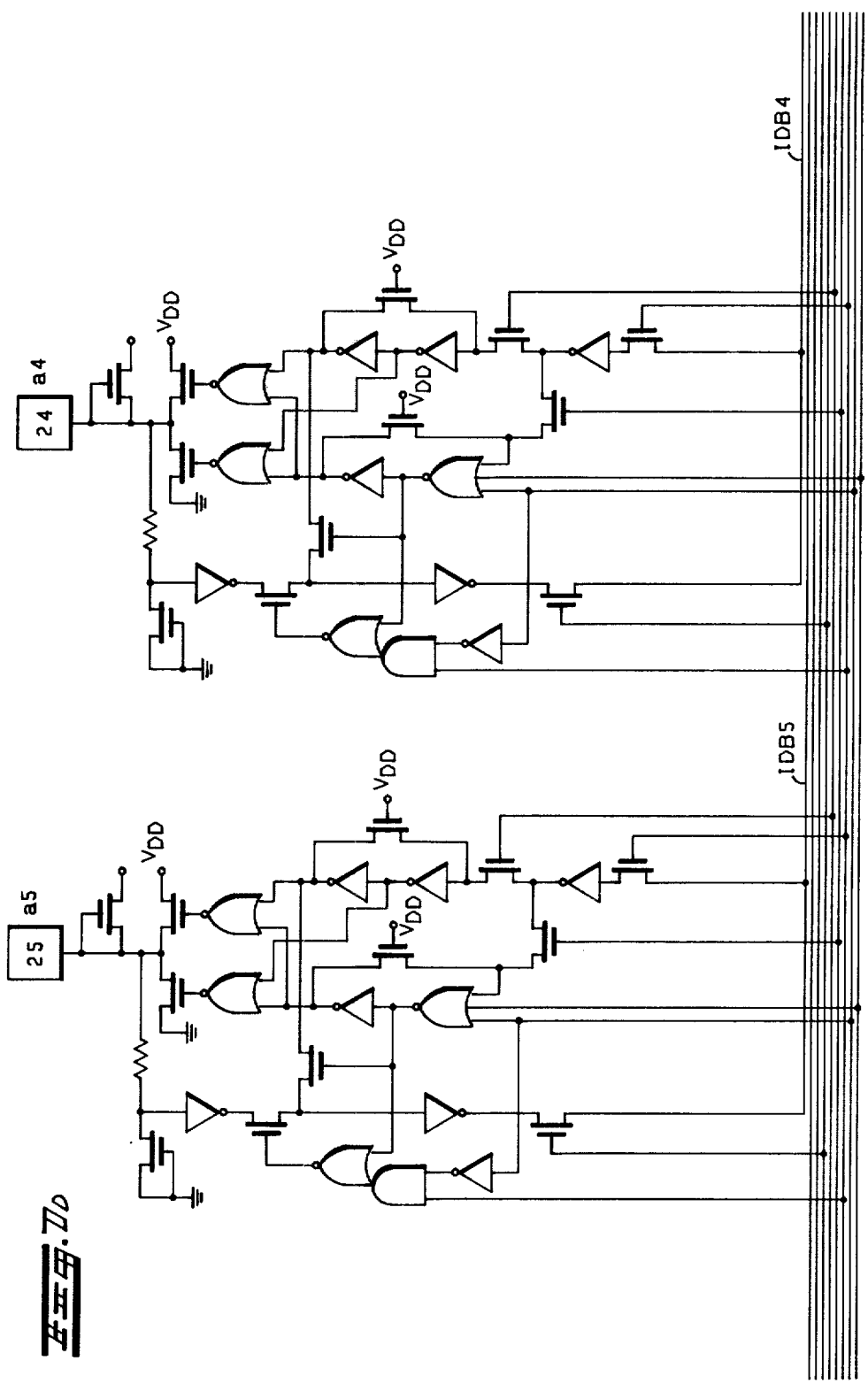

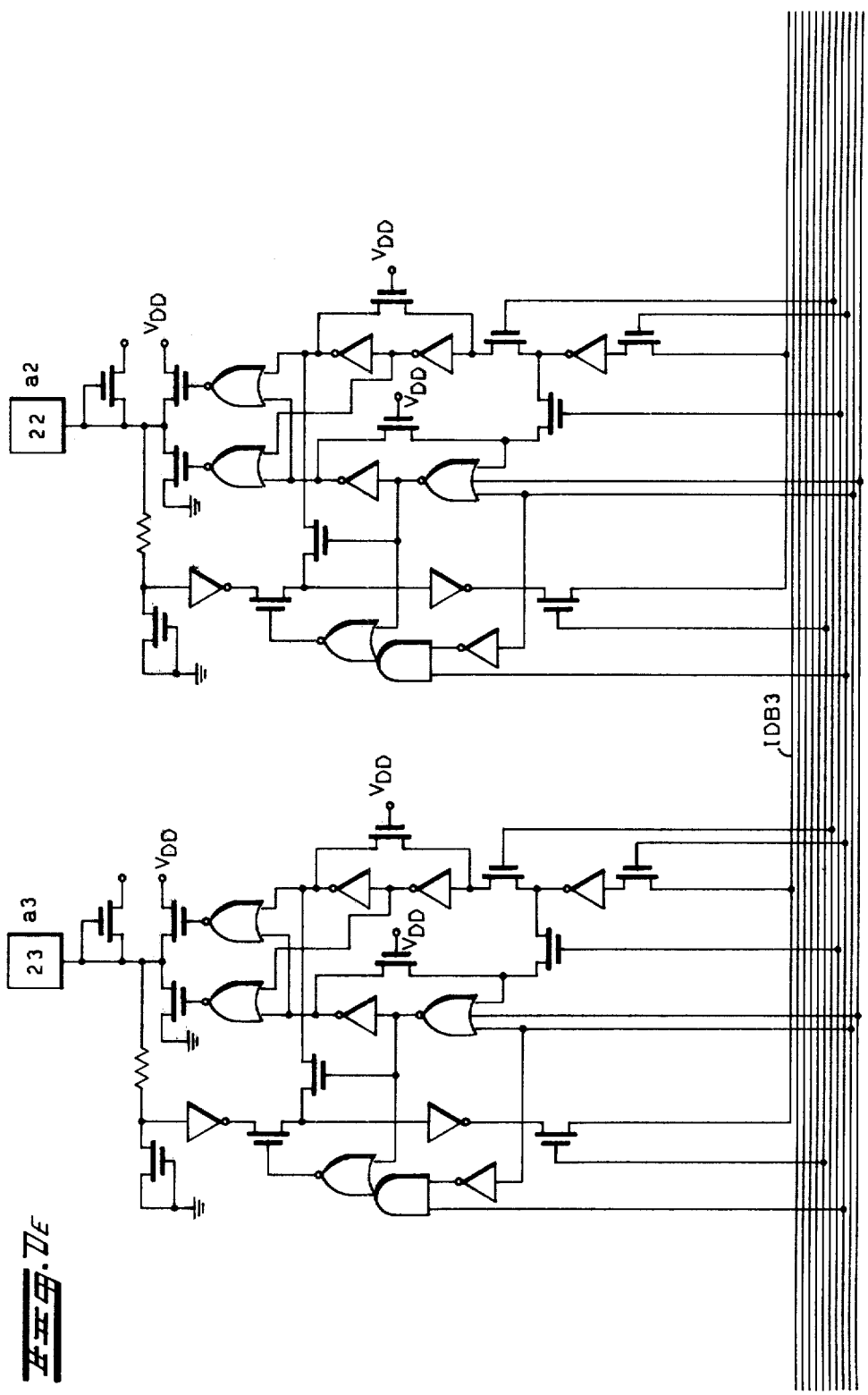

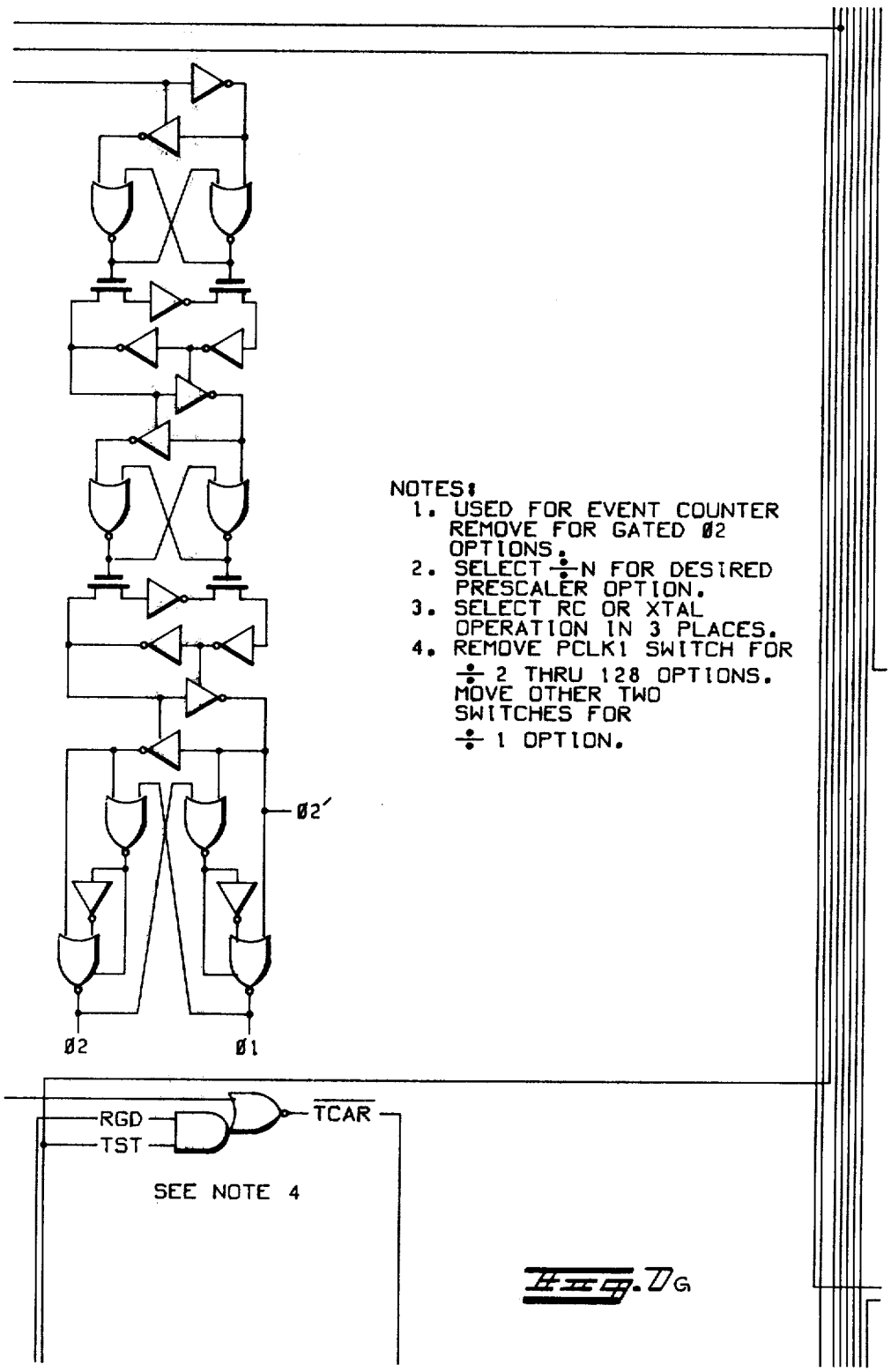

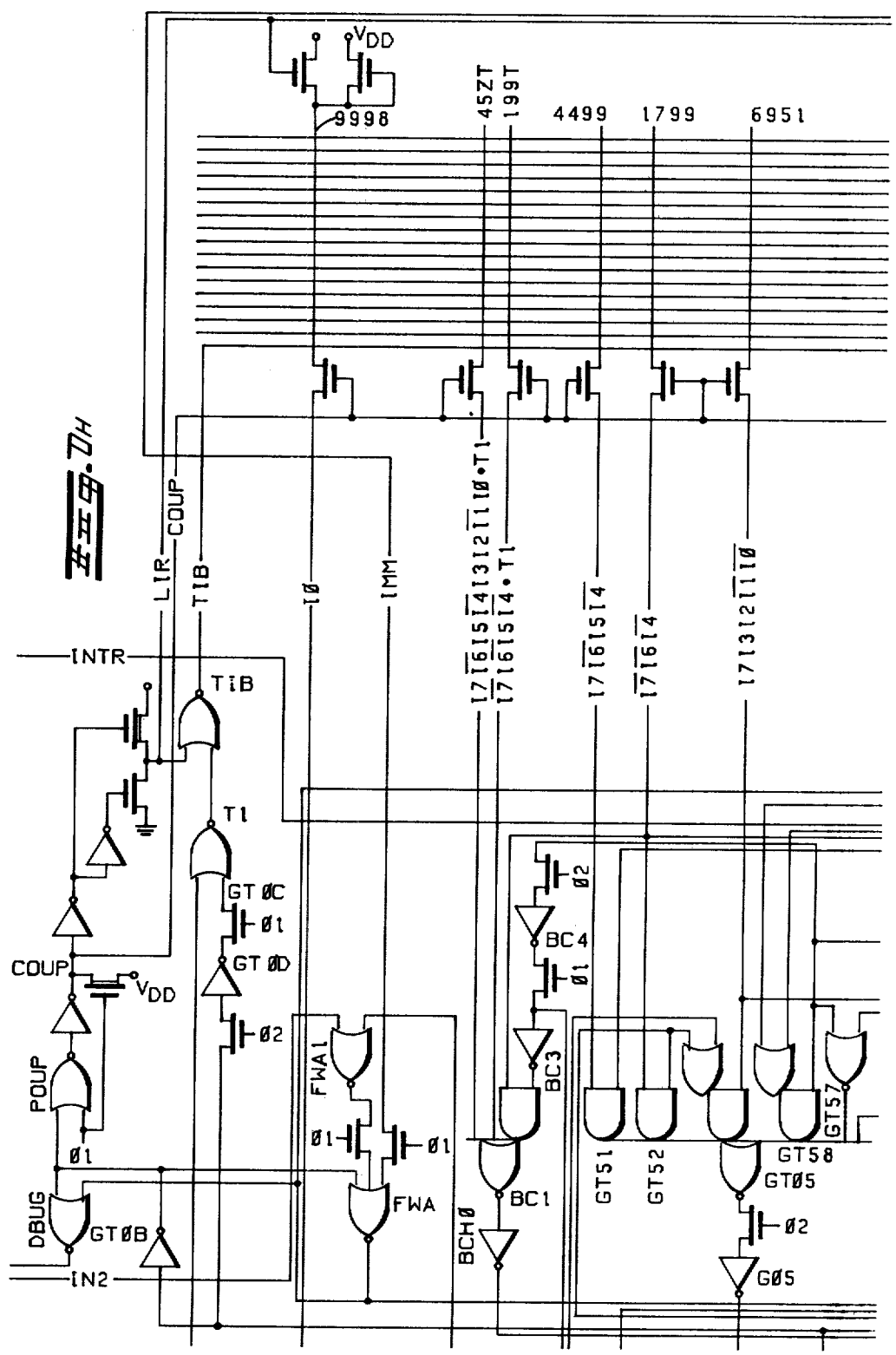

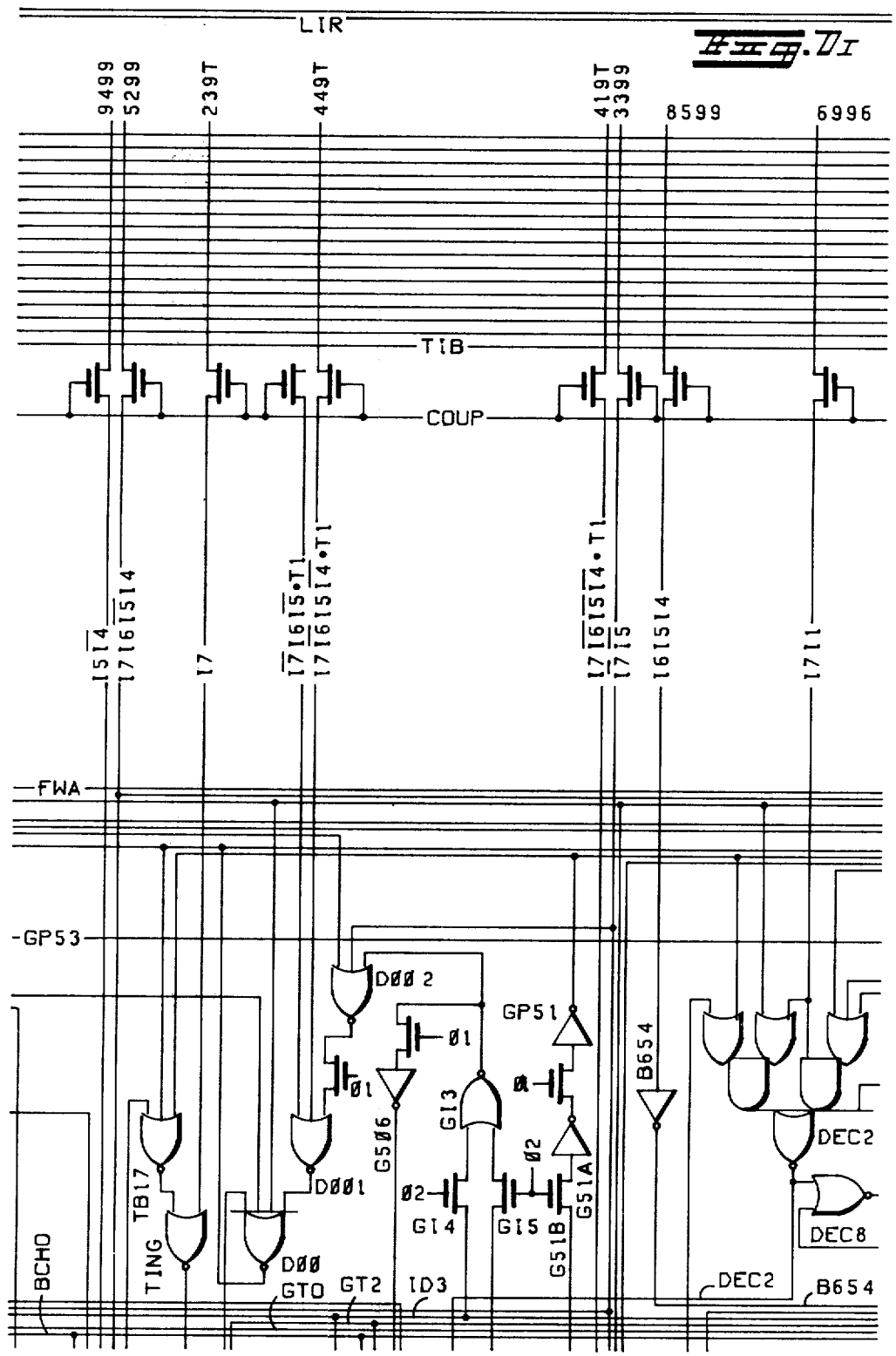

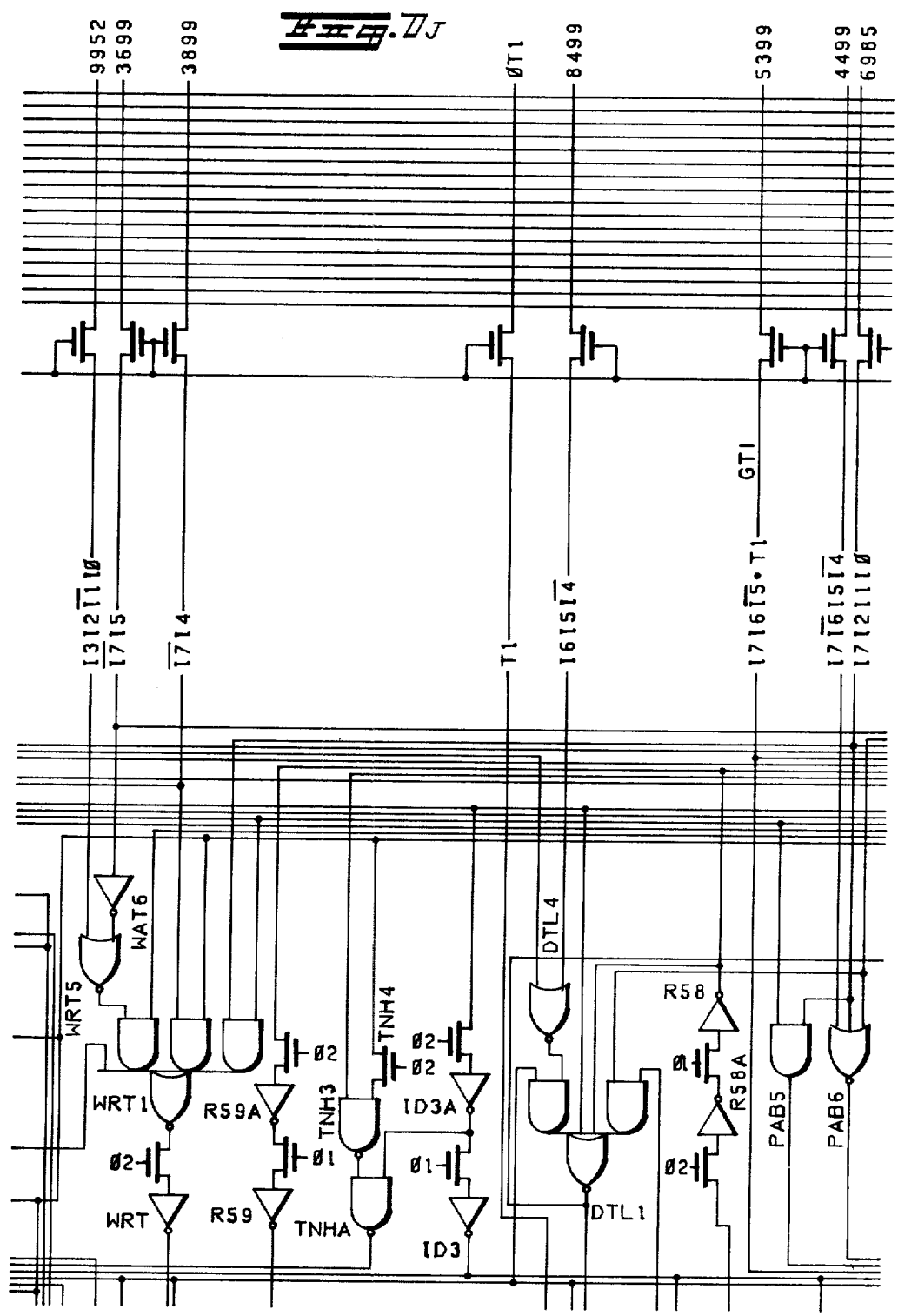

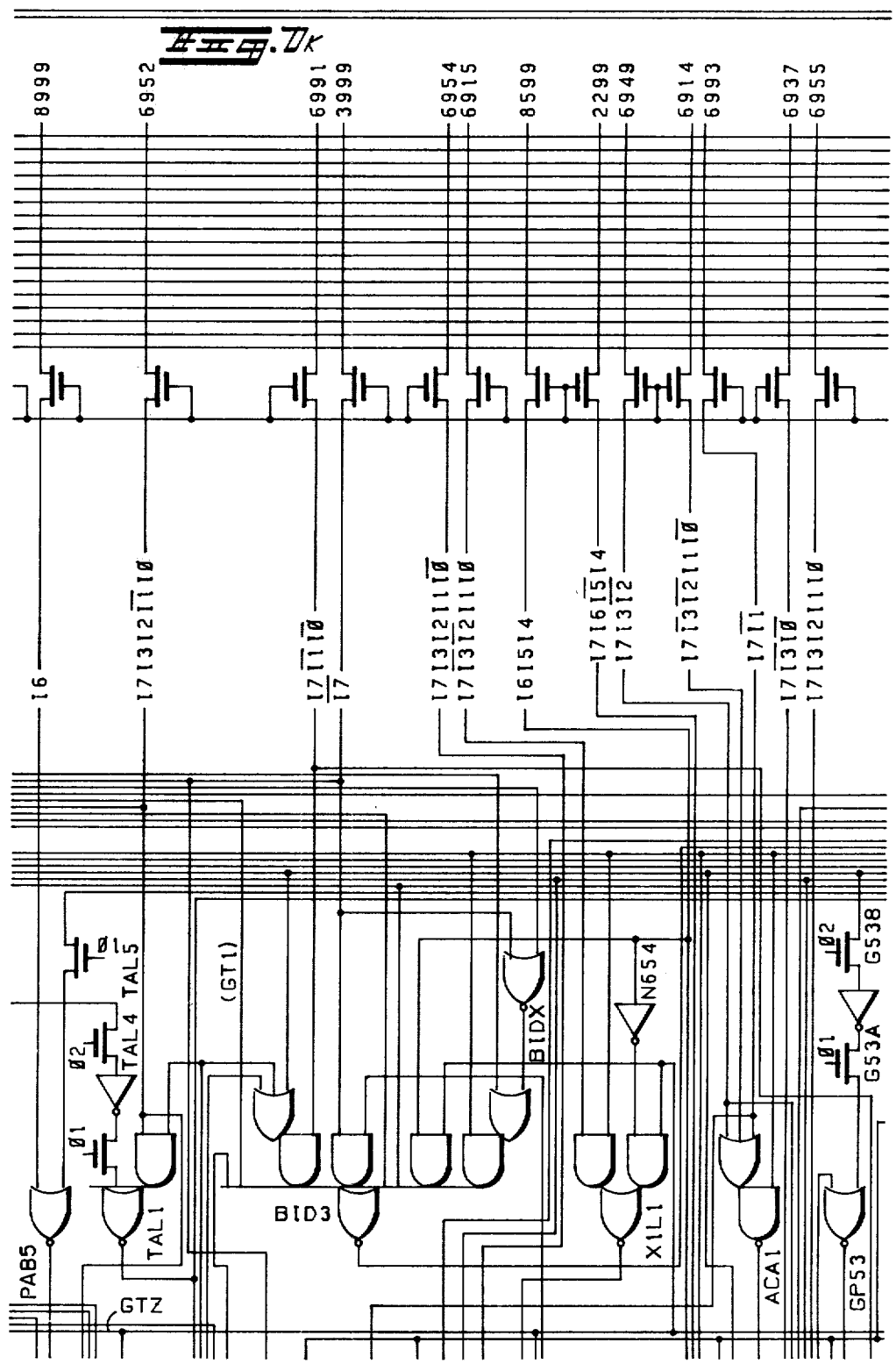

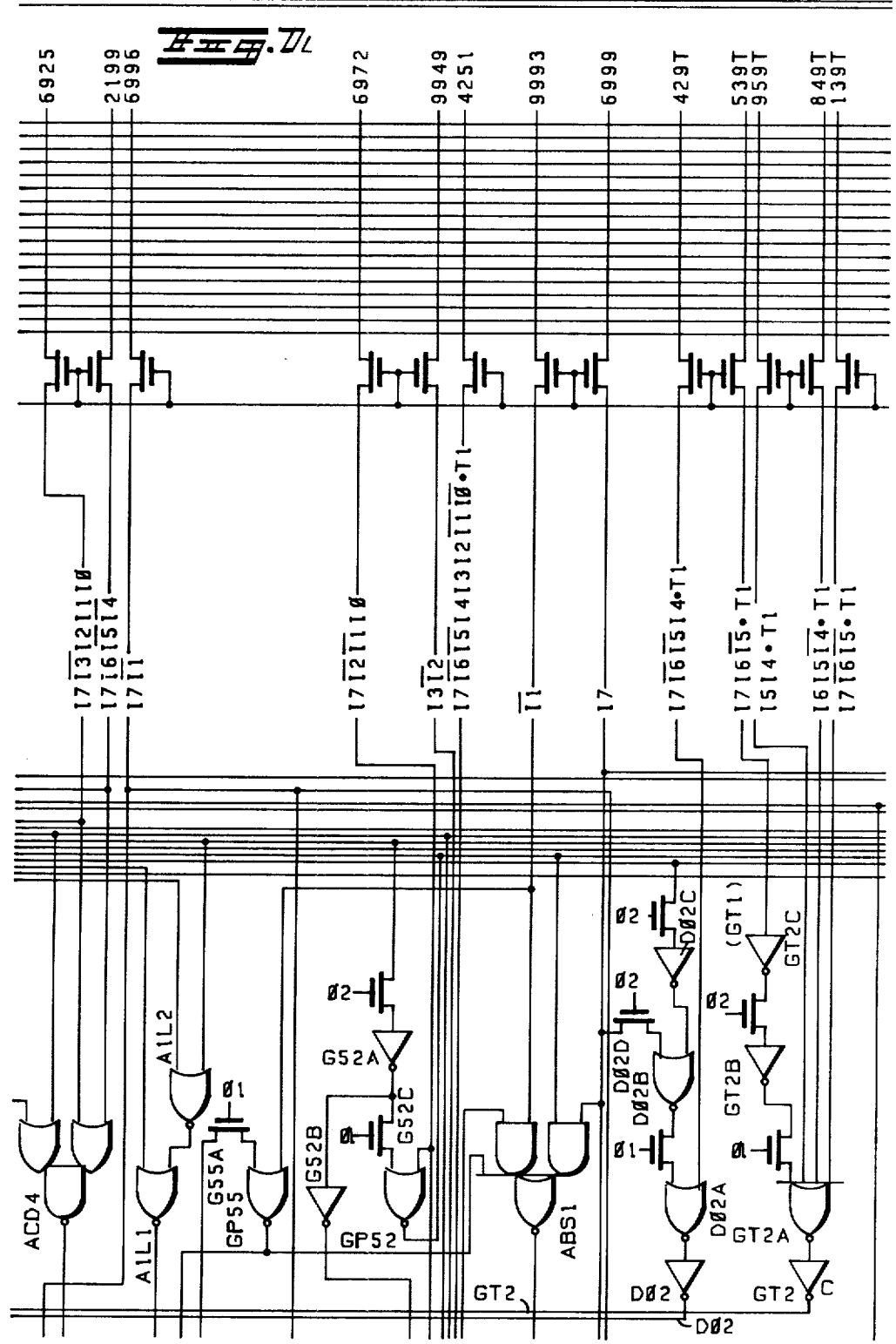

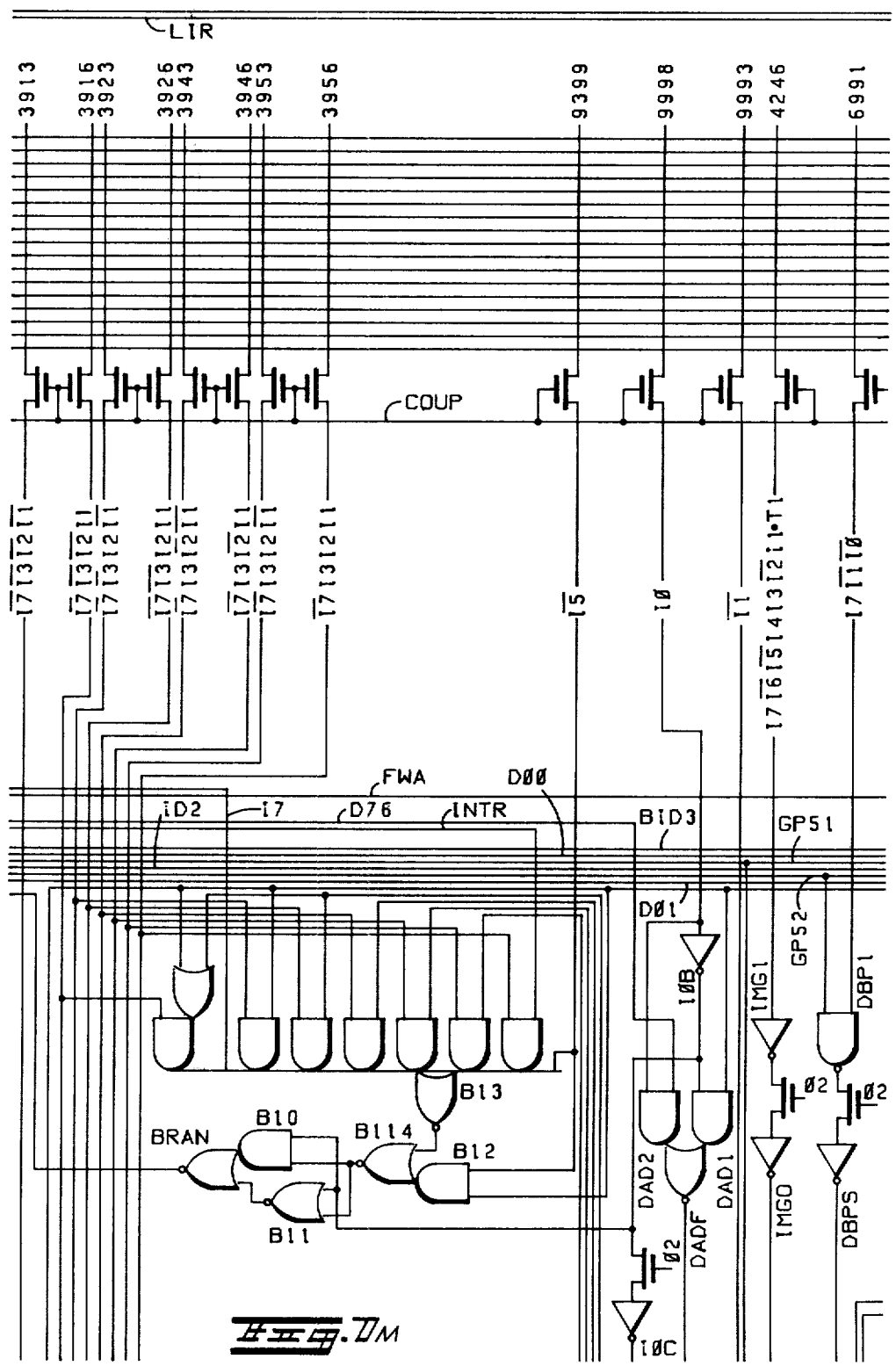

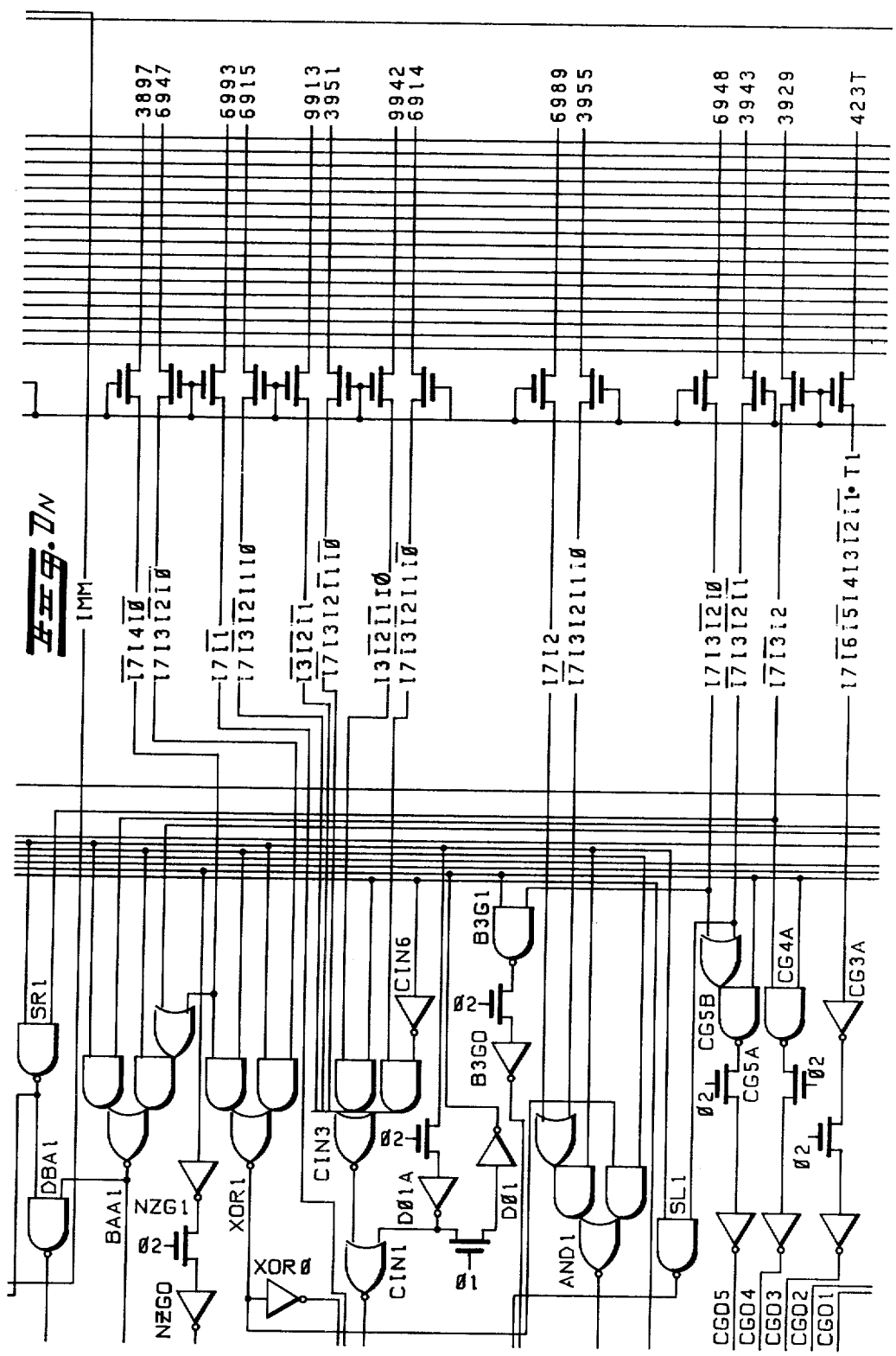

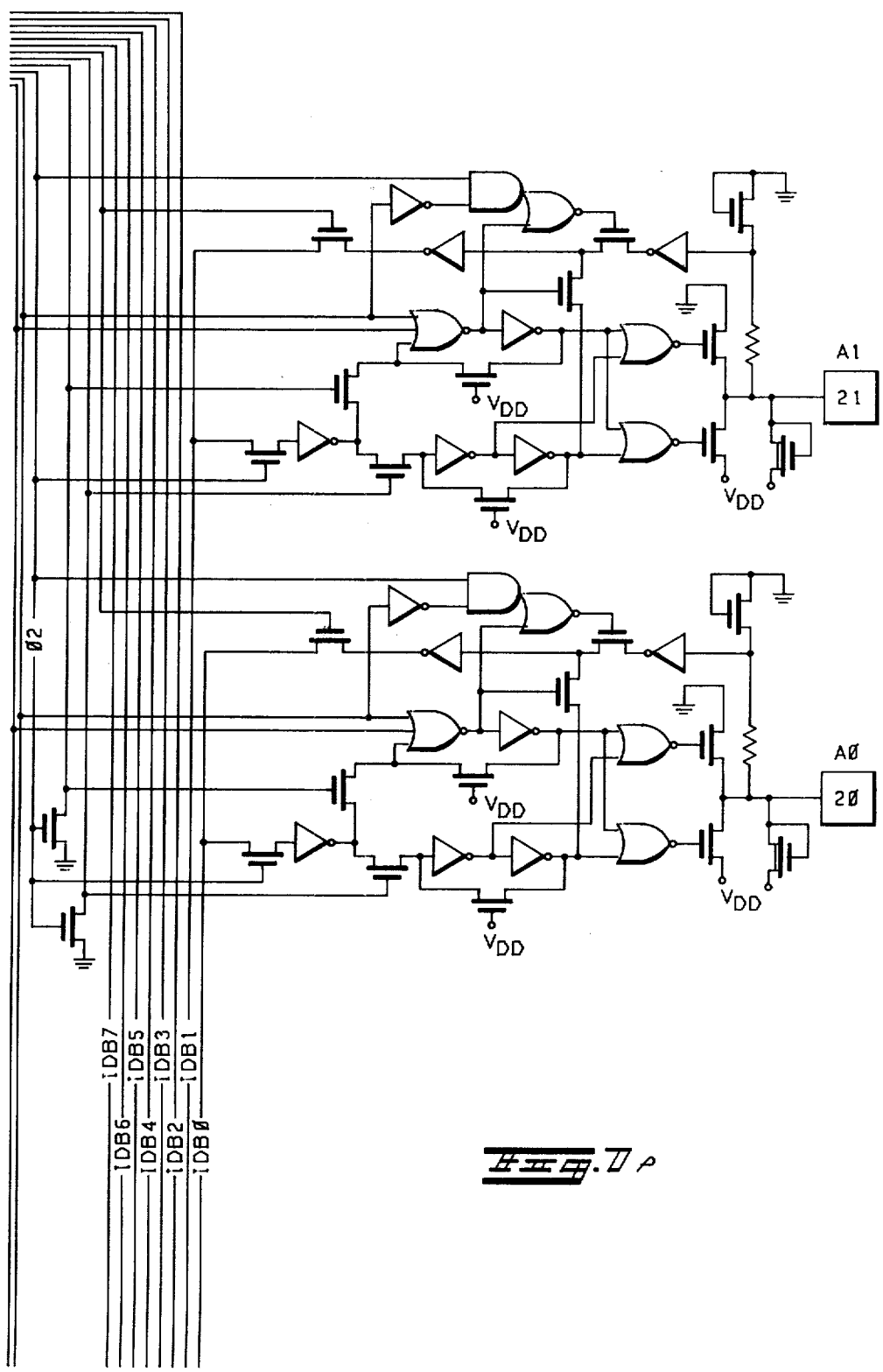

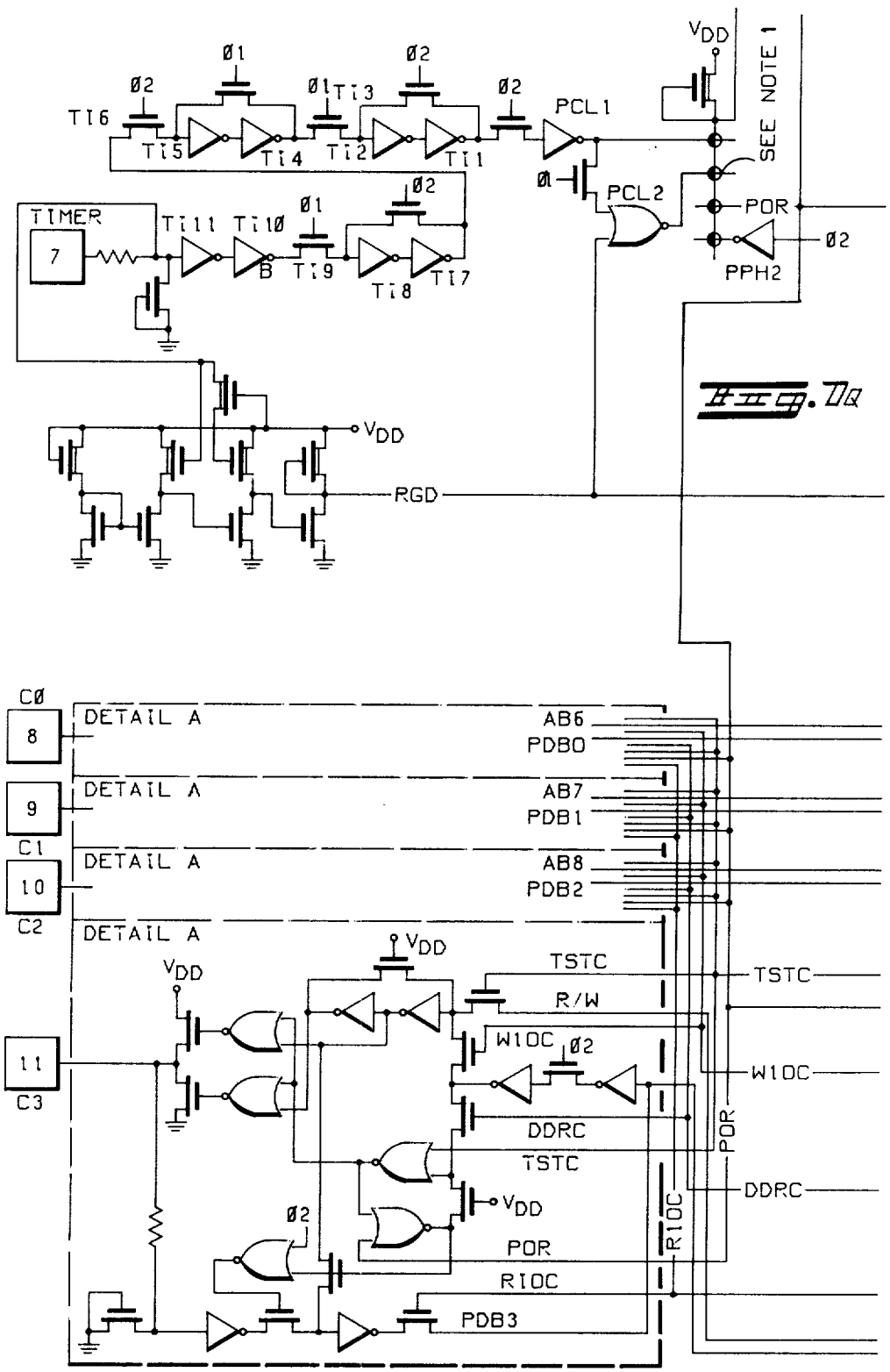

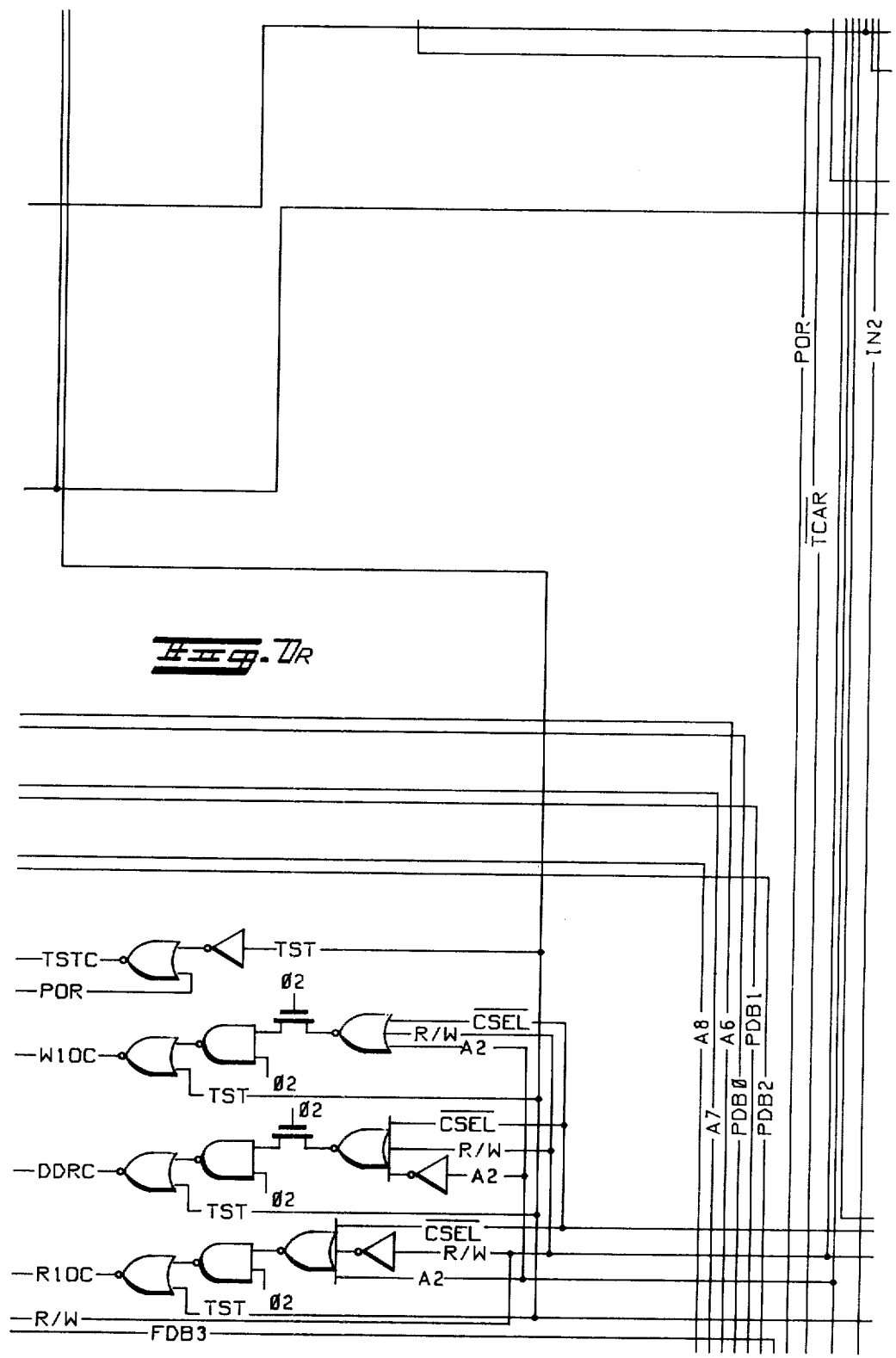

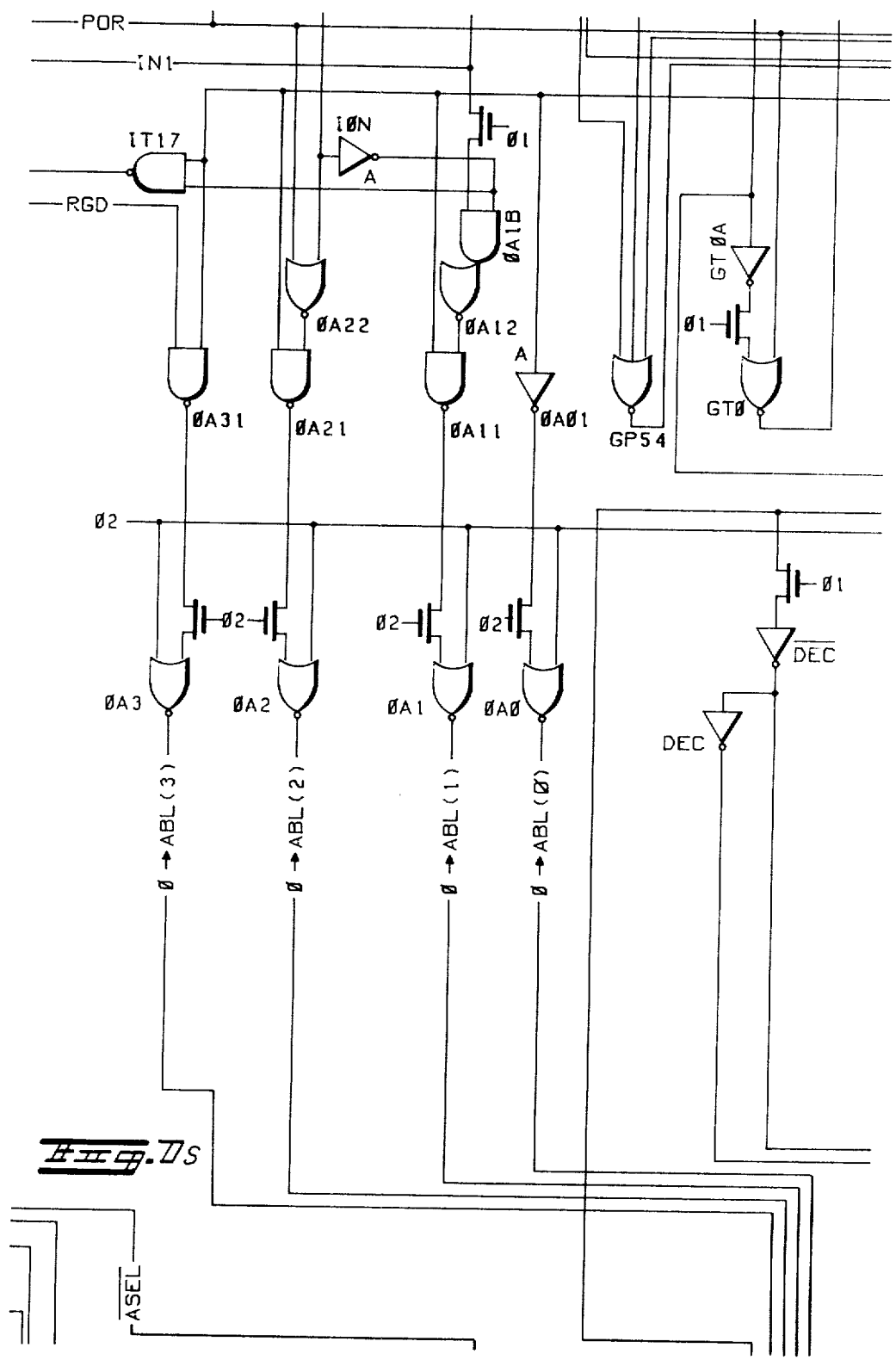

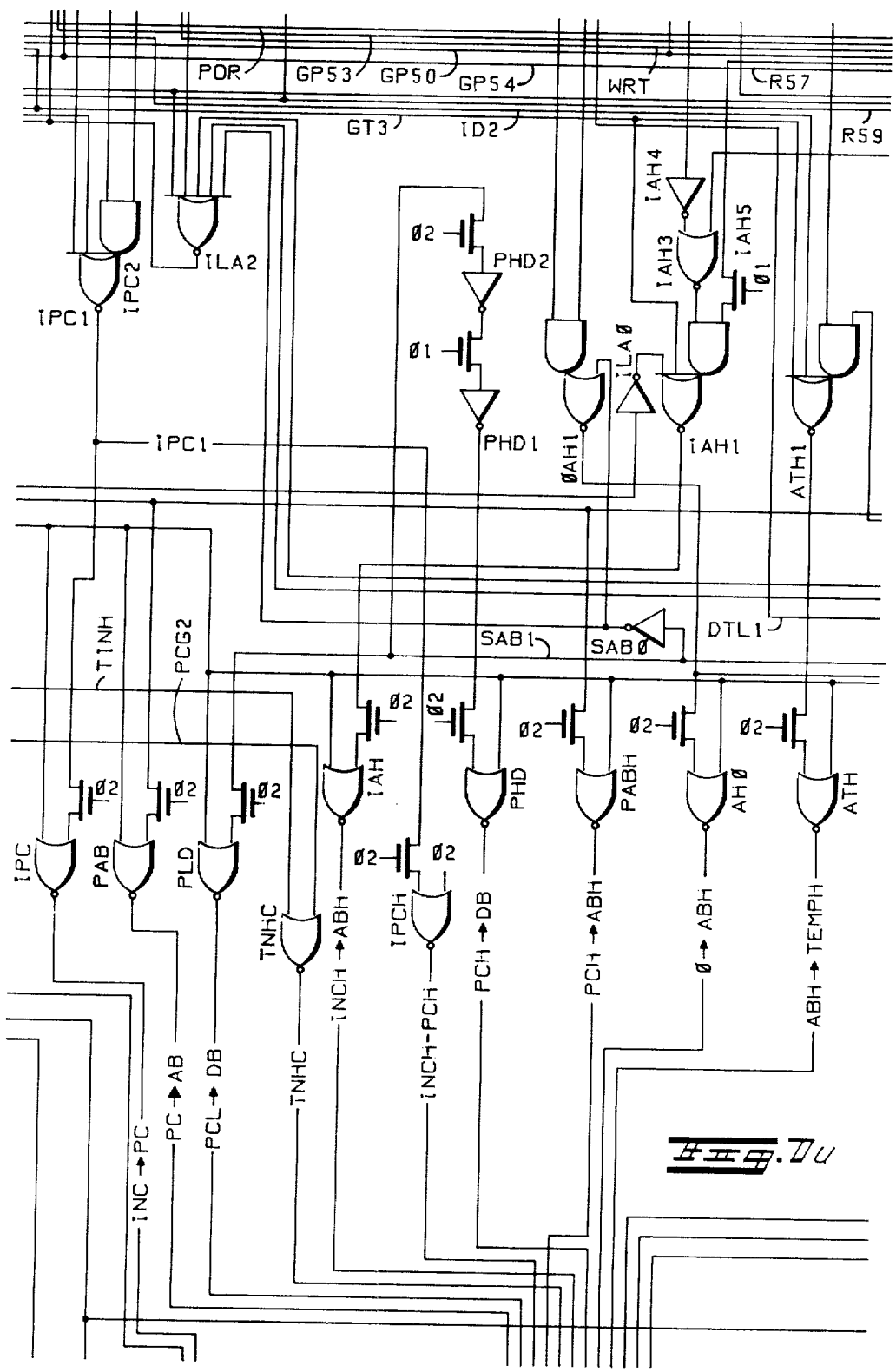

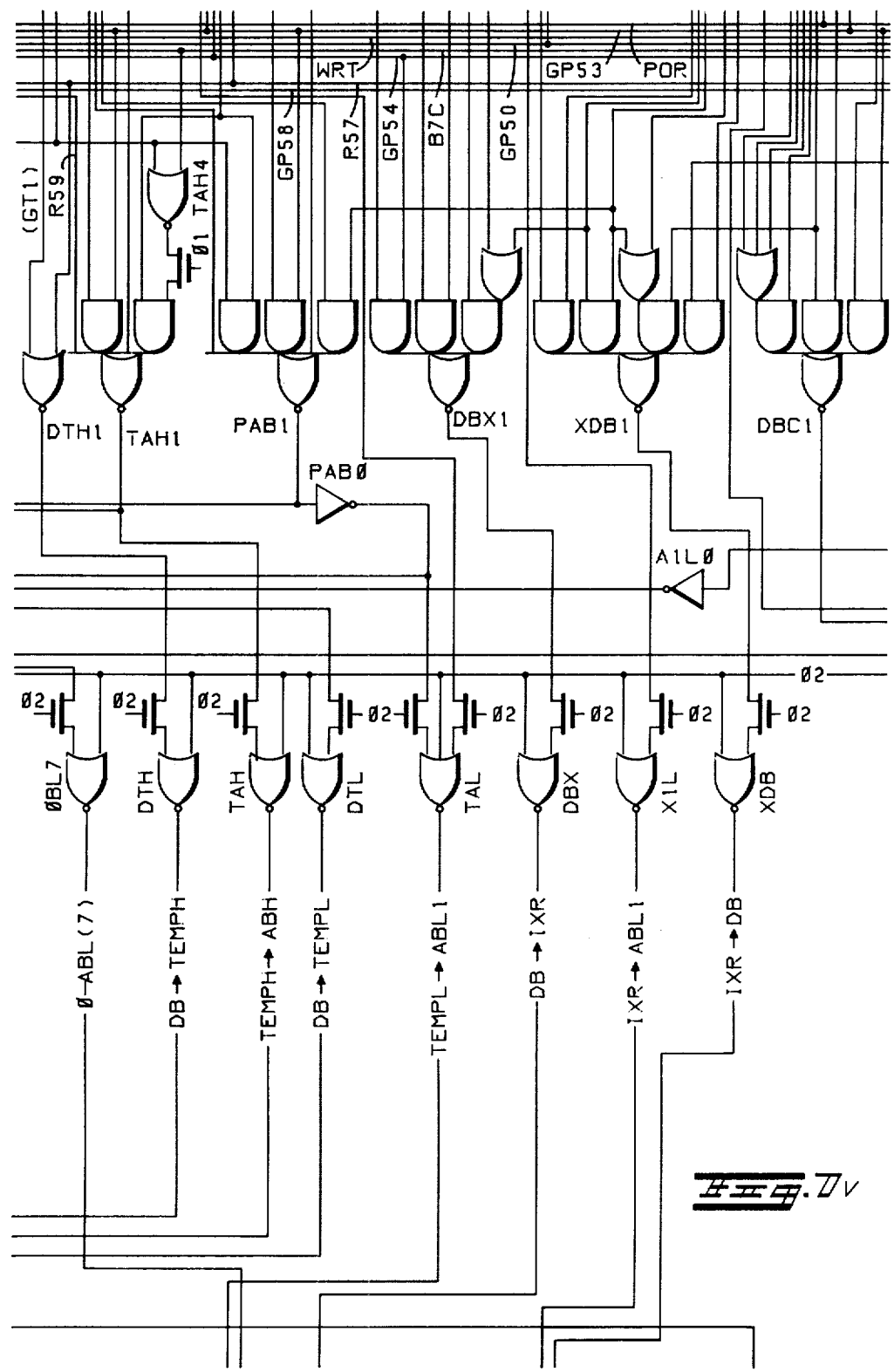

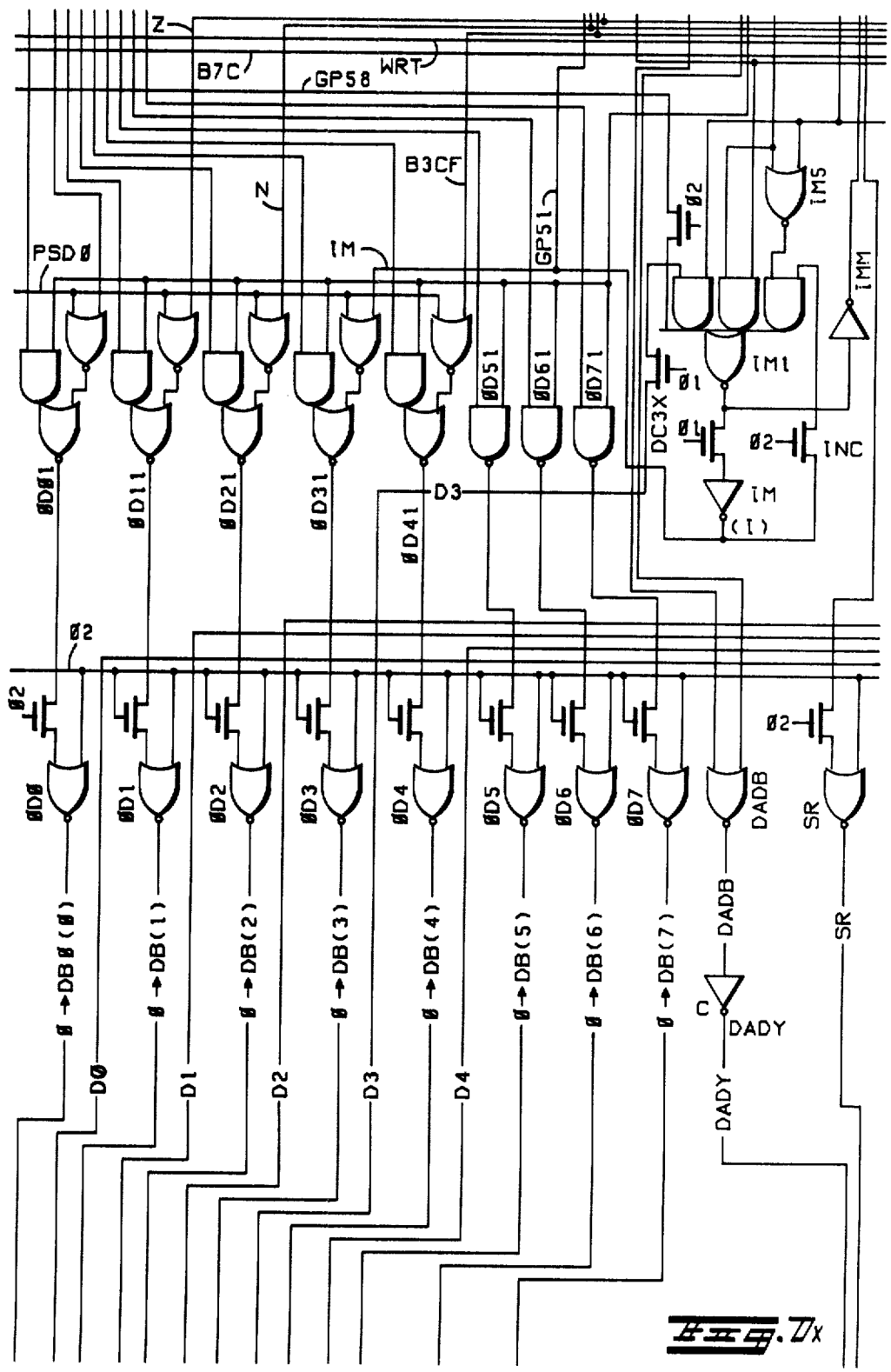

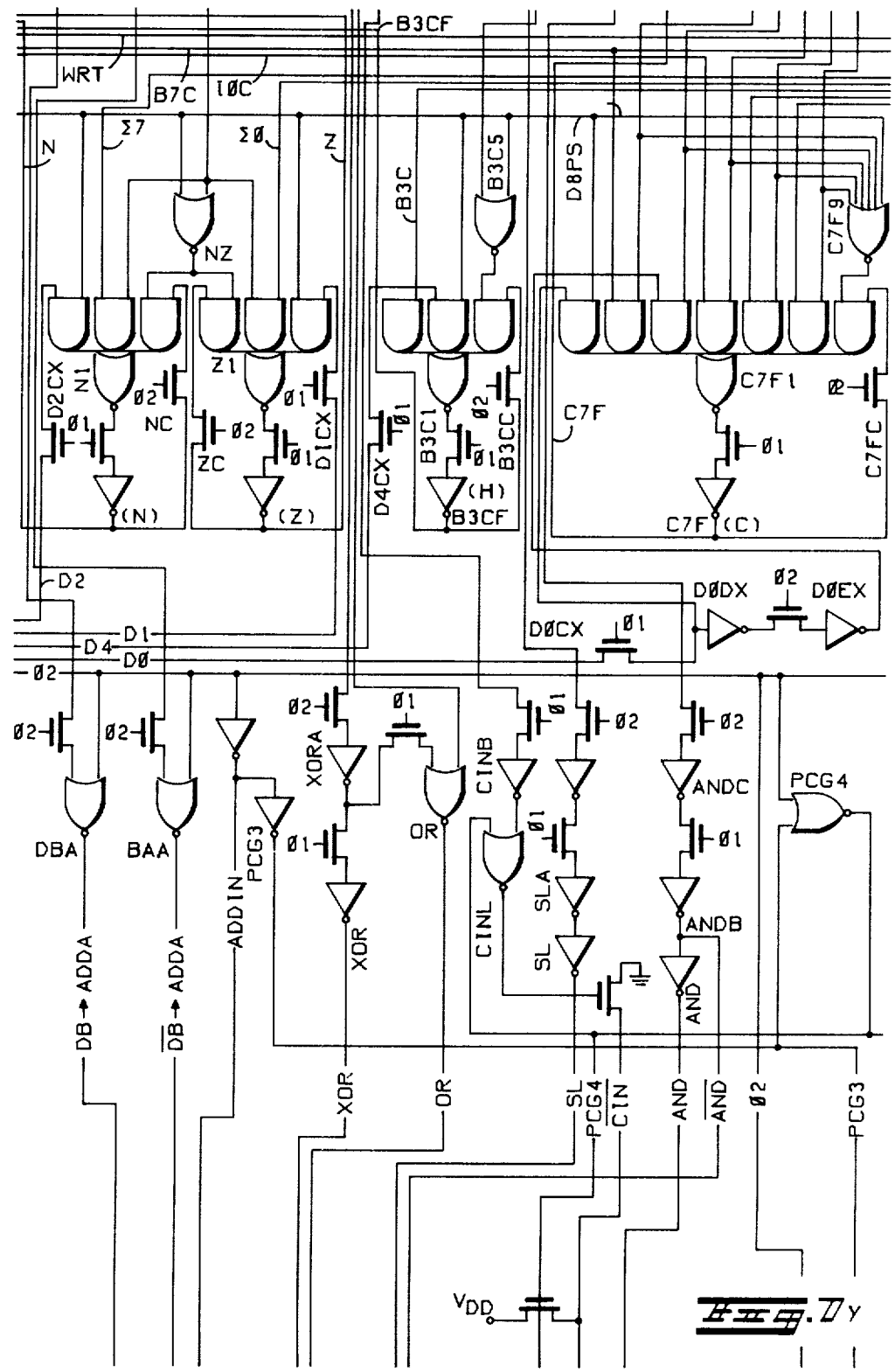

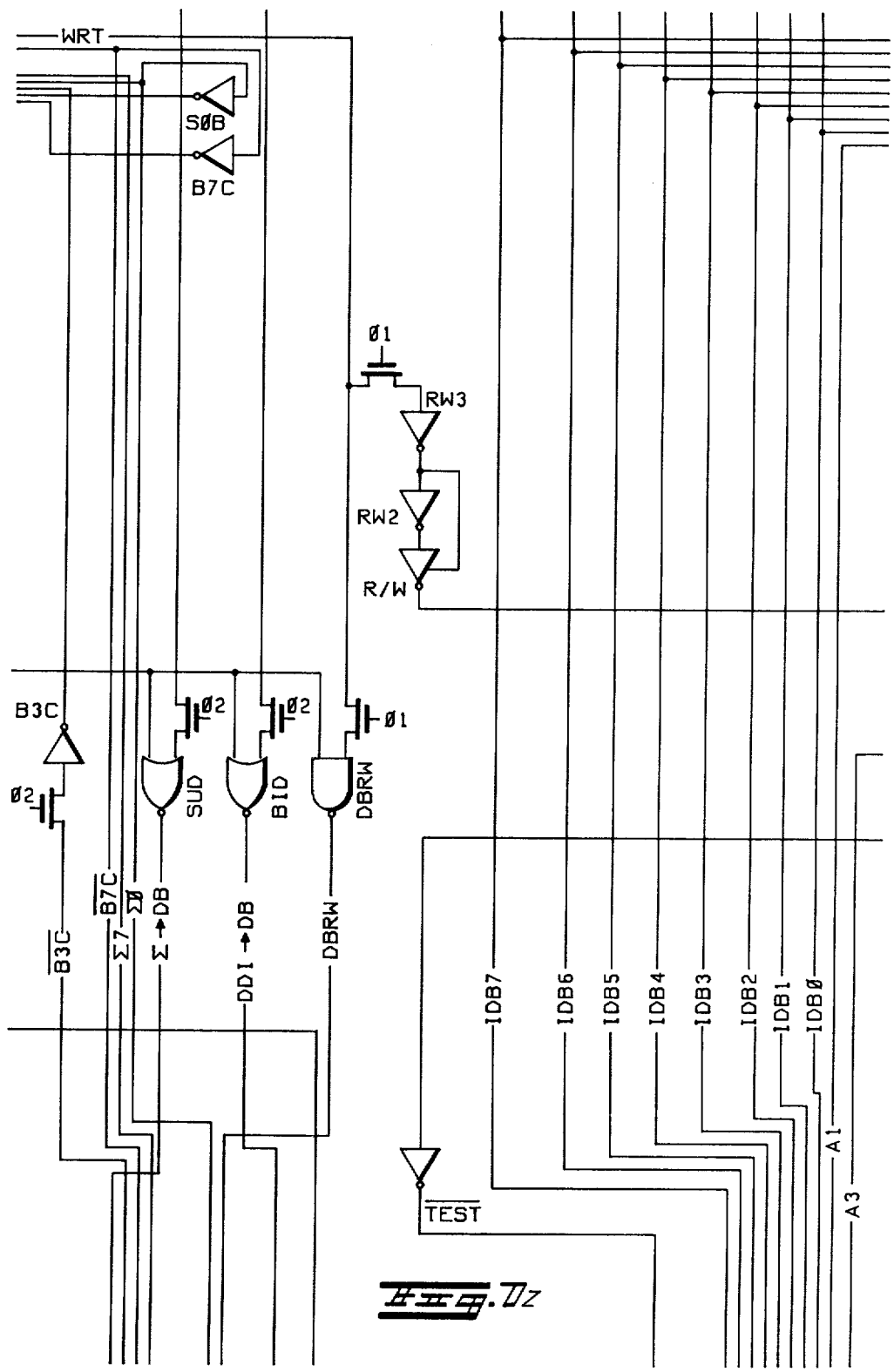

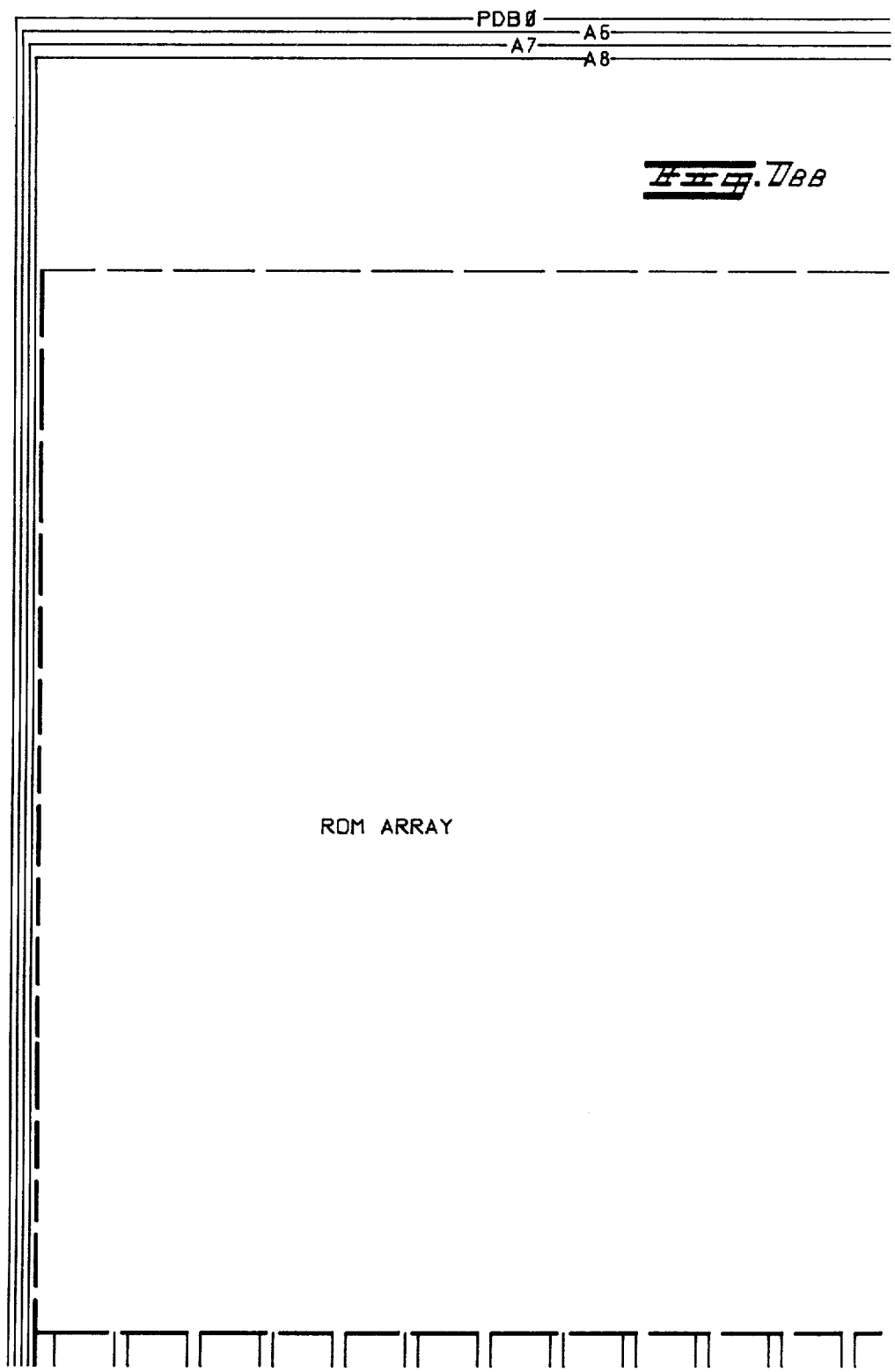

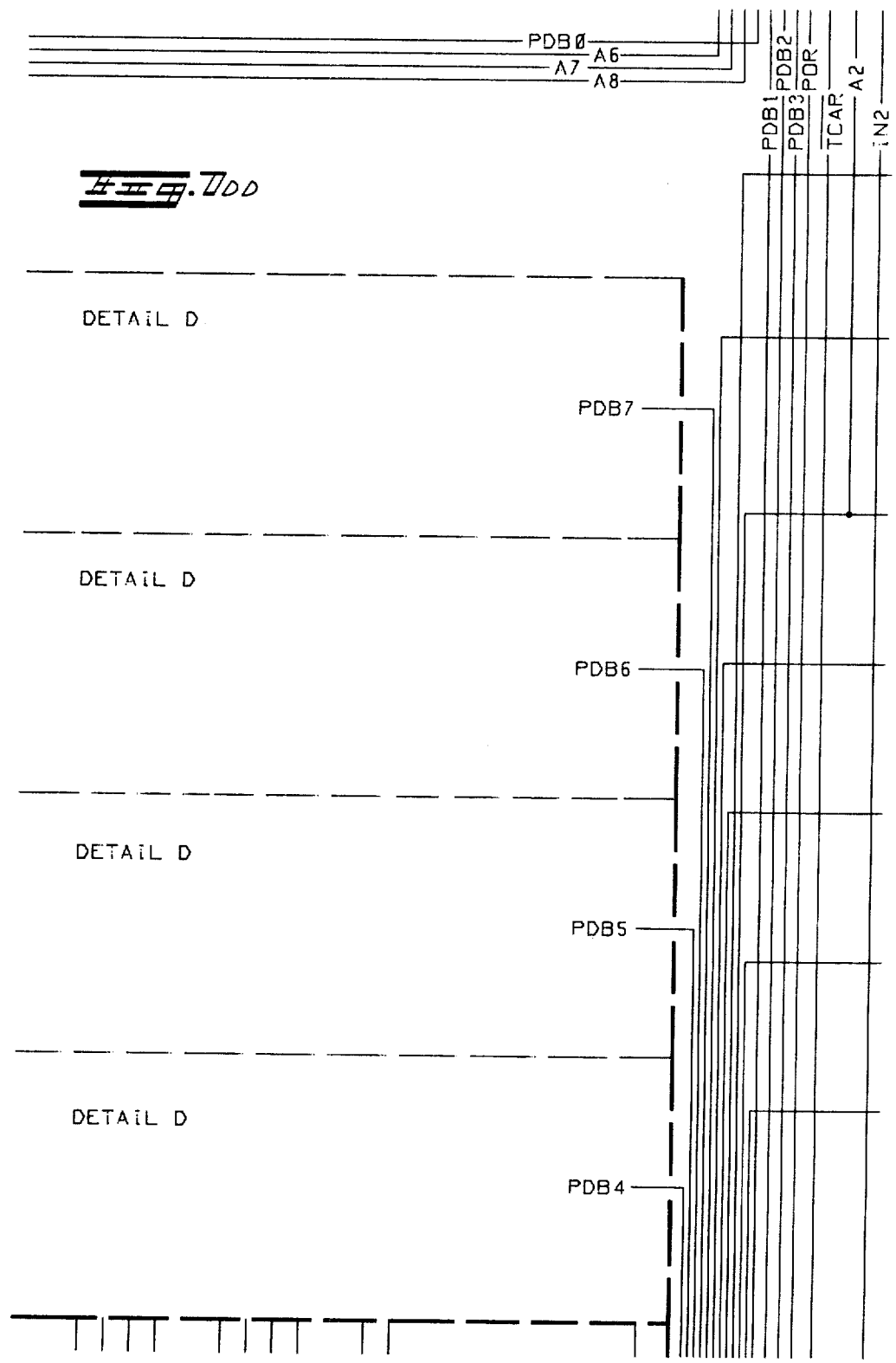

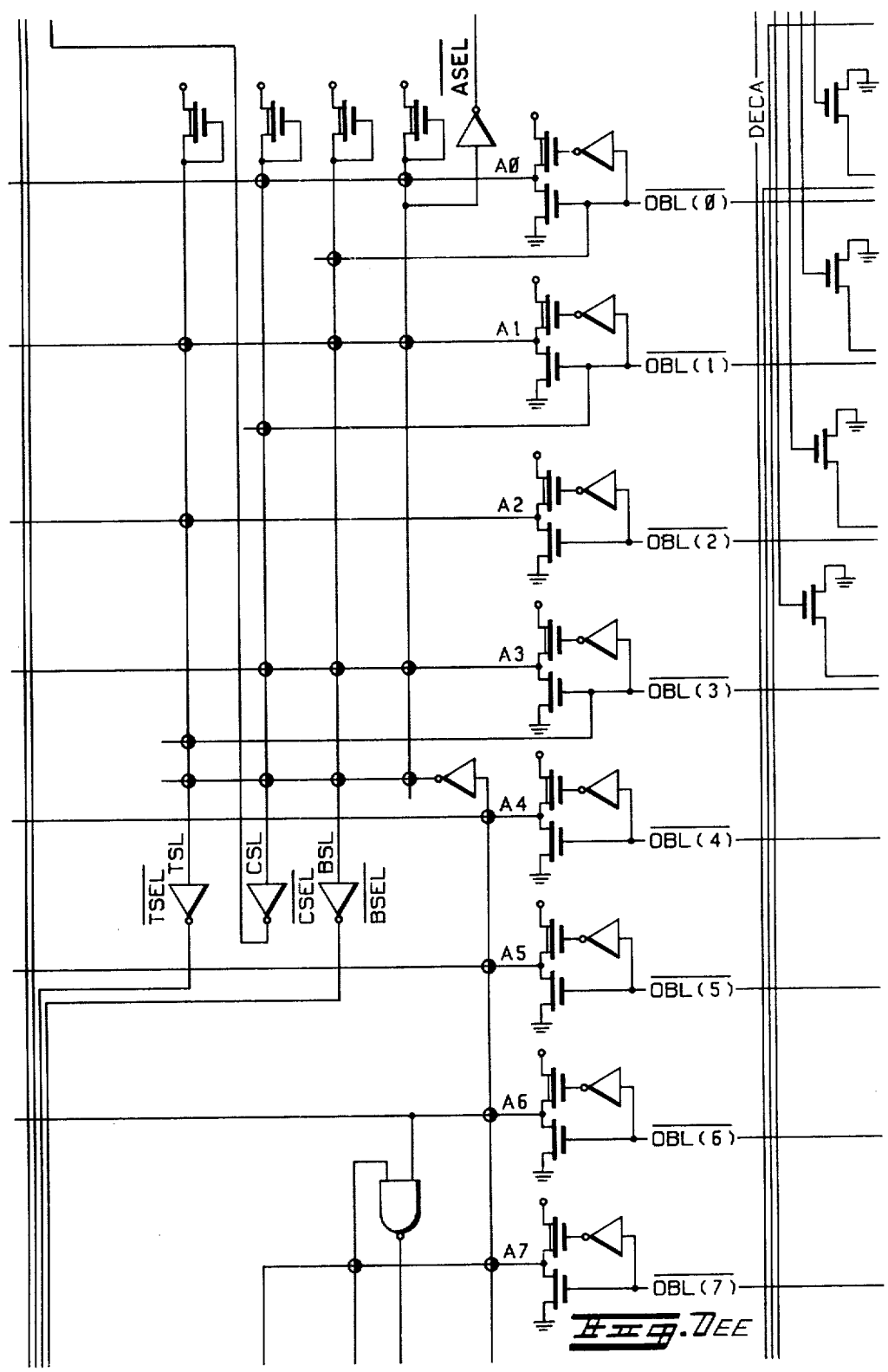

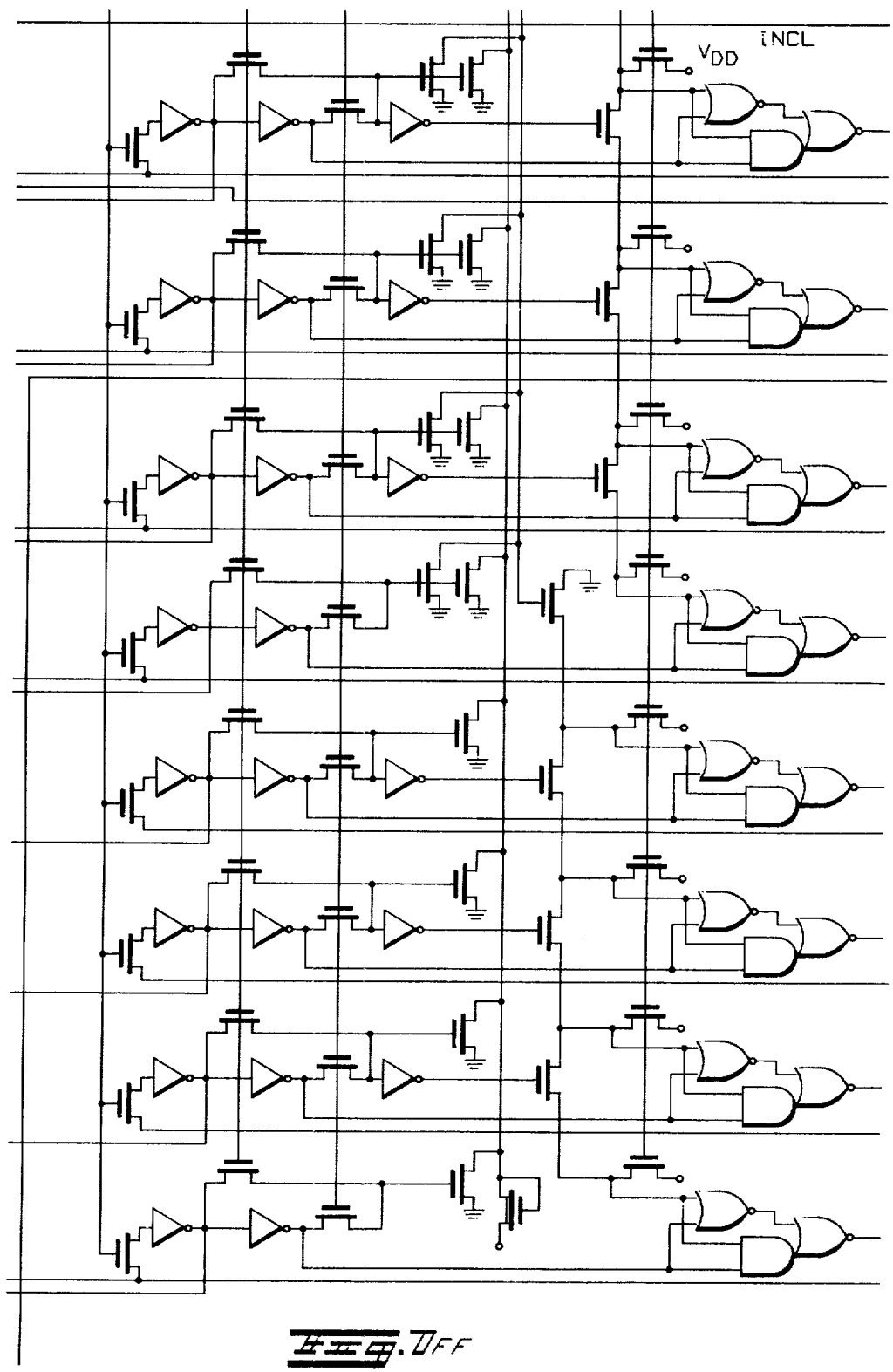

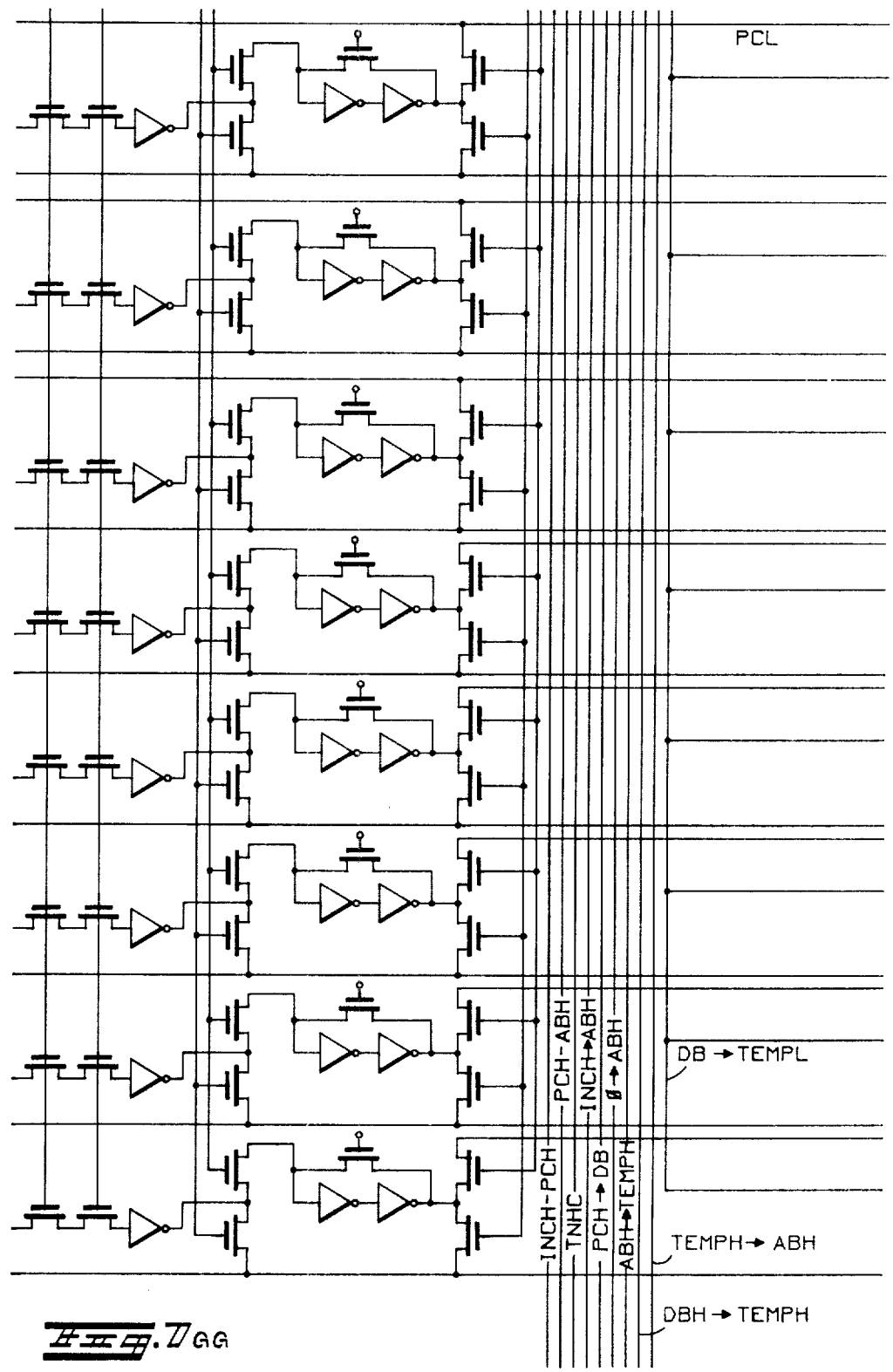

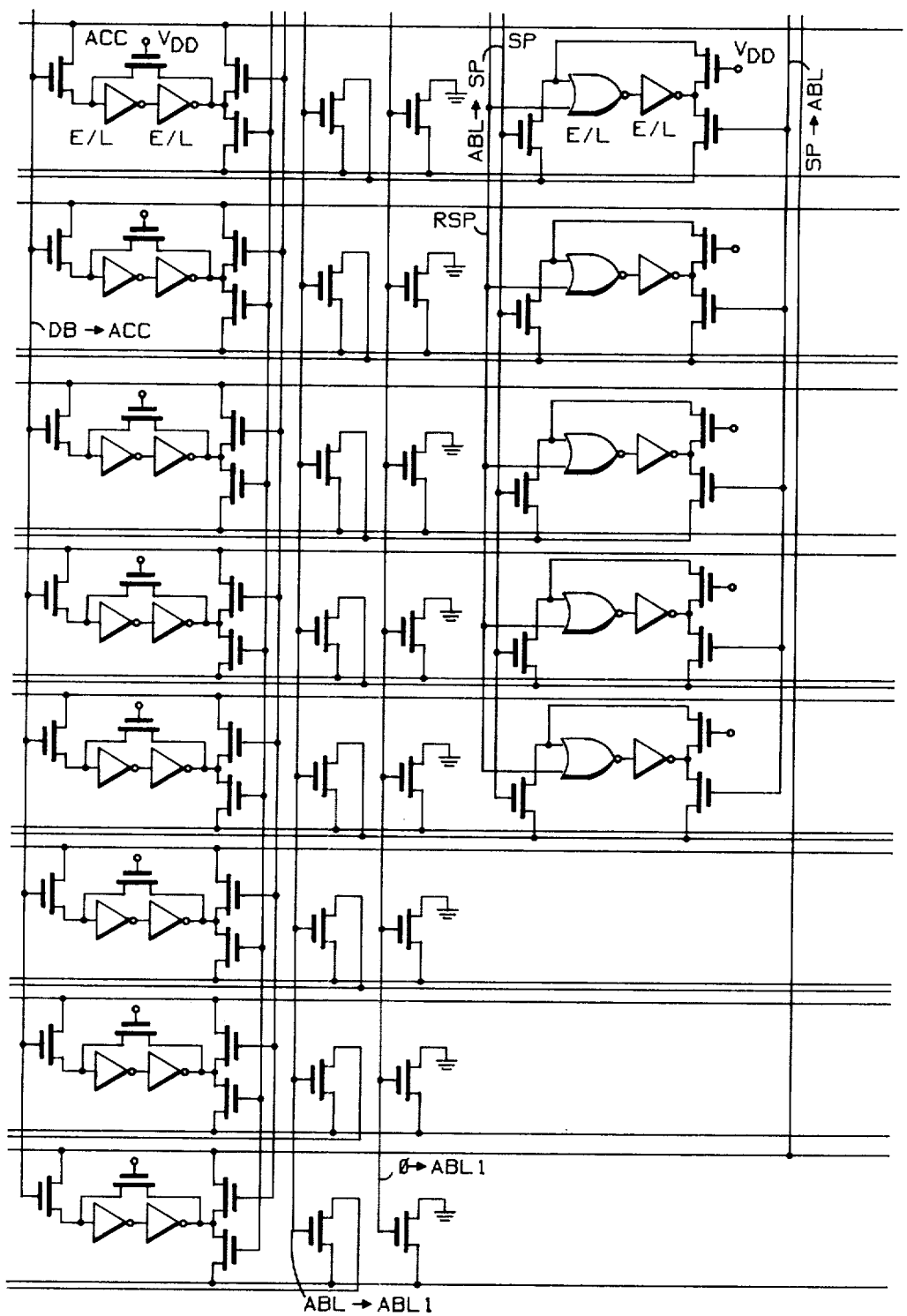

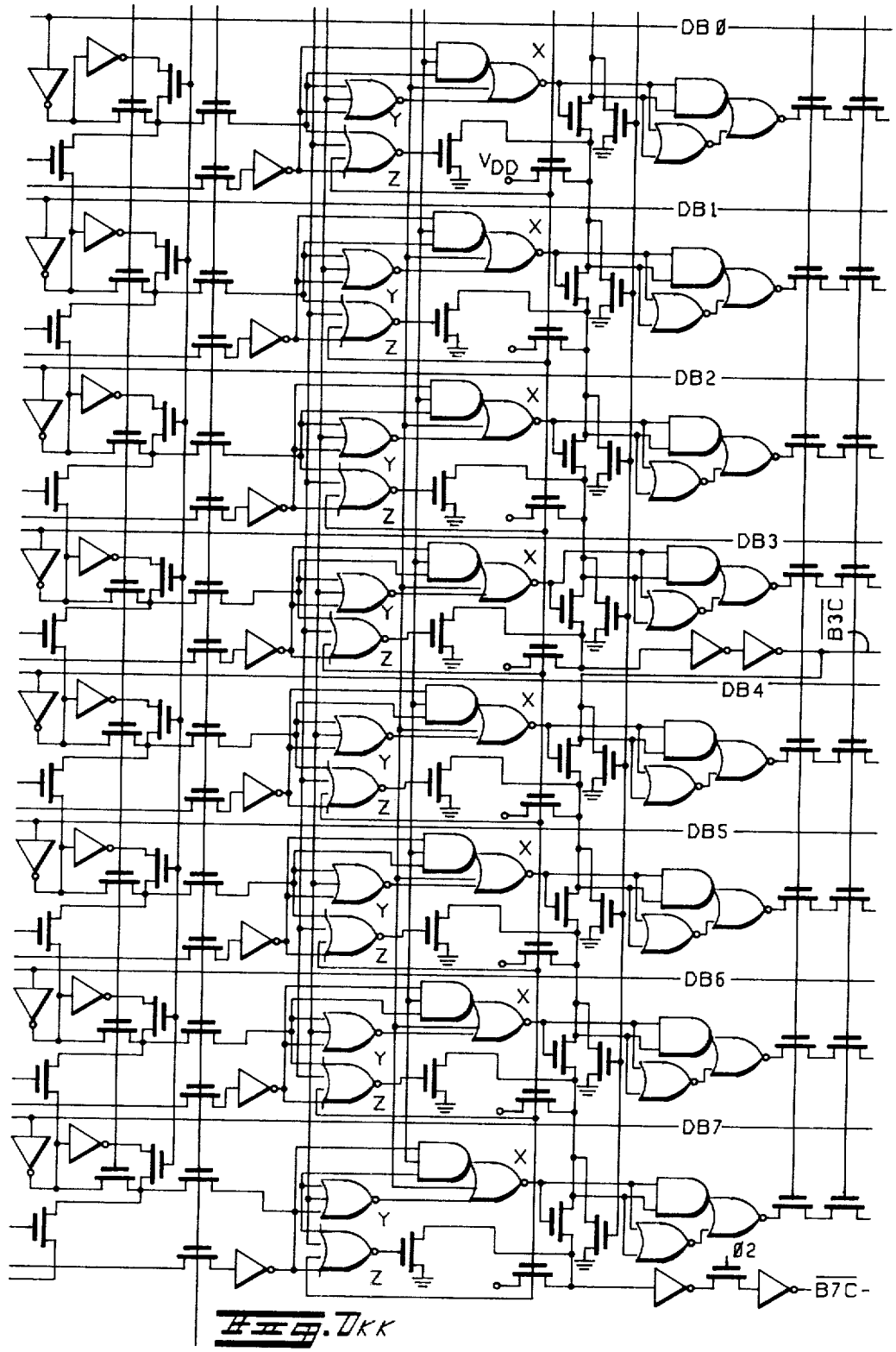

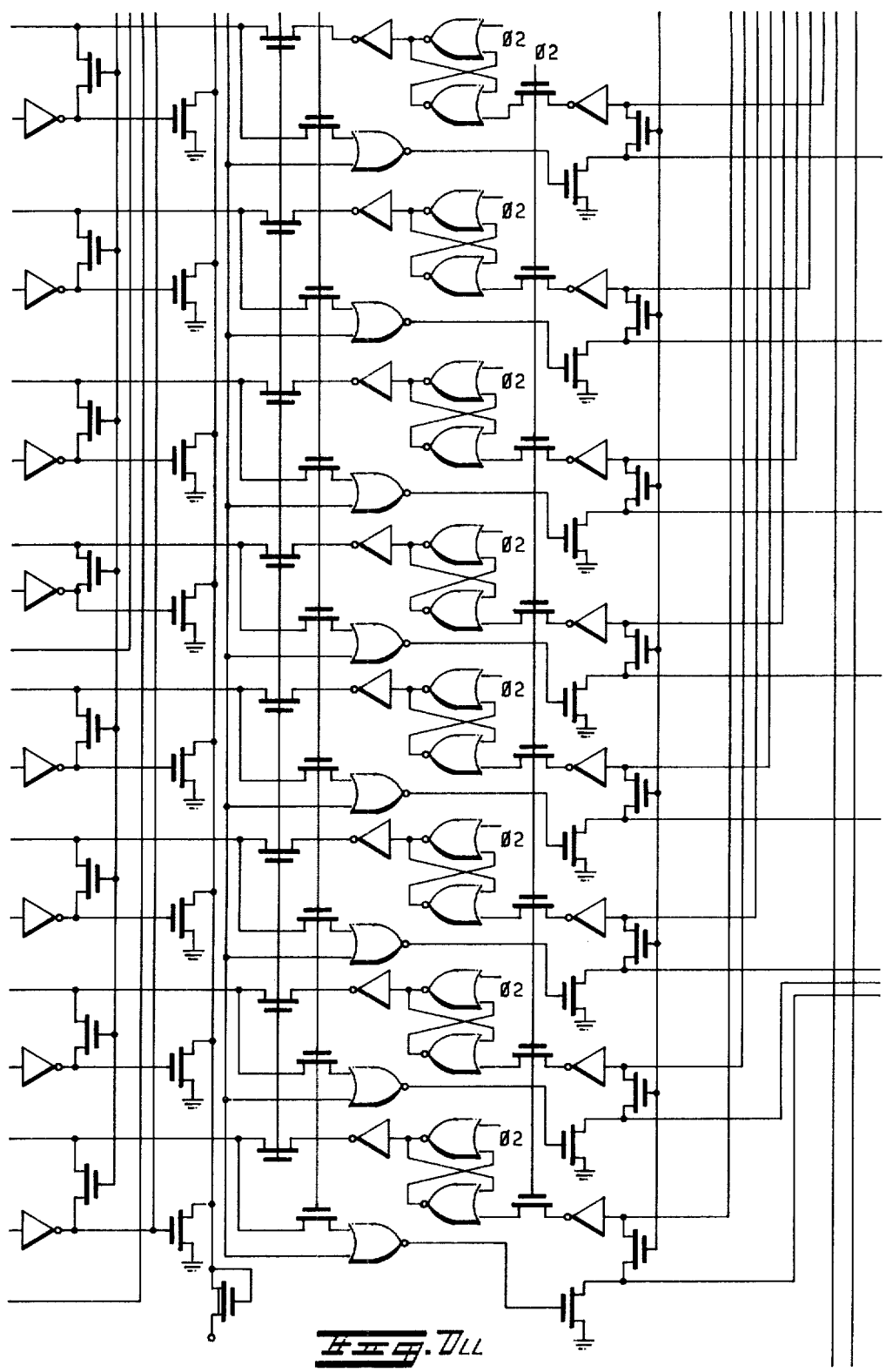

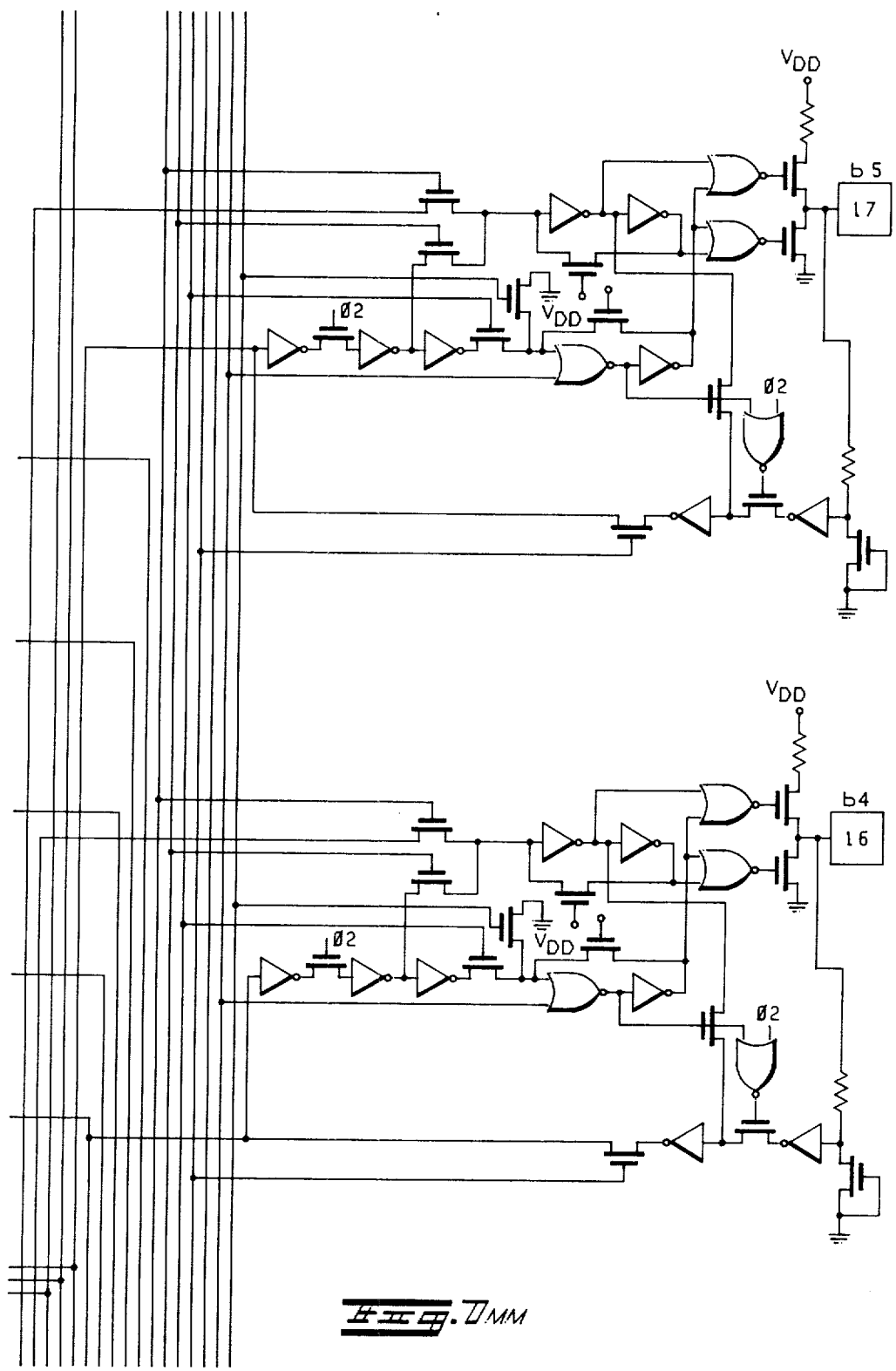

SAMPLE ROM
BIT DETAIL

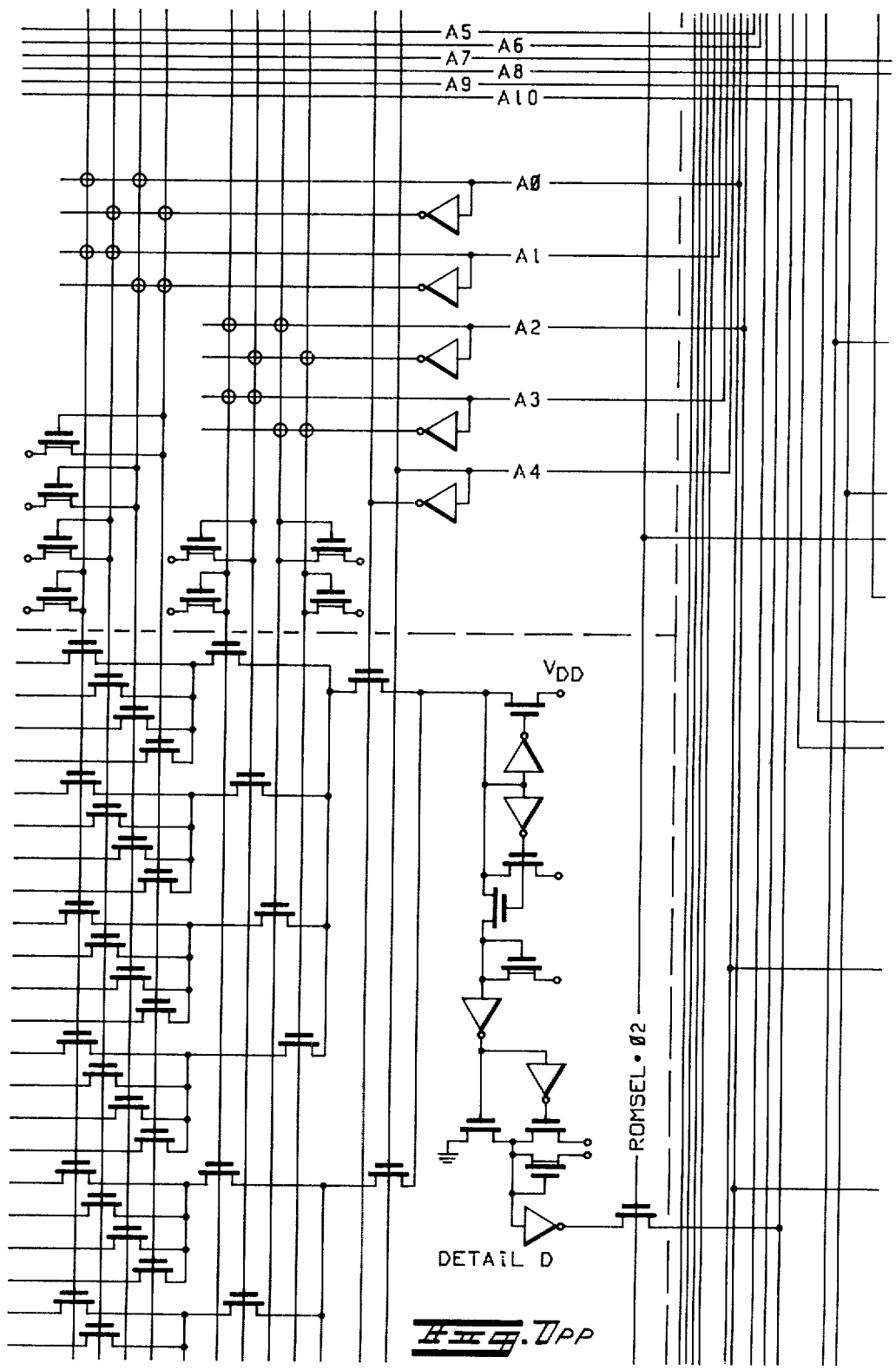

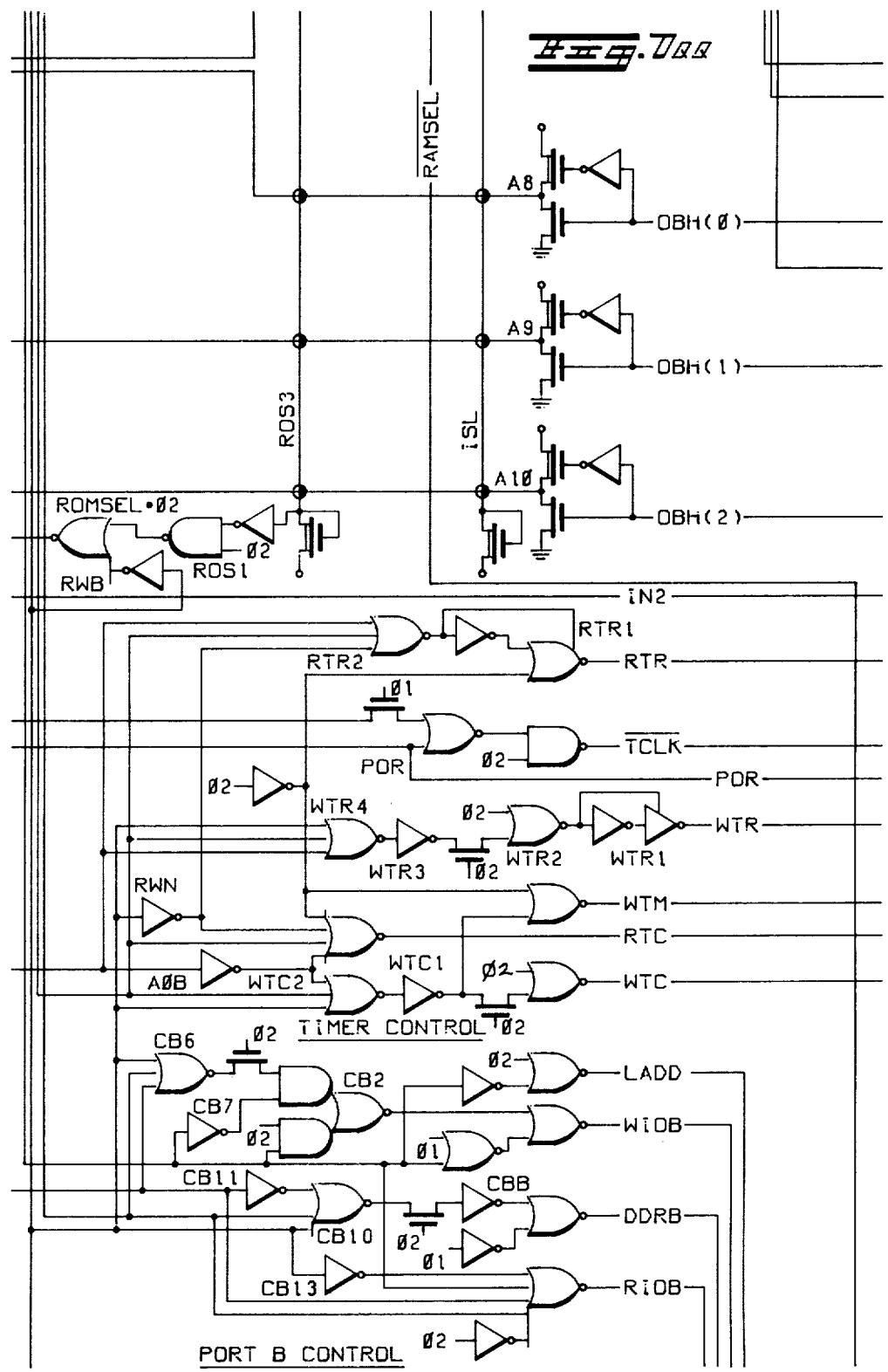

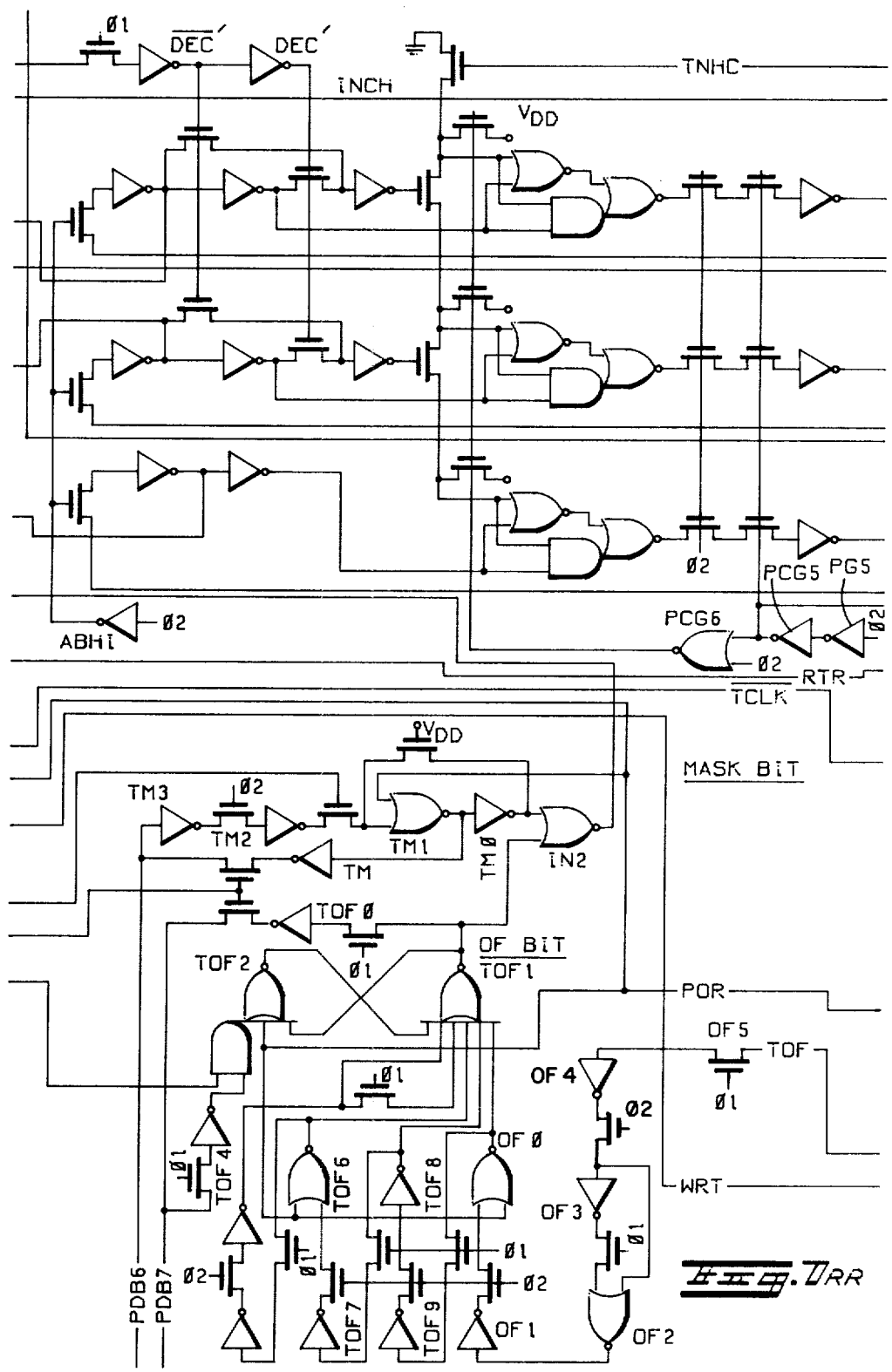

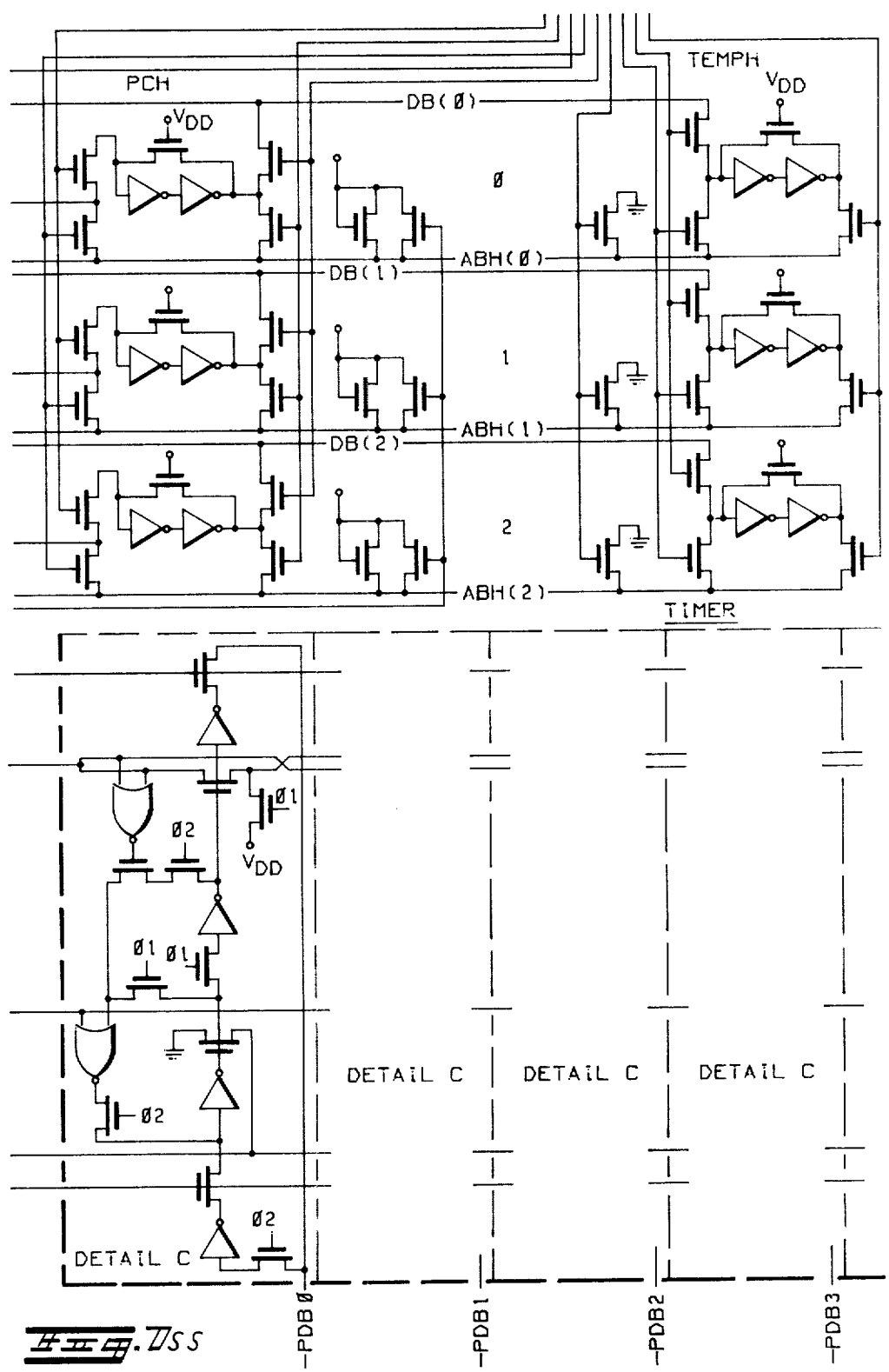

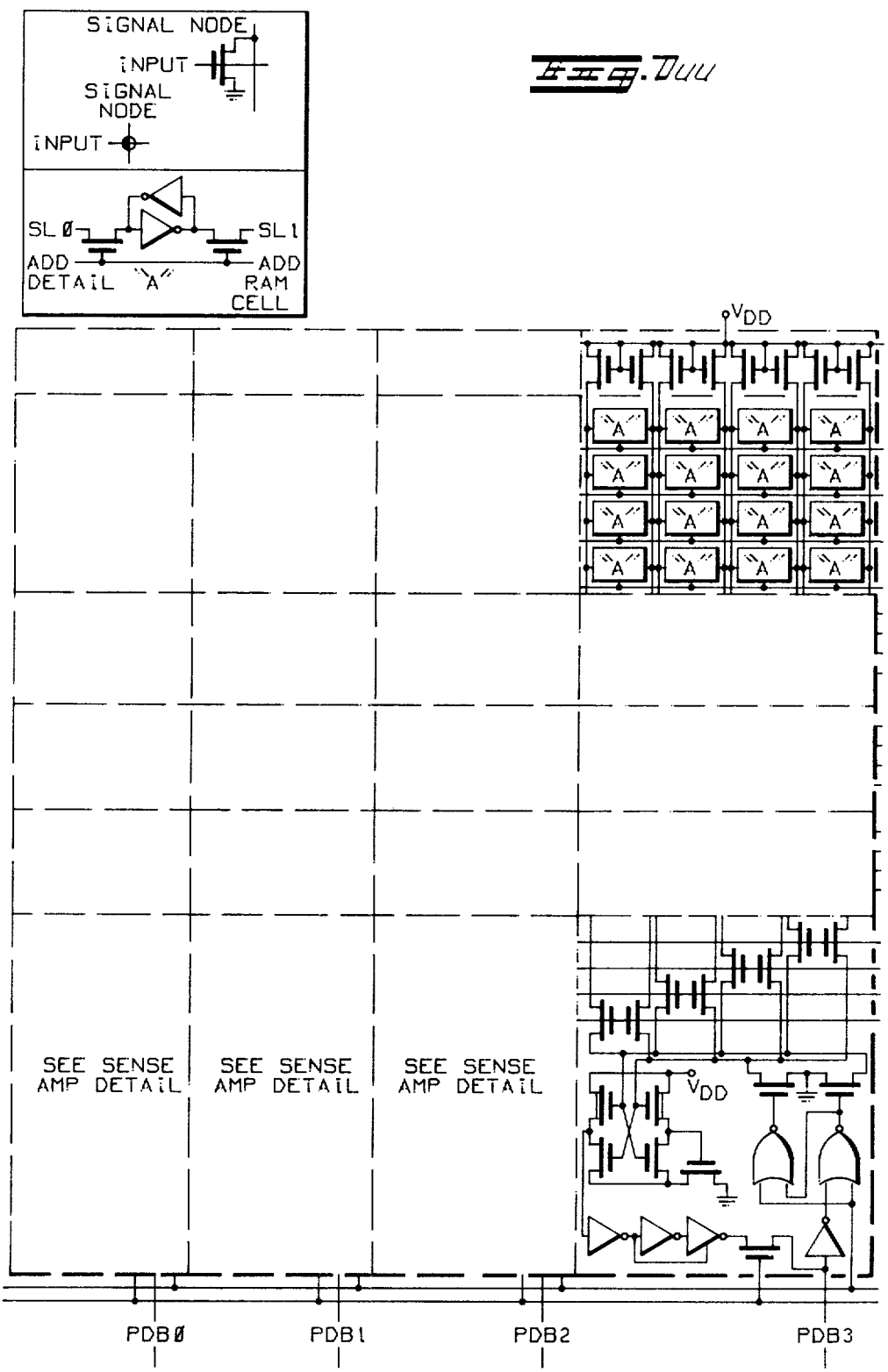

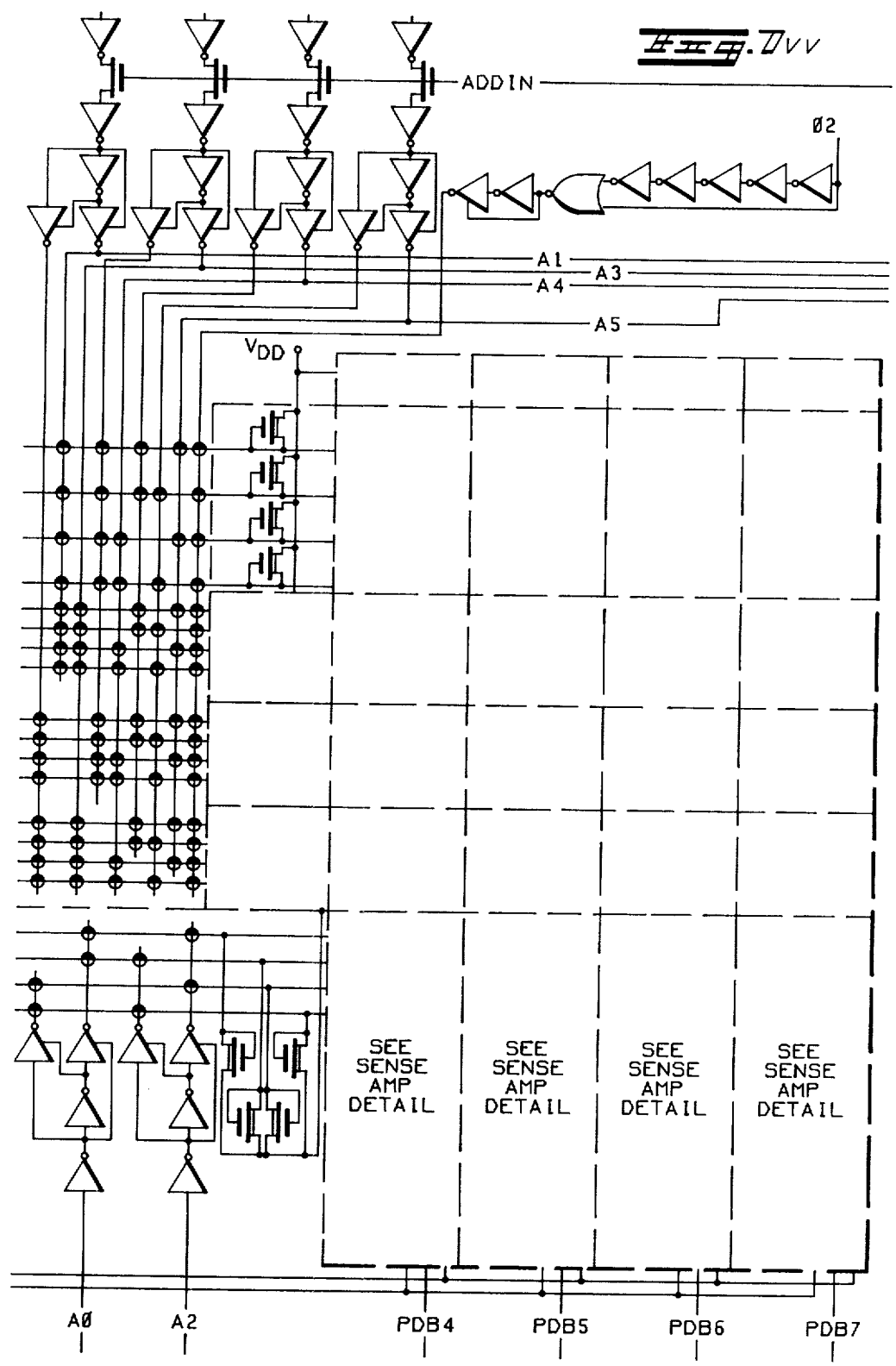

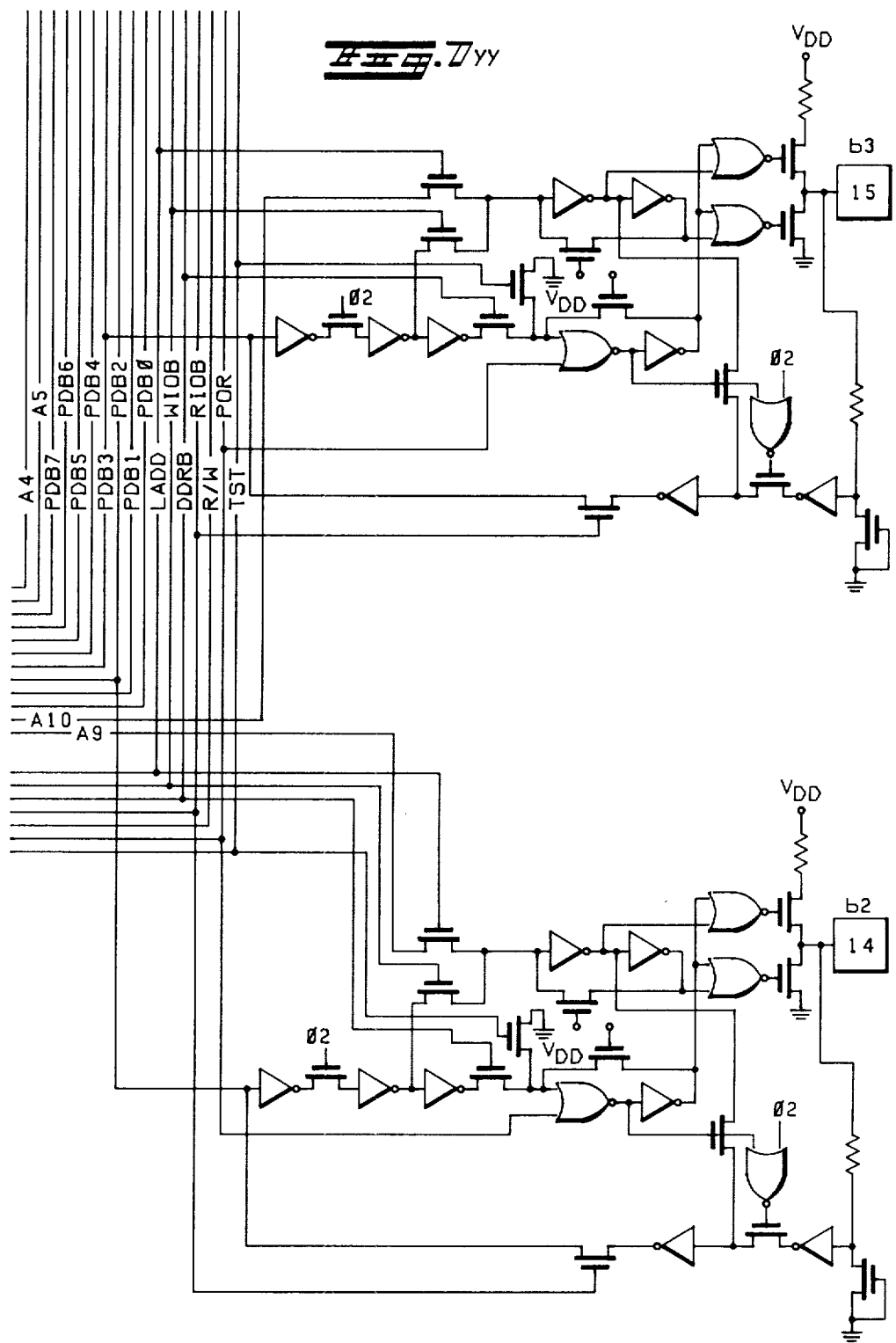

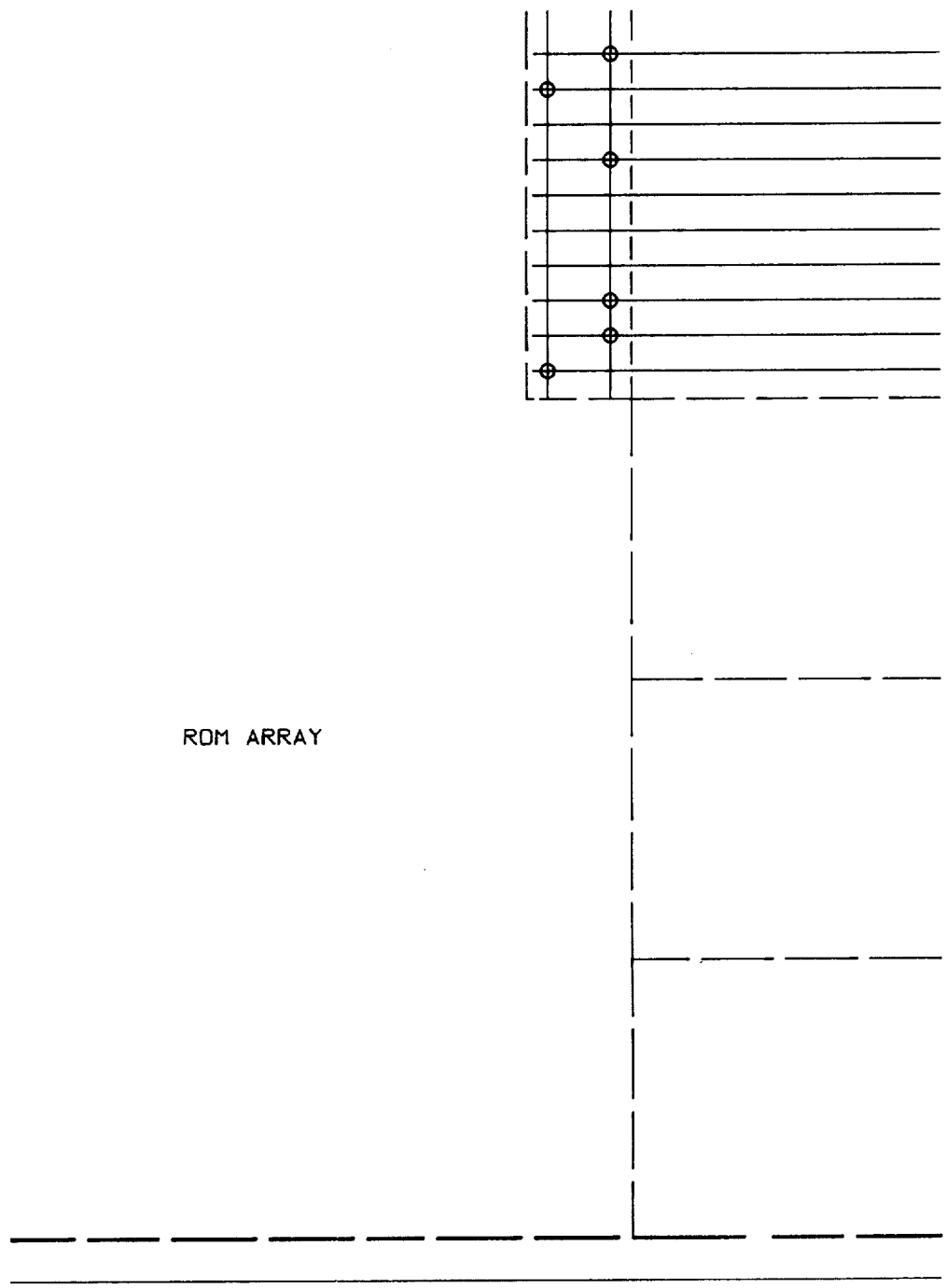
FIG. 7AAA

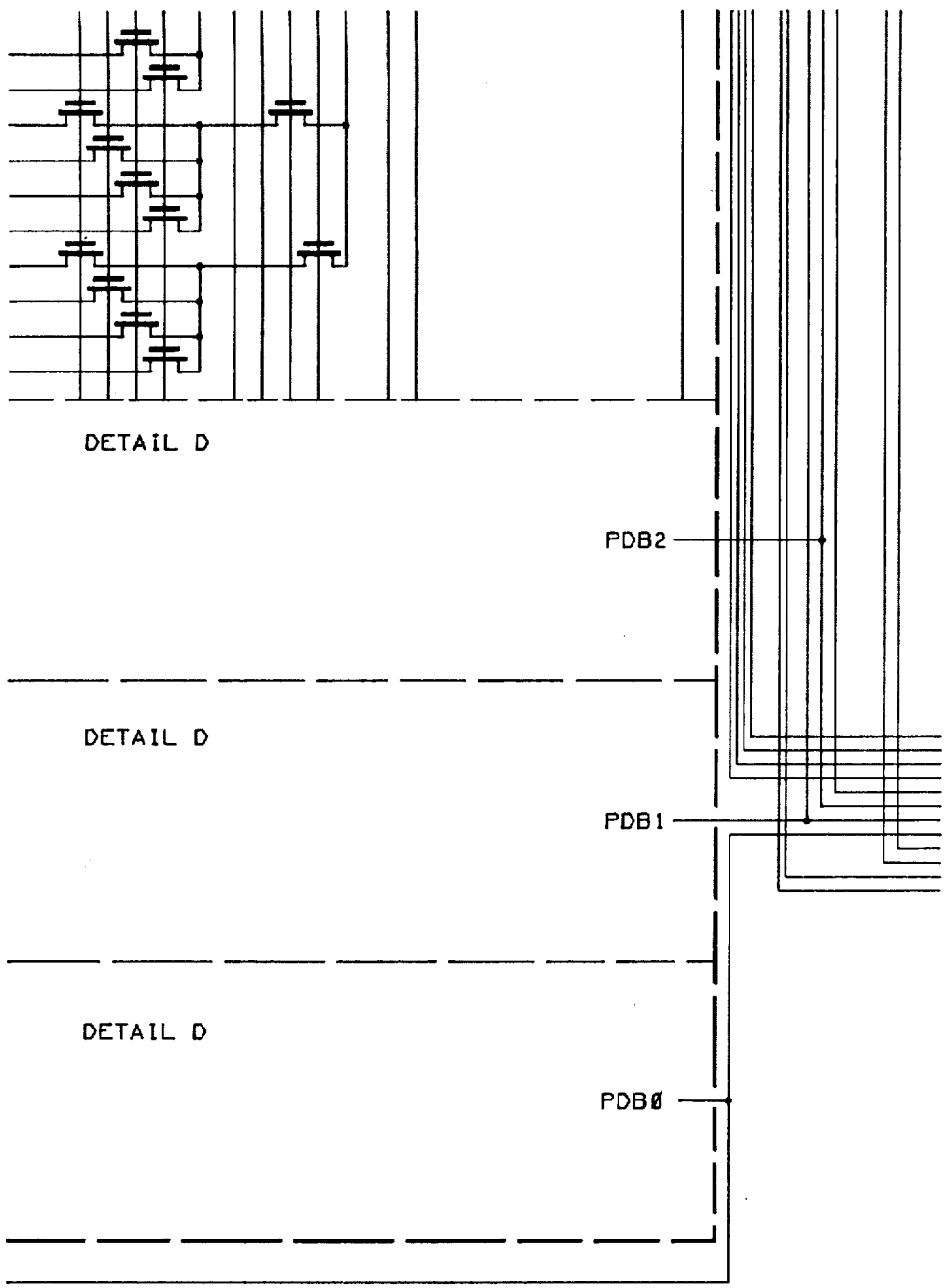

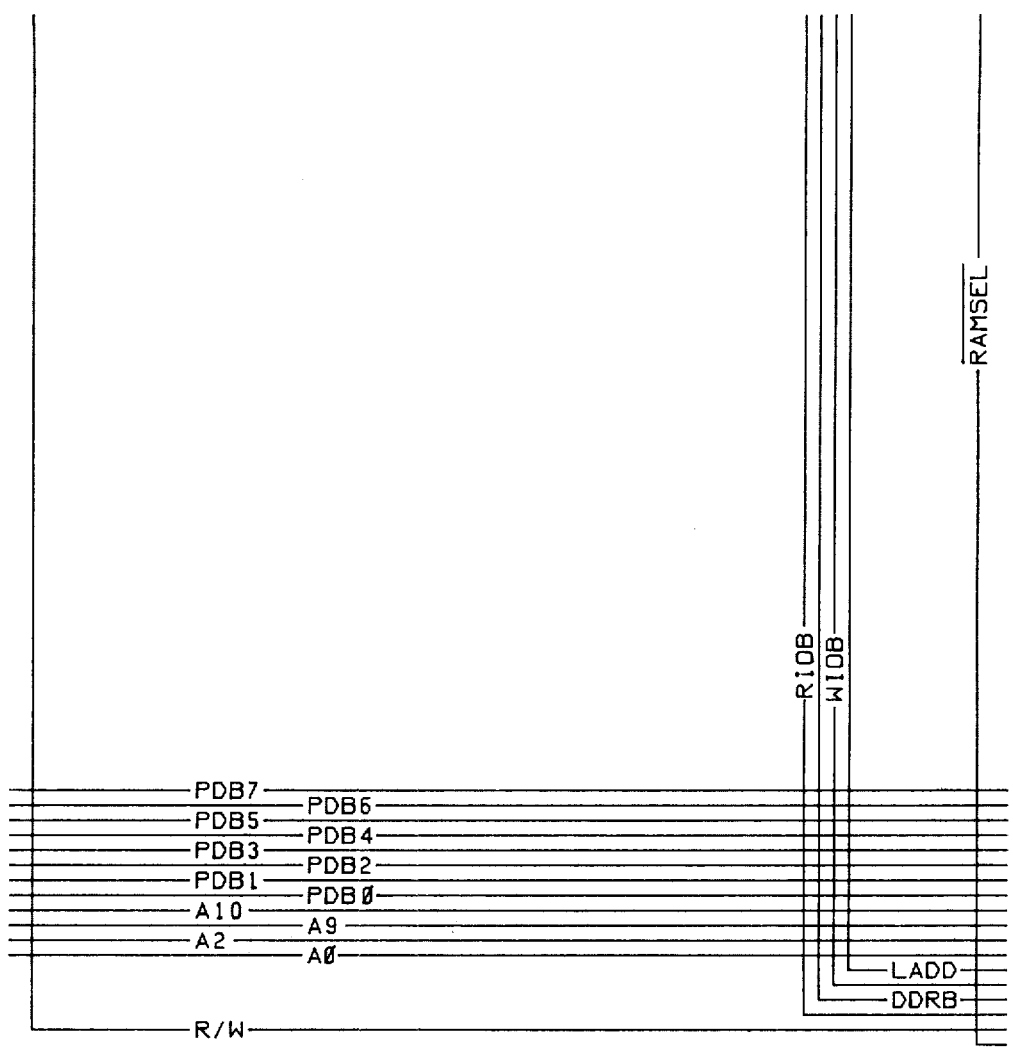
Fig.7ccc

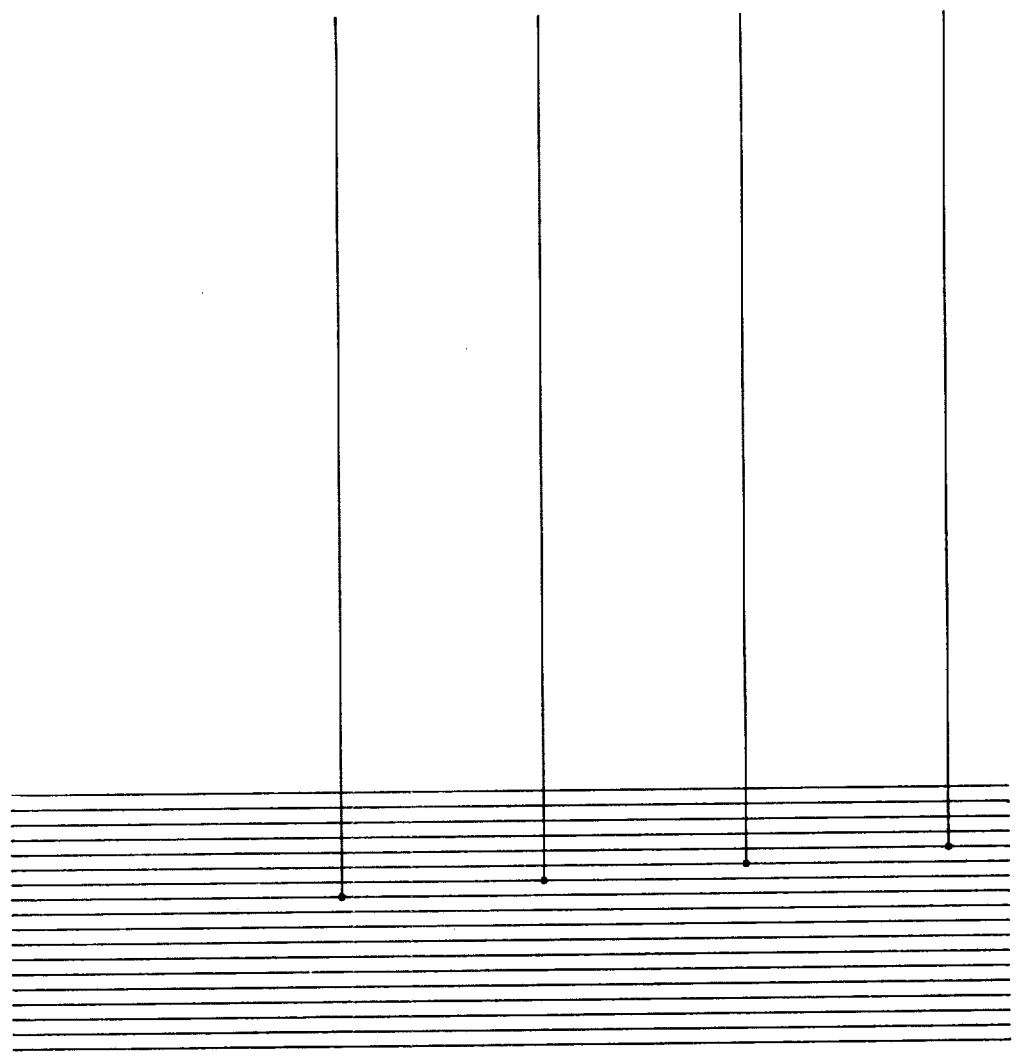
Fig.DEEE

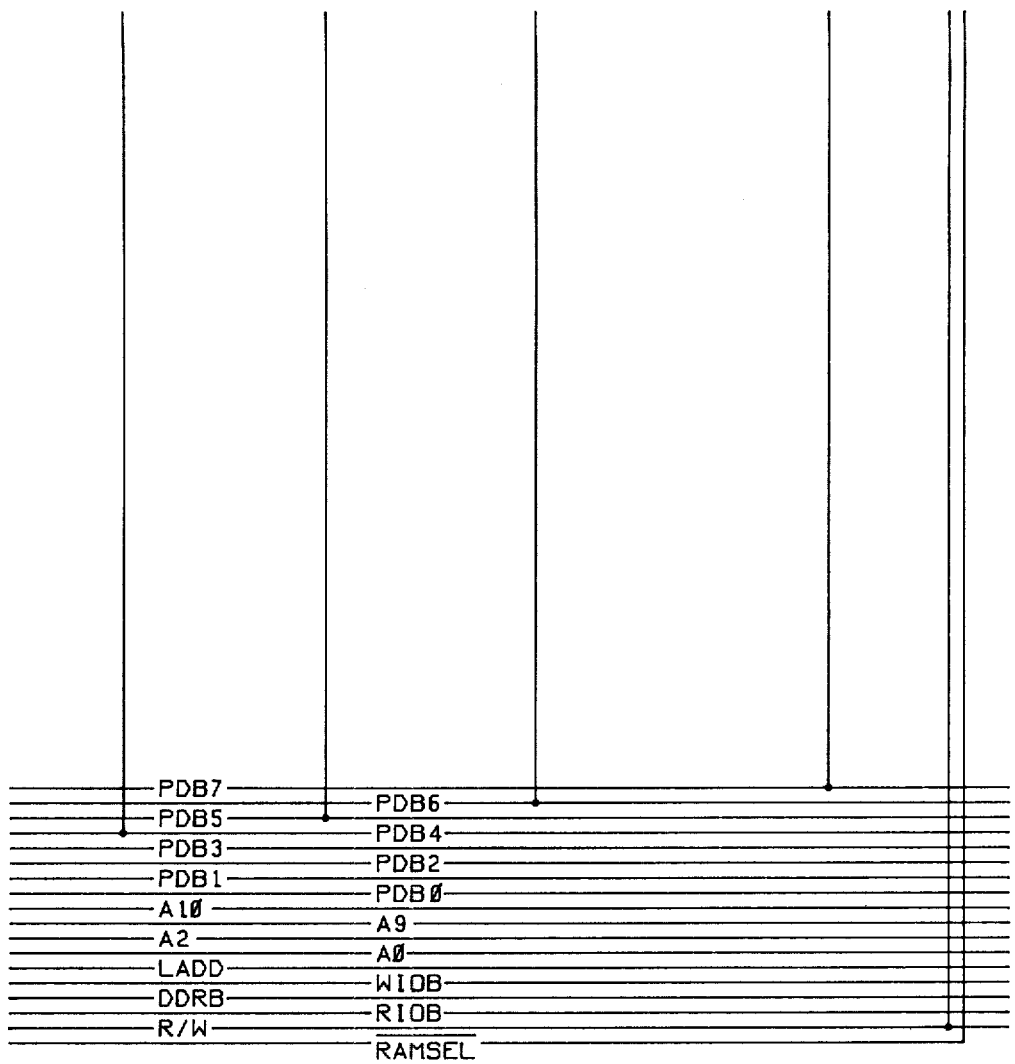
Fig. 17FFF

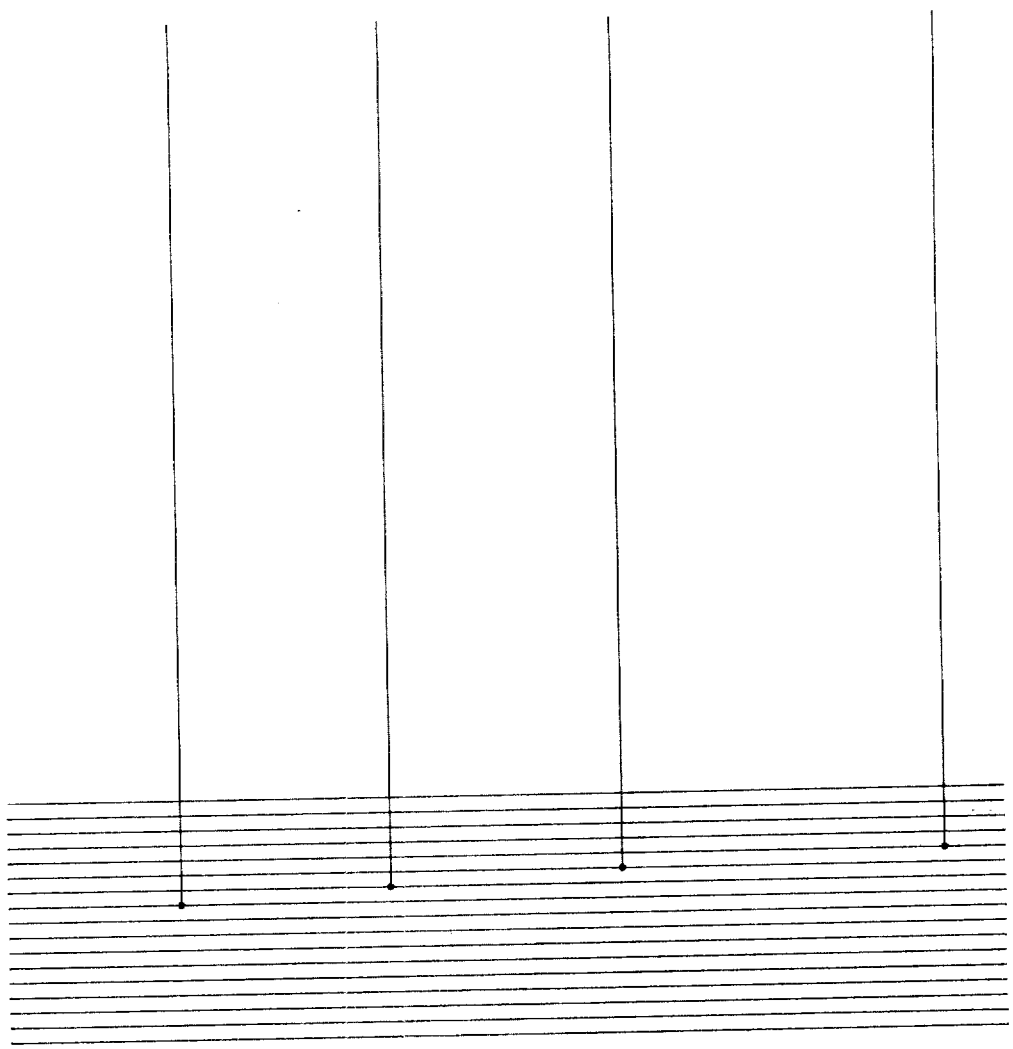
Fig. 7GGG

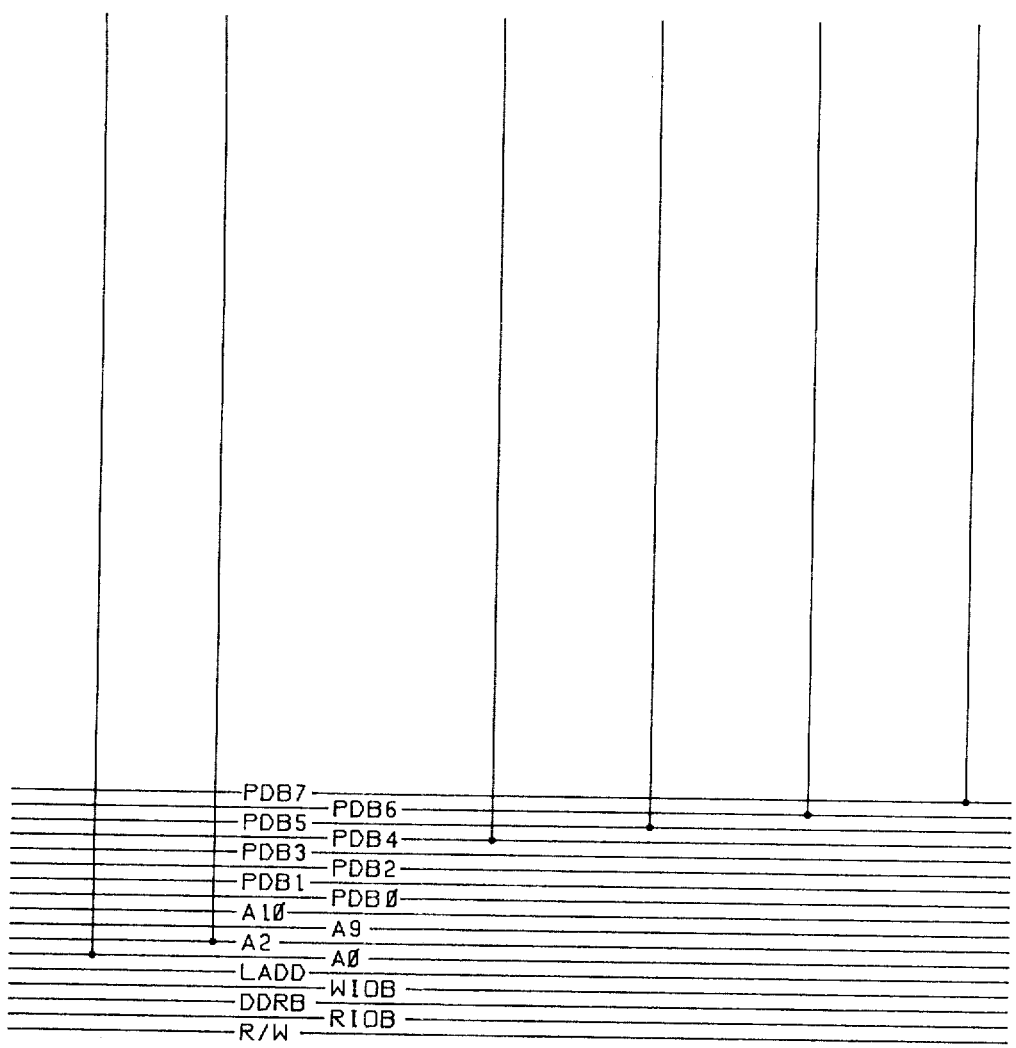
FIG. 7HHH

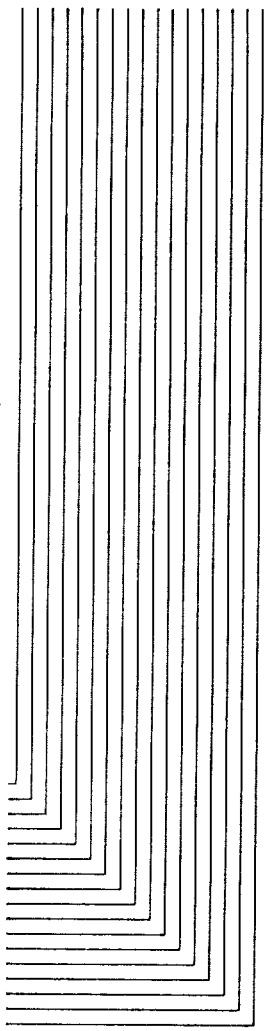
Fig. VIII

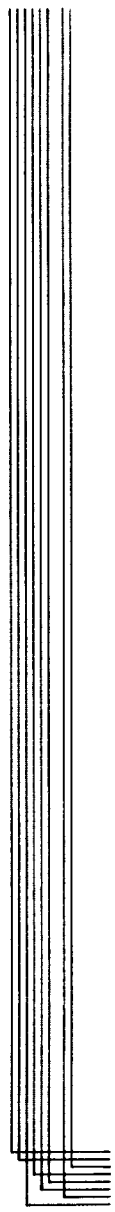

| | | | | |
|---|---|---|---|---|
| | FIG.7YY | FIG.7MM | FIG.7AA | FIG.7P |
| FIG.7E | FIG.7XX | FIG.7LL | FIG.7Z | FIG.7O |
| FIG.7D | FIG.7III | FIG.7MM | FIG.7KK | FIG.7Y | FIG.7N |
| FIG.7C | FIG.7HHH | FIG.7VV | FIG.7JJ | FIG.7X | FIG.7M |
| FIG.7C | FIG.7GGG | FIG.7UU | FIG.7II | FIG.7W | FIG.7L |
| FIG.7B | FIG.7FFF | FIG.7TT | FIG.7HH | FIG.7V | FIG.7K |
| FIG.7A | FIG.7EEE | FIG.7SS | FIG.7GG | FIG.7U | FIG.7J |
| FIG.7A | FIG.7DDD | FIG.7RR | FIG.7FF | FIG.7T | FIG.7I |
| FIG.7JJJ | FIG.7CCC | FIG.7QQ | FIG.7EE | FIG.7S | FIG.7H |
| | FIG.7BBB | FIG.7PP | FIG.7DD | FIG.7R | FIG.7G |
| | FIG.7AAA | FIG.7OO | FIG.7CC | FIG.7Q | FIG.7F |
| | FIG.7ZZ | FIG.7NN | FIG.7BB | | |

| TIME FRAME | | DB | ABH | ABL | INCH | INCL | OBH | OBL | DBI | IR | PCH | PCL | ABL1 | TEMPH | TEMPL | ADDA | ADDB | SUM | C7F |
|---|---|---|---|---|---|---|---|---|---|---|---|---|---|---|---|---|---|---|---|
| GT0 | 02 | D1 | X | Y+1 | X | Y+1 | X | Y+1 | D1 | BRSET4 | X | Y+1 | | | | | | | |
| GT2 | 02 | | 0 | | X | Y+2 | | | D1 | | X | Y+2 | | | D1 | | | | |
| GT2 | 02 | | 0 | | 0 | Y+2 | | | D1 | | | | | | D1 | | | | |
| GT3 | 02 | | 0 | D1 | 0 | D1 | 0 | D1 | | | | | | 0 | D1 | | | | |
| GP50 | 02 | 91 | 0 | D1 | 0 | D1 | | | 91 | | | | D1 | | | | | | |
| GP51 | 02 | EF | 0 | D1 | 0 | D1 | | | 91 | | | | | 0 | | | | | |
| GP52 | 02 | 10 | 0 | D1 | 0 | D1 | | | | | | | 91 | | 91 | | | 10 | |
| GP53 | 02 | | 0 | | 0 | D1 | | | | | | | | | 91 | 10 | 91 | 10 | 1 |
| BCH0 | 02 | D2 | 0 | | 0 | D1+1 | | | D2 | | | | | | | 10 | 91 | 10 | |
| ID2 | 02 | X | Y+2 | X | Y+2 | X | Y+2 | D2 | | X | Y+2 | Y+3 | | | D2 | | Y+3+D2 | |
| ID2 | 02 | | X | Y+3 | X | Y+3 | | | D2 | | X | Y+3 | Y+3 | | | | | | |
| ID3 | 02 | | X | Y+3 | X | Y+3 | | | | | | | | X-1 | X-1,Y+3+D2 | | | | |
| ID3 | 02 | Y+3+D2 | X-1 | Y+3 | X-1 | Y+3 | Y+1 | Y+2 | NEXT OPCODE | | | | Y+3+D2 | X-1 | X-1,Y+3+D2 | | | | |
| | 02 | | X-1 | Y+3+D2 | X | Y+4 | X-1 | Y+3+D2 | | | | | | | X-1,Y+3+D2 | | | | |
| GT0 | 02 | | | | | | | | NEXT OPCODE | | | | | | | | | | |

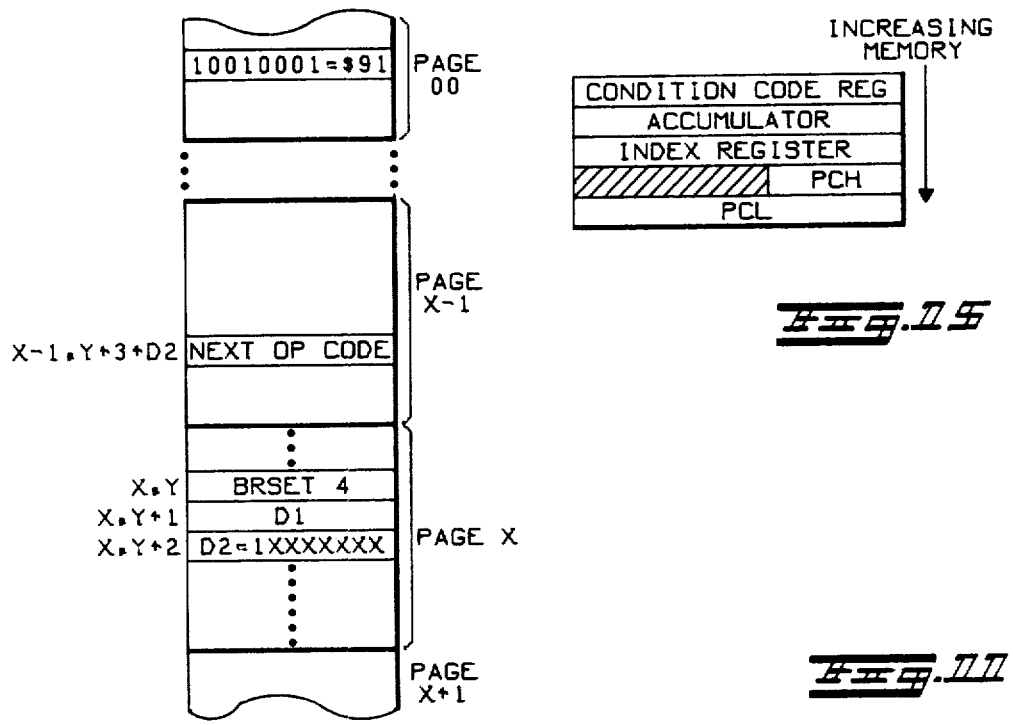
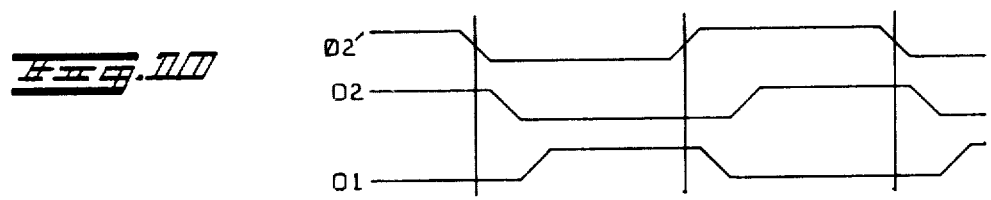
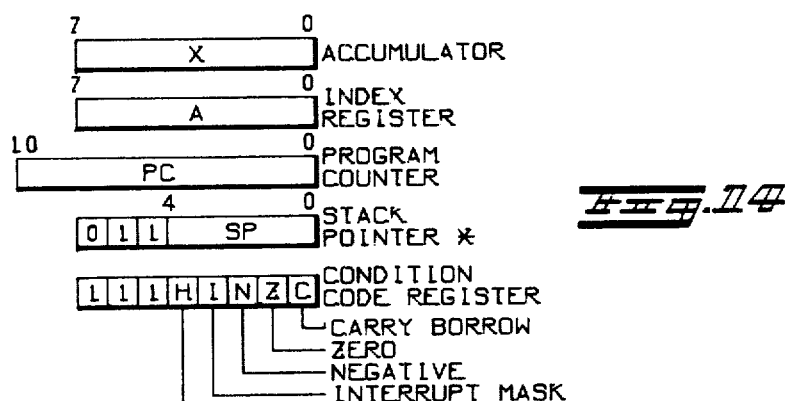
* STACK POINTER IS INITIALIZED TO $7F ON RESET

Fig. 13

| | 0 | 1 | 2 | 3 | 4 | 5 | 6 | 7 | |
|---|---|---|---|---|---|---|---|---|---|
| PORT A | | | | | | | | | $000 |
| PORT B | | | | | | | | | $001 |
| PORT C | | | | | | | | | $002 |
| | | | | | | | | | $003 |
| PORT A DDR * | | | | | | | | | $004 |
| PORT B DDR * | | | | | | | | | $005 |
| PORT C DDR * | | | | | | | | | $006 |
| | | | | | | | | | $007 |
| TIMER DATA REGISTER | | | | | | | | | $008 |
| TIMER CONTROL REGISTER | | | | | | | | | $009 |
| RESERVE | | | | | | | | | $00A |
| I/O OR RAM | | | | | | | | | $03F |
| USER RAM | | | | | | | | | $040 |
| | | | | | | | | | $07F |

* WRITE ONLY REGISTER

Fig. 12

| | 0 | 1 | 2 | 3 | 4 | 5 | 6 | 7 | |
|---|---|---|---|---|---|---|---|---|---|
| I/O PORTS TIMER RAM | | | | | | | | | $000 |
| | | | | | | | | | $07F |
| PAGE ZERO ROM | | | | | | | | | $080 |
| | | | | | | | | | $0FF |
| RESERVE ROM | | | | | | | | | $100 |
| | | | | | | | | | $3BF |
| MAIN ROM | | | | | | | | | $3C0 |
| | | | | | | | | | $783 |
| RESERVED | | | | | | | | | $784 |
| | | | | | | | | | $7F7 |
| INTERRUPT VECTORS | | | | | | | | | $7F8-$7FF |

MICROCOMPUTER WITH BRANCH ON BIT SET/CLEAR INSTRUCTIONS

RELATED INVENTIONS (1) Ser. No. 035,041 filed on even date herewith, Daniels et al entitled Self-Testing Microcomputer and assigned to the assignee of the present invention.

TECHNICAL FIELD

This invention relates generally to the field of data processing and, more particularly, to certain conditional branching instructions of a microcomputer instruction set and the logical implementation thereof.

BACKGROUND ART

Microcomputers are sophisticated, general purpose logic devices which can be programmed to perform a wide variety of useful control functions in industrial and communications equipment, large-scale and medium-scale computer peripheral and terminal hardware, automobiles and other transportation media, amusement and educational devices, household appliances and other consumer goods, and the like. Generally, an entire spectrum of microcomputers is presently available in the commercial marketplace. As the speed of operation, or throughput, of a microcomputer increases, the more valuable and more versatile the microcomputer becomes, since it is able to control a given operation more efficiently and more accurately, or to control a greater number of operations simultaneously, or to control operations requiring relatively fast response times.

The throughput of any given microcomputer is a function of, among other things, the number of machine cycles required to execute a given set of instructions. In the course of designing any computer system, and in particular a microcomputer, a set of instructions is selected which will provide the anticipated programming requirements for the projected market in which the computer system is to be used. The microprocessor, or processor component of a single-chip microcomputer, executes each instruction as a sequence of machine cycles, with the more complex instructions consuming a greater number of machine cycles. The operation of the internal registers and gating circuitry of the microprocessor is synchronized by means of a master clock signal applied to the microprocessor. The master clock signal may actually comprise two or even four clock components; i.e., the microprocessor clock may be two-phase or four-phase. During the basic clock cycle known as the machine cycle, a number of internal processor-related operations may take place simultaneously, including the transfer of digital information from a bus to a register or vice versa, between certain registers, from an address or data buffer to a bus or vice versa, and so forth, or the individual conductors of a bus may each be set to a predetermined logic level, or the contents of a register may be set to a predetermined logic level. The more processor operations occurring within an individual machine cycle the fewer the number of machine cycles required for the execution of a particular instruction. Thus, it is desirable to maximize to the extent possible the number of internal processor operations occurring within a given machine cycle.

It is also desirable, particularly regarding microcomputers intended for marketing in the middle to low end of the price scale, to minimize the microcomputer chip size as much as possible. One major component contributing to the size of the microcomputer chip is the read only memory containing the mask-determinable program or sequence of instructions which controls the operation of the microcomputer in the particular application in which it is to be used. In general, the smaller the physical size of the microcomputer, including the read only memory, the lower the price of the microcomputer.

It is also desirable, especially in the medium to low end microcomputer market, to include in the microprocessor instruction set an instruction for testing the state of a particular bit in the random access memory, or in the read only memory, or in any one of the I/O ports and to branch to a designated location in the instruction sequence if the particular bit is in the desired state. For example, in a microcomputer controlling the operation of an appliance such as a washing machine, a test could be made as to the state of a particular I/O port bit representing the tub fill level. If such bit were determined to be in a state indicating that the tub were filled, a branch could be made to a further memory location in the instruction sequence to an instruction for controlling the further operation of the washing machine, e.g., for starting the agitator.

It is known in the computer art, for example in the instruction set of the IBM 360, to utilize two or more separate instructions to perform a branch if it is determined that a particular bit in a memory location is set to a given desired state. The IBM 360 instruction set includes a "test under mask" instruction in which an 8-bit memory byte may be tested bit-by-bit against an 8-bit mask. Depending upon the outcome of the comparison, a condition code is set to a predetermined state. By means of a sequence branching instruction, conditioned upon the state of the condition code, a branching operation may be performed to another memory location.

The Fairchild F8 microprocessor includes, as one of its branch-on-condition instructions, a BT instruction. One operand of the BT instruction comprises three bits of immediate data (i.e. data which is fixed at assembly time) which is logically OR'd with a three-bit portion of a condition code register known as TMASK. If any resulting bit is a logical "1", an offset contained in an additional operand of the BT instruction is added to the contents of the program counter and a branch is performed to the resulting memory location. The F8 BT instruction has the disadvantage of being based upon a comparison utilizing immediate data rather than upon any desired data (whether fixed or variable) contained at the memory location (ROM, RAM, or I/O port) indicated by one of the operands. As a result such instruction is of limited utility.

The Rockwell PPS-8 microprocessor includes, among its branch-on-condition instructions, BBT and BBF instructions which provide for branching to a memory location designated by one operand if a particular bit in a memory location specified by the contents of a ZX register is set or not set. The BBT and BBF instructions have the disadvantage that the ZX register must be initially loaded by a separate instruction to point to the memory location of the word whose bit is to be tested.

To minimize the cost and increase the throughput of middle to low end microcomputers, it is desirable to provide branch on bit set and branch on bit clear instructions which will provide a branch to a desired location in the instruction sequence depending upon the state of a particular designated bit in a memory word stored either in the RAM, ROM, or an I/O port. It is further desirable that such branching operation be performed in a single instruction execution, since by using a single instruction to designate a branch on bit set or a branch on bit clear operation, the size of the read only memory may be minimized, particularly in the consumer-oriented applications for which middle to low end microcomputers are used. As a result the microcomputer cost is minimized.

BRIEF SUMMARY OF THE INVENTION

It is an object of the present invention to provide branch on bit set and branch on bit clear instructions in the instruction set of a microcomputer.

It is another object of the present invention to provide branch on bit set and branch on bit clear operations in a microcomputer utilizing a minimum of read only memory.

It is a further object of the present invention to provide more efficient branch on bit set and branch on bit clear operations in a microcomputer.

It is yet another object of the present invention to provide a microcomputer in which serial I/O operations may be carried out using branch on bit set and branch on bit clear instructions.

These and other objects of the invention are achieved in accordance with a preferred embodiment of the invention by providing a microcomputer comprising a memory having a plurality of storage locations for storing data and instructions and a processor for executing such instructions, the processor including a program counter, an instruction decoding and control unit, and an arithmetic logic unit, the memory including a first storage location for storing a conditional branch instruction, the conditional branch instruction comprising an op code and a bit number, a first portion designating a second storage location in the memory, and a second portion designating an offset, wherein the instruction decoding and control unit, responsive to the op code and the first portion of the conditional branch instruction, locates the second storage location, wherein the arithmetic logic unit, responsive to the bit number, provides a control signal if the bit in the second storage location corresponding to the bit number is in a predetermined state, and wherein the arithmetic logic unit, responsive to the control signal, combines the offset with the contents of the program counter to provide a memory address whereby if the bit is in the predetermined state a branch is made to the location in the memory specified by the memory address.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a block diagram of a preferred embodiment of the microcomputer in which the present invention is embodied.

FIG. 2 shows a block diagram of the processor of the microcomputer shown in FIG. 1.

FIG. 3 shows the semiconductor chip pin-out arrangement of the microcomputer in which the present invention is embodied.

FIG. 4 shows the op code map for the processor shown in FIG. 2.

FIGS. 5A–5H show an instruction flow chart for the processor shown in FIG. 2. FIGS. 5A–5H each represents a section of the entire instruction flow chart, and the sections fit together in the manner shown by FIG. 6.

FIG. 6 shows the interconnection of the individual drawings of FIGS. 5A–5H.

FIGS. 7A–7EEE each represents a section of the entire detailed logic diagram, and the sections fit together in the manner shown by FIG. 8.

FIG. 8 shows the interconnection of the individual drawings of FIGS. 7A–7EEE.

FIG. 9 is a table useful in describing the operation of the processor of FIG. 2 with reference to FIG. 10.

FIG. 10 is a symbolic representation (memory map) of a portion of read only memory to which access is made by the processor of FIG. 2.

FIG. 11 shows the timing relationship between the $\phi 1$, $\phi 2$, and $\phi 2'$ clocks.

FIG. 12 shows an overall memory map of the microcomputer shown in FIG. 1.

FIG. 13 represents an expansion of that portion of the memory map of FIG. 12 representing the I/O ports, the timer, and the RAM.

FIG. 14 shows a programming model of the microcomputer of FIG. 1.

FIG. 15 shows the stack pointer stacking order of the processor of FIG. 2.

DETAILED DESCRIPTION OF THE INVENTION

TABLE OF CONTENTS

Figure 5E:
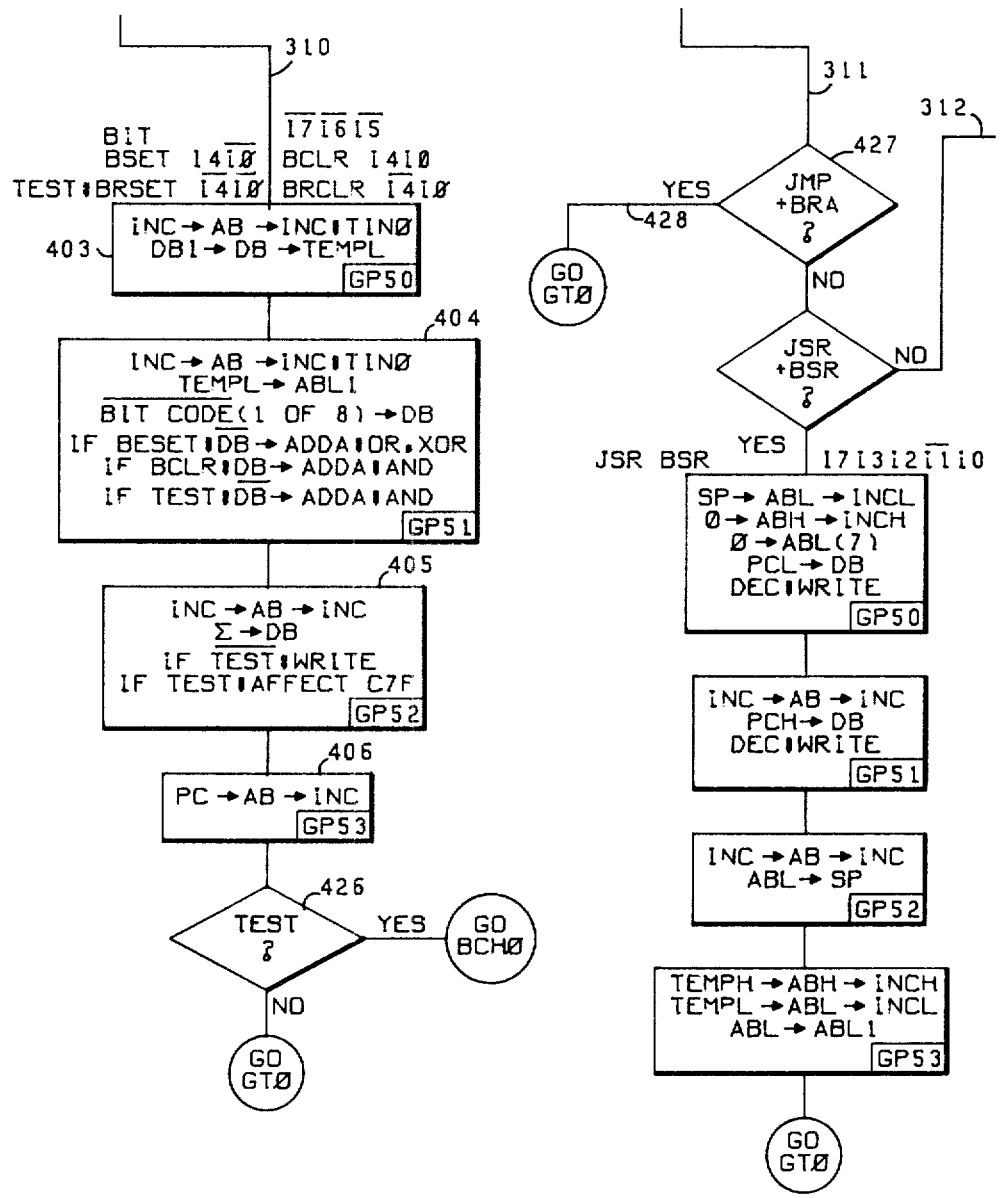
Figure 5G:
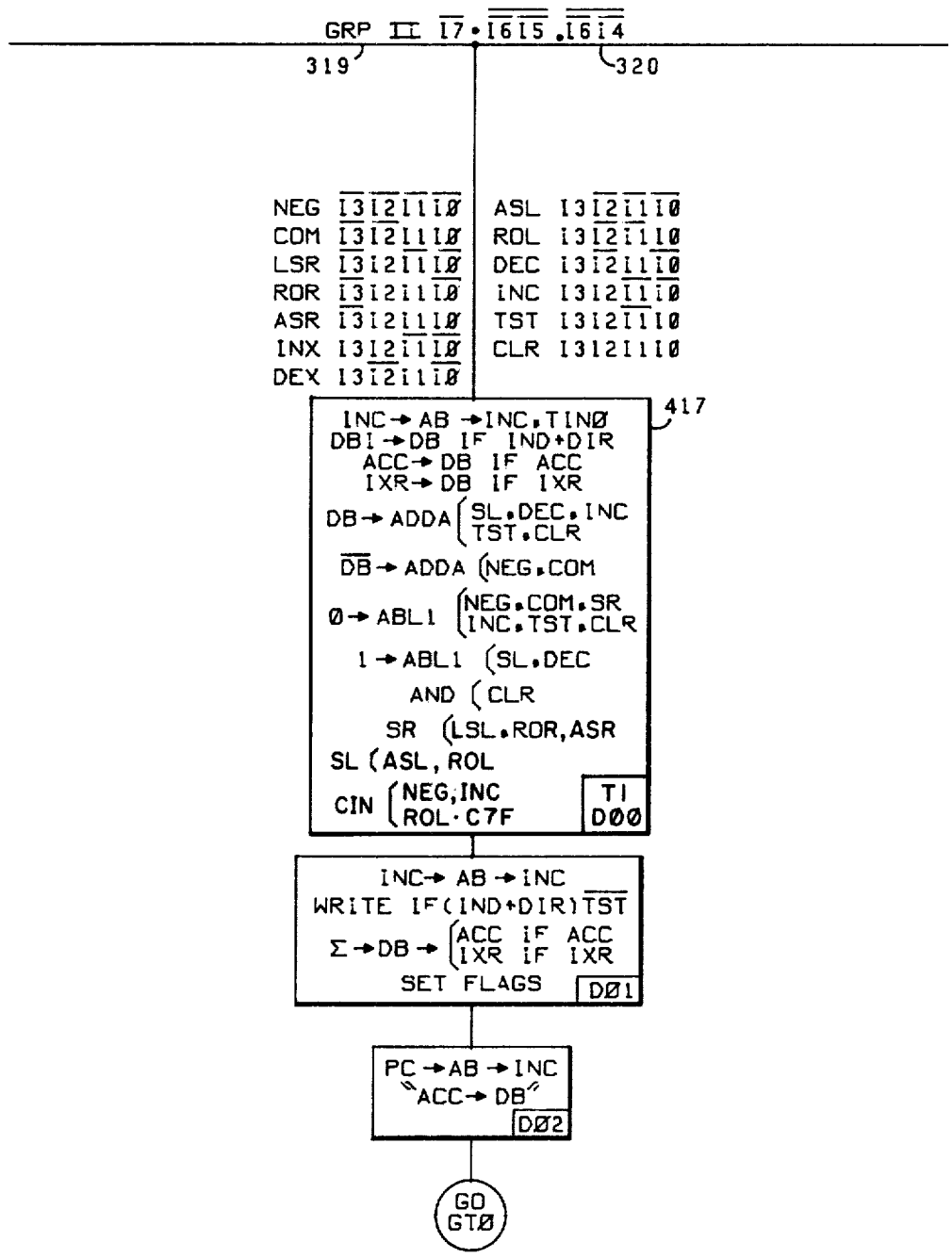
Figure 5H:
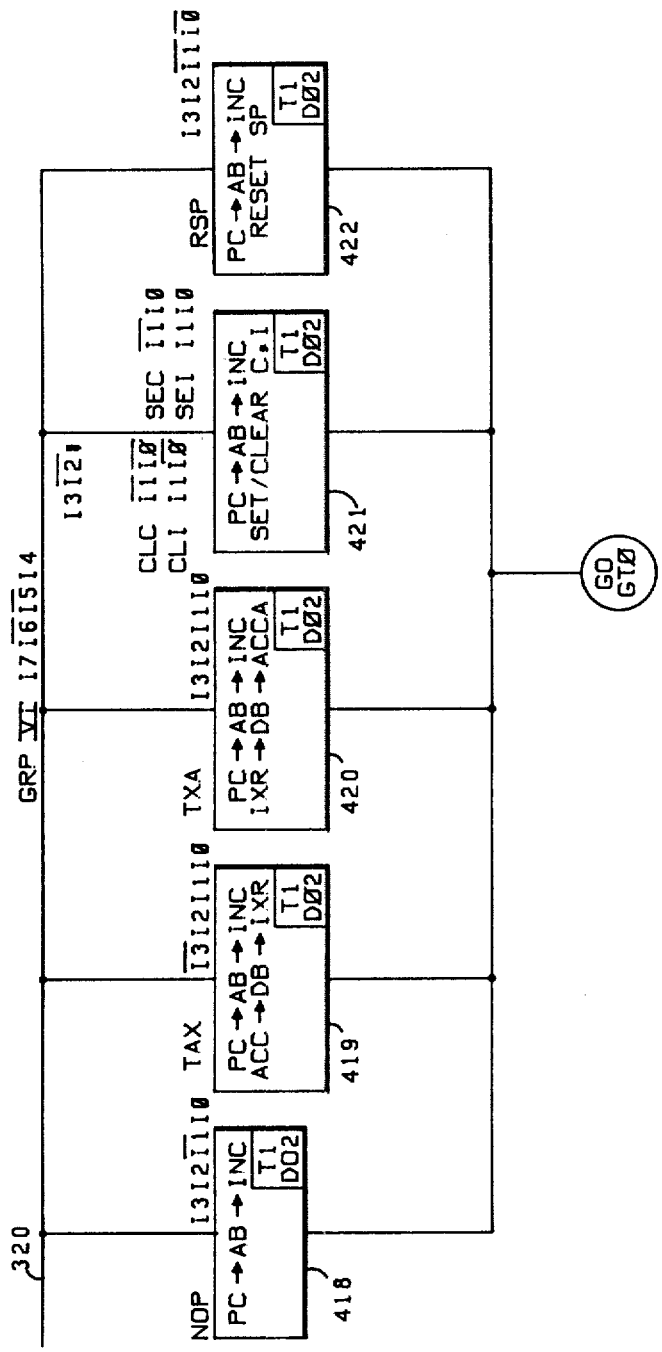

OVERALL MICROCOMPUTER ARCHITECTURE
PROCESSOR ARCHITECTURE
CHIP PIN-OUT
PROGRAMMING INTERRUPTS
INSTRUCTION SET
  ADDRESSING MODES
  BIT MANIPULATION AND TEST INSTRUCTIONS
  BIT SET/CLEAR
  TEST AND BRANCH ON BIT SET/CLEAR
SERIAL I/O OPERATION
INSTRUCTION FLOW CHART
OPERATION OF PREFERRED EMBODIMENT
DETAILED LOGIC DIAGRAM

Overall Microcomputer Architecture

With reference to FIG. 1 a block diagram of the single-chip microcomputer embodying the present invention is shown. It will be understood that the present invention may be implemented in other than a single-chip microcomputer. The microcomputer shown in FIG. 1 represents the Motorola MC6805 microcomputer.

The microcomputer shown in FIG. 1 comprises a central processor unit (CPU) 100, a random access memory (RAM) 110, a read only memory (ROM) 120, a timer control register 130, a timer counter 131, a timer prescaler 132, three I/O ports 140, 150 and 160, and associated data direction logic 141, 151, and 161, respectively, as the major functional blocks. The microcomputer shown in FIG. 1 also comprises an address bus 170, a control bus 180, a peripheral data bus (PDB) 190, and an internal data bus (IDB) 195. CPU 100 receives as inputs thereto an interrupt request signal (INT), a reset (RESET) signal, a test (TEST) signal, a power supply signal ($V_{CC}$), a ground signal ($V_{SS}$), and a connection to external clock-generating circuitry through the XTL and EXTL inputs.

CPU 100 is connected with the other major functional blocks of the microcomputer of FIG. 1 by means of address bus 170, control bus 180, peripheral data bus 190, and internal data bus 195. As will be discussed further below, in the test mode CPU 100 is disconnected from peripheral data bus 190 by means of switch (SW) 197, and data and instructions are received by CPU 100 solely through port A via internal data bus 195. It will be understood that the block diagram of the microcomputer shown in FIG. 1 illustrates only the salient architectural features and reference should be made to the detailed logic diagram of FIGS. 7A–7EEE for the detailed implementation of the major functional blocks and their interconnections.

Ports A and B are 8-bit ports, and port C is a 4-bit port. Port A has I/O lines $a\phi$–a7; port B has I/O lines $b\phi$–b7; and port C has I/O lines $c\phi$–c4. Each of the I/O lines of each port is programmable as either an input or output depending upon the information written into the data direction logic 141, 151, and 161 associated with the respective ports A–C. As will be discussed in further detail below, in the test mode the lines of port B become multiplexed, carrying data when clock $\phi2$ is high and carrying addresses when $\phi2$ is low. Also when clock $\phi2$ is low in the test mode, the lines of port C become address lines and the read/write (R/W) line.

In the presently preferred embodiment of the microcomputer shown in FIG. 1, the random access memory 110 is capable of storing 64 8-bit bytes of information. The read only memory 120 is capable of storing 1216 8-bit bytes of information of which 1100 are available to the user.

A timer prescaler 132 receives the timer input. The microcomputer of the present invention is available in several different mask options. In a first mask option the timer counter 131 is clocked by an internally generated $\phi2$ clock over line 133, and the TIMER signal is used for enabling or disabling the timer counter 131. In a second mask option the TIMER input is the clock source for the timer counter 131. Additional mask options determine whether the clock source is connected directly to the timer counter 131 or is initially scaled down through the prescaler 132 by mask-determinable values between 2 and 128 in $2^n$ increments, where n = 1, 2, . . . , 7.

Processor Architecture

With reference now to FIG. 2, a block diagram of the processor portion of the microcomputer embodying the present invention is shown. FIG. 2 illustrates the general architecture of the processor and defines the structural and functional relationships between the various registers, address buses, data buses, the arithmetic logic unit (ALU), and other internal logic elements used to control the transfer of digital information within the processor.

The processor includes INCL 13, the 8-bit low-order incrementor register; PCL 15, the 8-bit low-order program counter; SP 18, the 5-bit stack pointer register; TEMPL 17, the 8-bit low-order temporary register; IXR 20, the 8-bit index register; and ACCA 24, the 8-bit accumulator register. The processor also includes INCH 12, the 3-bit high-order incrementor register; PCH 14, the 3-bit high-order program counter; TEMPH 16, the 3-bit high-order temporary register; and CCR 30, the 5-bit condition code register.

INCH 12 and INCL 13 form the 11-bit incrementor INC which updates the current program address contained in the 11-bit program counter PC comprising PCH 14 and PCL 15 by incrementing or decrementing its contents. Incrementor INC may also function as an auxiliary register or as as up-down counter or incrementor/decrementor of other registers connected to the address or data buses.

The 11-bit temporary register TEMP comprises TEMPH 16 and TEMPL 17 for temporarily storing digital information within the processor. The stack pointer SP 18 contains the address of the next available location in a push-down/pop-up stack in the RAM 110 (FIG. 1). The 8-bit index register IXR 20 stores digital information utilized in the indexed modes of memory addressing.

Accumulator ACCA 24 is an 8-bit register. The processor also comprises an arithmetic logic unit (ALU) 28 having an A input coupled to data bus 6 and a B input coupled to ABL1 bus 4. ALU 28 generates an output to DB bus 6.

The condition code register CCR 30 is coupled to the ALU 28 as well as to DB bus 6 for temporarily storing various conditions generated by an ALU operation such as carry-borrow (C), result equal to zero (Z), result negative (N), interrupt mask (I), and a half-carry from the least significant four bits of the result (H).

The processor includes a first low-order address bus (ABL), 2, a second low-order address bus (ABL1) 4, and a high-order address bus (ABH) 10 in addition to data bus (DB) 6. Switch SW 3 separates ABL 2 and ABL1 4. The low-order address bus ABL 2 drives output buffers designated generally by OBL 32, which in turn drive eight address bus output lines A0–A7, which form a part of the microcomputer address bus 170 (FIG. 1). The high-order address bus ABH 10 drives a plurality of high-order output buffers OBH 31, which in turn drive address bus output lines A8–10 which also form a part of the microcomputer address bus 170 (FIG. 1).

Processor data bus 46 comprises eight data lines D0–7 driven by data bus out (DBO) buffers 45 and sensed by data bus in (DBI) buffers 47. Data bus 46 is used for transferring data between the processor and the other major functional blocks of the microcomputer shown in FIG. 1. In the test mode, data bus 46 transfers data only between the processor and external processing equipment through port A. DBIR 49 is responsive to data bus 46 for temporarily latching an instruction op code for presentation to instruction register I/R 50. I/R 50 holds the instruction op code which is decoded by Decode And Control Logic 40 during an instruction cycle. Decode And Control Logic 40 generates, with appropriate timing, a plurality of control signals over control lines indicated generally as Register And ALU Control Lines 41 to control the transfer of data between the various registers, buses, and the ALU in accordance with the particular instruction op code contained within the I/R 50. DBO 45 is enabled by a DBE signal over control line 23 from the Decode And Control Logic 40.

I/O Logic 35 is responsive to external signals in the form of RESET, INT and TEST and generates control signals to Decode And Control Logic 40.

The Decode And Control Logic 40 generates a read/write signal (R/W) over line 54, which line may be considered part of the control bus 180 shown in FIG. 1. The R/W signal is used within the microcomputer to write information into or read information from the major functional blocks shown in FIG. 1.

Chip Pin-Out

FIG. 3 provides a schematic representation 200 of the pin-out arrangement of the microcomputer of FIG. 1.

Power is supplied to the microcomputer via the $V_{SS}$ and $V_{DD}$ pins. $V_{DD}$ is $+5.25$ V$\pm 0.5$ V, and $V_{SS}$ is ground.

The XTL and EXTL pins are provided for clocking the microcomputer. They may be connected to a crystal or to an external resistor. Internal divide-by-four circuitry is provided to allow the use of the inexpensive 3.58 MHz color TV crystal for 8.95 KHz operation. The maximum recommended external crystal frequency for the preferred embodiment of the microcomputer is 4 MHz. A mask option is provided in order to match the internal clock oscillator with the selected external component.

The $\overline{\text{RESET}}$ signal is provided for a means of externally resetting the microcomputer. On reset, the stack pointer SP, the timer control register, and the timer counter are initialized, and all I/O lines are set as inputs.

The microcomputer has 20 I/O pins, each of which may be programmed as an input or an output. Port A has eight I/O lines a0–a7. Port B has eight I/O lines b0–b7. Port C has four I/O lines c0–c3. Port B I/O lines b0–b7, when programmed as outputs, are capable of sinking 10 ma on each pin. All I/O lines are TTL compatible both as inputs and outputs. In addition port A is output compatible with CMOS, and port C is input compatible with CMOS. The state of latched output data is correctly readable as input data regardless of the logic level of the I/O pins due to output loading As mentioned above regarding the $\overline{\text{RESET}}$ input, the data direction logic (FIG. 1) associated with Ports A–C is cleared (i.e., set to zero) at power-up/reset time which configures all of the I/O lines as inputs. The user-supplied reset routine then configures the I/O lines either as inputs or outputs by loading the data direction logic from the CPU 100 over PDB 190. Programming a zero into the data direction logic associated with a particular I/O line designates such line as an input, whereas programming a one designates such line as an output.

The external interrupt INT is a maskable input signal. INT is edge-sensitive and internally sets an INT request when there is a negative transition on the INT input pin. When the interrupt mask bit in the CCR is set, the INT signal is latched until the mask bit is cleared. An interrupt request results in a hardware controlled sequence at the completion of the instruction currently being executed, in which the current contents of PCL, PCH, IXR, ACCA, and CCR are stacked in the RAM 110. The stacking order is depicted in FIG. 15. After stacking is completed, the I bit in the CCR is set, and a vectored interrupt service routine is performed. Upon the conclusion of the interrupt service routine, the contents of the CCR, ACCA, IXR, PCH and PCL are restored from the stack.

The INT pin also provides a hardware controlled interrupt service for zero-crossing detection of a 60 Hz AC input. An interrupt is generated for each negative-slope zero-crossing of the AC signal, which interrupt can be used to service time-of-day software.

The TEST input pin, when set high, configures the I/O lines of ports B and C to carry multiplexed address and data information, depending upon the state of the $\phi 2$ clock. The specific configuration of the I/O lines of ports A–C in the test mode will now be given. During $\phi 2$ of the test mode, port A becomes the input data bus and can be used to supply instructions and data to CPU 100. In the test mode, SW 197 disconnects PDB 190 from CPU 100, so that all data and instructions must be entered through port A.

The eight I/O lines of port B are connected to PDB 190 as usual during $\phi 2$ of the test mode. During $\overline{\phi 2}$ of the test mode, lines b0–b7 of port B become address lines AB0–5, 9, and 10. Also during $\overline{\phi 2}$ of test mode, lines c0–c3 of port C become address lines AB6–8 and the R/W line. As a consequence, during $\overline{\phi 2}$ of the test mode RAM 110 and ROM 120 may be accessed externally.

The TIMER input is an external input to the on-chip timer counter 131 (FIG. 1). The timer counter 131 is an 8-bit timer that is initialized by software and counts down towards zero. If the timer interrupt is enabled (i.e., the timer interrupt mask bit 6 is clear and the I bit in the CCR is also clear), an interrupt will occur when the timer counter 131 reaches zero. At this time, the timer interrupt request bit 7 is set in the timer control register 130. The microcomputer hardware responds to the timer interrupt request by saving the machine state on the stack and then fetching an address (2 bytes) from the timer interrupt vector (locations $7F8 and $7F9). Once in the service routine it is necessary for the software to reset the timer interrupt request bit 7 in the timer control register 130. The timer counter 131 continues to count after reaching zero so that the software can determine the length of time since the interrupt by reading the timer counter 131. Reading of the timer counter 131 takes place without disturbing the countdown operation. Should a timer interrupt and an external interrupt (INT) occur simultaneously, the INT has priority over the timer. The timer interrupt request bit 7 will remain set until reset by software. After the INT interrupt routine returns, the timer interrupt may then be processed.

The prescaler 132 extends the maximum timing interval of the timer counter 131. Since prescaler 132 is not readable or writable as is the timer counter 131, a low-end n-bit truncation error exists in using the prescaler 132. At power-up/reset time, the timer interrupt request bit 7 of the timer control register 130 is cleared and the timer interrupt mask bit 6 is set. The timer counter 131 and prescaler 132 are also initialized to all ones.

Programming Interrupts

The microcomputer shown in FIG. 1 has two hardware interrupts and one software interrupt. When an interrupt occurs, normal processing is suspended and an interrupt routine is executed.

One hardware interrupt is the timer interrupt. If the timer mask bit in the timer control word is zero, each time the timer counter 131 reaches zero it will generate an interrupt if the interrupt mask bit in the CCR is also zero. When the interrupt is recognized the current machine state is pushed onto the stack and PC is loaded with the address (two bytes) stored at memory location $7F8, and the I bit in the CCR is set to mask further interrupts. The address at $7F8 is the address of the timer interrupt routine. At the end of the execution of the timer interrupt routine an RTI instruction is executed which restores the machine state and returns to the interrupt program with all registers unchanged.

The external interrupt is the second hardware interrupt. If the I bit in the CCR is cleared (i.e., interrupts enabled) and the INT pin crosses zero on a negative edge, the INT interrupt will occur. Recognition of the INT is much the same as the timer interrupt except that the address of the external interrupt routine is stored at $7FA.

The software interrupt is an executable instruction that resembles the hardware interrupt. When the SWI is executed the machine state is saved on the stack and the vector is fetched from $7FC. An SWI instruction will be executed regardless of the state of the I bit in the CCR. Software interrupts are useful as break points for debugging purposes.

Reset also resembles an interrupt. When reset occurs, the vector which is stored at $7FE is loaded into the program counter. During reset the I bit is set in the CCR, and the timer interrupt mask bit is set in the timer control register 130. Also, the stack pointer is set to $07F. In addition the timer counter 131 and prescaler 132 are set to all ones, and the data direction registers in the data direction logic 141, 151, and 161 are cleared for all I/O ports.

The stacking order occurring during interrupts is as shown in FIG. 15. Since the stack pointer decrements during a push operation, the PCL is stacked first, then the PCH, and so on. Pulling from the stack is in the reverse order. The stack pointer always points to the next free location on the stack.

Instruction Set

The complete instruction set for the microcomputer of FIG. 1 is shown in Table 1. The instructions are grouped according to their function.

Regarding the various types of instructions set forth in Table 1, the register/memory instructions each contain two operands. One operand is inherently defined as either the accumulator or the index register and the other operand is fetched from memory by means of certain permissable addressing modes. The read/modify/write instructions read a memory location or register, modify or test the contents, and then write the modified value back to memory or the register. The branch instructions provide for branches only if a particular condition is met. If the condition is not met, the program sequence proceeds with the next succeeding instruction op code. The branch instructions all utilize the relative addressing mode. The bit manipulation instructions fall into two categories. In the first category a designated bit in memory is either set or cleared. These instructions allow only direct addressing. The particular bit number (0-7) is part of the op code and is therefore inherent. The other category of bit manipulation instructions are those with which the present invention is concerned, namely the branch if bit set or branch if bit clear instructions. For these instructions, the state of any single designated bit in a memory location is tested and a branch is carried out if such bit is either set or clear, depending upon whether the branch on bit set or branch on bit clear instruction, respectively, was used.

The control instructions, which utilize inherent addressing, manipulate condition code bits, control the stack and interrupt operations, transfer data between the accumulator and index register, or perform NOP's.

Addressing Modes

One or more addressing modes are available for each instruction and will now be described. In the following description the term "effective address" (EA) means the address in memory from which the argument for an instruction is fetched or at which it is stored. In some instructions such as ADD (add to accumulator), one of the effective addresses (the accumulator) is inherent and is not considered an addressing mode per se.

In "immediate" addressing, the operand is contained in the memory location following the op code. This mode is used to hold a value which is known at assembly time and which will not be changed during program execution. This is a two byte instruction. In "direct" addressing, the address of the operand is contained in the second byte of the instruction, and the lowest 256 bytes of memory can be directly addressed. The first 256 locations of memory include locations $00-$FF ($is used to indicate a base 16 number), which includes all I/O ports and RAM locations as well as some of the ROM.

In the "extended" mode of addressing the second byte is used as the high-order address of the operand, and the third byte is used as the low-order operand address, the combined 16 bits constituting an absolute address in the memory. Extended addressing can be used to reference any location in memory, including I/O ports, RAM, or ROM. It is a three byte instruction.

In "indexed" addressing, the numerical address is variable depending upon the contents of the index register. Three types of indexed addressing are possible.

(1) In "indexed addressing, no offset", the content of the index register becomes the EA. In this mode EA's can be created pointing to data in the lowest 256 bytes of memory. This mode is usually used in moving a pointer through a table, pointing to a frequently referenced location (e.g. an I/O location), or when the address of a piece of data is calculated by a program. This is a one byte instruction.

(2) In "indexed mode, one byte offset", the EA is calculated by adding the contents of the byte following the op code to the contents of the index register. This mode is useful in selecting the Kth element in an n element table. To use this mode the table must be in the lowest 511 memory locations. This is a two byte instruction.

(3) In "indexed mode, two byte offset", the EA is calculated by adding the contents of the next two bytes following the op code to the contents of the index register. This mode is used in the same manner as indexed mode, one byte offset, except that since the offset is 16 bits the tables being referenced can be anywhere in the memory space. This is a three byte instruction. Since the index register is only 8 bits long and the offsets may be as long as 16 bits, it may be desirable to utilize the offset as a pointer to the table and utilize the contents of the index register as the offset into the table.

In "accumulator" addressing, the instruction specifies the accumulator, and the EA is inherent. This mode requires only a single byte.

In "index register" addressing, the EA is inherent and is the index register.

In "inherent" addressing, the op code itself inherently specifies one or more registers which contain operands or in which results are to be stored.

In "relative" addressing, the contents of the byte following the op code are added to the value of the program counter to produce an EA that is used if and only if a relative branch is to be taken, depending upon whether a particular condition has been met.

In the "bit test and branch" addressing mode, with which this invention is concerned, the data word whose bit is to be tested is located by means of a direct address in the byte following the op code. If the branch condition has been met, the relative addressing mode is used to locate the next instruction. The relative address is determined by adding the contents of the byte (i.e., the third byte) following the direct address (i.e., the second byte) to the program counter to produce the EA which points to the location of the next instruction. Thus the "bit test and branch" addressing mode utilizes a combination of direct and relative addressing modes.

Bit Manipulation and Test Instructions

The bit manipulation and test instructions, with which the present invention is concerned, represent powerful features of the microcomputer shown in FIG. 1. The bit manipulation and test instructions fall into two categories, each of which will be discussed below.

Bit Set/Clear

The bit/clear instructions allow any single RAM or I/O bit in the first 256 words of memory, excluding the data direction registers, to be set or cleared with a single two-byte instruction. Referring to the op code map of FIG. 4 it will be seen that the bit set and bit clear instructions have the following format.

```
7 6 5 4  3 2 1  0
0 0 0 1 | Bit # |S/C
  DIRECT ADDRESS
```

The first byte of the instruction represents the op code, of which the four most significant bits classify the instruction as a bit set or bit clear instruction. The least significant bit determines whether the bit is to be set or cleared. Bits 1–3 are used to designate the location of the particular bit to be set or cleared in the memory word. The second byte in the instruction designates the address of the memory word whose bit is to be set or cleared.

Test and Branch On Bit Set/Clear

The present invention is specifically concerned with those instructions in the instruction set of the microcomputer shown in FIG. 1 which permit testing the state of a designated bit in RAM, ROM, or I/O ports and branching to a designated memory location if the particular condition has been met. The branch on bit set and branch on bit clear instructions are three byte instructions having the following format.

```
7 6 5 4  3 2 1  0
0 0 0 0 | Bit # |S/C
  DIRECT ADDRESS
  BRANCH OFFSET
```

With reference to the op code map shown in FIG. 4, and the above format, it will be seen that the first byte of the instruction represents the op code, of which the four most significant bits designate that this is a test and branch on bit set/clear instruction, bits 1–3 designate the particular bit to be tested, and the least signficant bit determines whether the condition is met by the bit being set or clear. The second byte of the instruction designates the address of the memory word whose bit is to be tested, and such memory word is fetched using the direct addressing mode. The third byte of the instruction designates the branch offset, which is added to the contents of the program counter if the test is successful to give the memory location of the next instruction, using the relative addressing mode. Any bit in the first 256 bytes of memory (see FIG. 12) can be tested and a branch performed if the test condition is met. The C bit of the CCR is set to the state of the bit tested.

It should be emphasized that the branch on bit set and branch on bit clear instructions give the capability of testing and branching while utilizing only a single instruction. In this manner the size of the instruction sequence in the ROM may be minimized, particularly where frequent test and branch operations must be performed, and as a result the overall cost of the microcomputer is reduced, making it more attractive to the ultimate consumer and more profitable to the manufacturer.

Serial I/O Operation

The bit manipulation and test instructions are useful in implementing serial communications between the microcomputer and external equipment. Serial communications between the microcomputer and a plurality of external devices can be implemented by dedicating one I/O line to data source in or data source out, one I/O line to data clock out, and one I/O line as an enable or "handshake" line to each serial device with which communications are to be conducted. Serial input operations can be conducted using the branch on bit set and branch on bit clear instructions. With these instructions, the state of the bit tested is set in the C bit in the CCR. Then by using a rotate left through carry (ROL) or a rotate right through carry (ROR) instruction, the content of the C bit is loaded into the accumulator, memory, or index register as desired.

The rotate left through carry (ROL) instruction performs the following function.

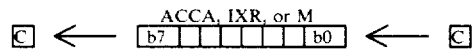

ROL shifts all bits of the ACCA, IXR, or a memory location M one space to the left. Bit b0 is loaded from the C bit of the CCR. The C bit is loaded from the most significant bit b7 of the ACCA, IXR, or memory word M. The selection of the ACCA, IXR, or memory word M is determined by the high-order portion of the ROL op code, as will be seen from FIG. 4.

The rotate right through carry (ROR) instruction has the format shown below.

ROR shifts all bits of the ACCA, IXR, or memory word M one space to the right. Bit b7 is loaded from the C bit of the CCR. Bit b0 is loaded into the C bit of the CCR.

For serial output communications, the bit set and bit clear instructions are utilized to set or clear the particular I/O bit in ports A, B, or C which has been dedicated to I/O data output.

Instruction Flow Chart

With reference now to the instruction flowchart shown in FIGS. 5A-5H, a symbolic representation of the instruction execution sequence is shown which describes the execution of each instruction of the microprocessor instruction set by setting forth the data transfers between the internal registers, buses, ALU, and buffers during $\phi 1$ of each machine cycle. A machine cycle may be defined as one clock period during which time both $\phi 1$ and $\phi 2$ each turn on once in a non-overlapping fashion as shown in FIG. 11. In FIG. 5 each block represents the simultaneous data transfers which occur within one particular $\phi 1$ time frame. Several $\phi 1$ time frames are required for the complete execution of any given instruction from the instruction set.

In FIG. 5 the line connecting successive $\phi 1$ time frames represents the $\phi 2$ portion of the particular machine cycle. During the $\phi 2$ time frame the contents of the incrementor INC may be incremented or decremented by 1 or otherwise altered. Also during a $\phi 2$ time frame a memory word may be accessed from the microcomputer memory in accordance with a corresponding memory address sent out over internal address lines A0-A10 during the previous $\phi 1$ time frame, and such memory word is received over data bus 46 and the data input register DBI 47.

FIGS. 5A and 5B show the top portion of the instruction flowchart. In box 400 the arrows ($\rightarrow$) indicate the transfer of digital information from the particular piece of microprocessor structure (register, bus, buffer or other logic) indicated on the left side of the arrow to the structure indicated on the right side of the arrow. For example in time frame GT0 the data transfer designated INC$\rightarrow$AB$\rightarrow$INC, PC indicates that the contents of the incrementor INC is transferred to the internal address bus AB, whereupon it is transferred back to the incrementor INC as well as to the program counter PC. Whenever data is transferred to the internal address bus AB, whether ABH or ABL, or both, it also appears at the corresponding address output buffer, OBH 31 or OBL 32, respectively, from where it is sent out over address lines A0-A10 to either RAM 110 or ROM 120.

From time frame GT0 the microprocessor operation proceeds to the appropriate T1 time frame, depending upon the particular addressing mode designated by the instruction op code. For example, the internal operation proceeds with the sequence described in box 410 if the extended addressing mode is designated. Box 401 begins the sequence for the direct, indexed, or bit addressing modes. Box 407 begins the sequence for a branch operation, and so on. Within the particular addressing mode the internal processor operation proceeds through the sequence of $\phi 1$ time frames indicated until a decisional box or a return symbol is encountered. The return symbol designates whether return is to be made to time frame GT0 or to a particular T1 time frame.

With further reference to the flowchart of FIG. 5, the internal processor operations associated with the branch on bit set and branch on bit clear instructions will be described below in detail. However, to enable one skilled in the art to better understand the instruction flowchart of FIG. 5, the lay-out and nomenclature of FIG. 5 will be further described.

Each block in FIG. 5 has in its lower right-hand corner a smaller block with at least one symbol therein, for example, GT0, T1 GT1, T1 BCH0, etc. The symbols GT0 and T1 designate the start of certain operational sequences shown in FIG. 5 and are thus referred to by the "return" symbols at the conclusion of each sequence of processor operations represented in FIG. 5. The other alpha-numeric symbols in the smaller blocks of FIG. 5 represent the names of time frames at which the data transfers designated in their corresponding larger blocks occur. Control signals which are given corresponding alpha-numeric designations are generated by the Decode and Control Logic 40 of the microprocessor and provide enabling signals to the various gating circuitry to carry out the desired data transfers. The alpha-numeric designations in the little blocks of FIG. 5 correspond to signals of identical designation indicated in the detailed logic diagram of FIG. 7. It should be understood that the control signals generated by the logic circuit of FIG. 7 corresponding to a particular time frame of FIG. 5 are actually generated one machine cycle later than shown by the particular block in FIG. 5.

By way of further assistance to one of ordinary skill in understanding the instruction flowchart of FIG. 5, whenever digital information is indicated as being transferred to DB bus 6, it may be assumed that it is also transferred to DB0 45. In addition, when digital information is transferred to ABL1 4, it may be assumed that it is also transferred to the B input to ALU 28.

In FIG. 7, all internal buses are precharged to their high state during the $\phi 2$ time frame. In FIG. 5 the term DEC=0 indicates that both the INCH and INCL registers increment, whereas the expression DEC=1 indicates that both the INCH and INCL registers decrement. The expression TIN$\phi$=0 indicates that INCL increments (or decrements as the case may be ) by 1. The expression TIN$\phi$=1 indicates that INCL does not increment (or decrement), i.e., its output equals its input. The expression TINH=0 indicates that the INCH register increments (or decrements) only if the INCL register overflows. The expression TINH=1 indicates that the INCH register increments (or decrements) regardless of whether the INCL register overflows. The use of the terms DEC, TIN$\phi$ or TINH on the instruction flow chart means that the state of the term is assumed to be equal to one.

An op code map for the microprocessor of the present invention is shown in FIG. 4. For a given 8-bit instruction, the most significant bits (MSB's ) are indicated along the top of FIG. 4, and the least significant bits (LSB's ) of the instruction are indicated along the left-hand side of FIG. 4. In the instruction flowchart shown in FIG. 5 and in the detailed logic diagram of FIG. 7, a particular instruction, or a portion thereof, may be represented symbolically in the form I7 I6 I5 I4 I3 I2 I1 I0. In this representation, the highest order bit, for example, is assumed to be a 1 if represented by I7 and is assumed to be 0 if represented by $\overline{I7}$. The hexadecimal symbols located along the sides of FIG. 4 are useful in translating between instructions represented in binary form or hexadecimal form. For example the instruction $\overline{I7}$ $\overline{I6}$ $\overline{I5}$ $\overline{I4}$ I3 $\overline{I2}$ $\overline{I1}$ $\overline{I0}$ (the Branch If Bit 4 Set instruction) may be represented in binary form as 00001000. The hexadecimal symbol for the most significant byte is 0, and the hexadecimal symbol for the least significant byte is 8, so the BRSET 4 instruction may be represented hexadecimally as 08.

Operation of Preferred Embodiment

The execution of the BRSET 4 instruction will now be described in detail with reference to the instruction flowchart of FIG. 5. Referring first to time frame GT0 in FIG. 5A, the following data transfers occur:

LOAD I/R  (1)

INC →AB→INC, PC  (2)

The first data transfer (1) is the loading of the instruction register I/R 50 with the BRSET 4 op code contained in the first byte of the BRSET 4 instruction. With reference to FIG. 10, a memory map is shown in which several 8-bit memory locations are symbolically represented in the microcomputer memory space to which memory accesses are made by the microprocessor by means of memory addresses sent out over address lines A0-A10.

The memory map of FIG. 10 shows the BRSET 4 instruction to be located in page X of memory. Also shown in FIG. 10 is a portion of a succeeding page X+1, a preceding page X−1, and a portion of the first page 00. A particular 256-word page in the microcomputer memory space is designated by address bits A8-A10. The particular word within the designated page is selected by address bits A0-A7. Let us assume that the BRSET 4 op code is stored at an arbitrary location Y in page X. The high-order address byte will then be X and the low-order address byte will be Y. Symbolically, the address of the BRSET 4 op code is X, Y. The Branch On Bit Set instruction is a three-byte instruction occupying words Y, Y+1, and Y+2 in page X. The second byte of the instruction, stored at location X, Y+1, is designated D1 and represents the location of the memory word whose bit is to be tested. In the present embodiment such memory word must be located in the first page 00 of memory. In the present example let us assume that the content of memory location 0,D1 is 10010001 (i.e., $91, using hexadecimal notation). It will be noted that bit 4 of such word is in fact set.

The third byte of the BRSET 4 instruction, located at X, Y+2, represents the offset D2 which is to be added to the contents of the program counter PC to give the memory location of the succeeding instruction in the event that the branch condition has been met. The third byte D2 is represented in two's complement form. In the present example, it is assumed that the sign bit, bit 7, of D2 is a one, indicating that D2 is a negative number and that a negative branch will occur. It is also assumed that the magnitude of D2 is such that if D2 is added to the contents of the program counter PC a negative branch will result back into page X−1 to location X−1, Y+3+D2 to the next instruction op code.

During the second data transfer (2) the contents of the incrementor, INCH and INCL, are transferred to the internal address buses, ABH and ABL, respectively. During the $\phi2$ time frame immediately preceding the GT0 time frame it will be understood, as mentioned earlier, that the incrementor INC has been incremented by 1. Since the original contents of the incrementor INC during the $\phi1$ time frame preceding time frame GT0 were X,Y corresponding to the memory address of the BRSET 4 instruction, the incremented contents of incrementor INC is X, Y+1 at the beginning of time frame GT0. Reference may be made to FIG. 9, which indicates the information appearing on the buses and within the registers and buffers at each of the $\phi1$ and $\phi2$ time frames during the execution of the BRSET 4 instruction. When the contents X, Y+1 of INC are transferred to AB in data transfer (2) they are also transferred to output buffers OBL and OBH to initiate the fetching of the information stored at memory address X, Y+1. Also during data transfer (2) the digital information X, Y+1 on AB is transmitted back to INC and is also transmitted to PC. During the $\phi2$ time frame succeeding time frame GT0 the incrementor, i.e., INCL, is incremented by 1 to the value Y+2. In addition, the contents D1 of memory location X, Y+1 is fetched from memory and placed in the data input buffer DBI 47.

The next BRSET 4 time frame is box 401 labelled T1 GT2. Since the BRSET 4 instruction op code is represented symbolically as $\overline{I7}\,\overline{I6}\,\overline{I5}\,I4\,I3\,\overline{I2}\,\overline{I1}\,\overline{I0}$ the condition of entry into box 401 (i.e. $\overline{I7}\,\overline{I6}\,\overline{I5}$) has been met. The relevant data transfers occurring during time frame T1 GT2 are the following:

TEMPH→ABH→INCH  (3)

DB→TEMPL; TIN$\phi$  (4)

If BIT: DBI→DB; INC→PC  (5)

If $\overline{\text{EXT}}$: $\phi$→ABH  (6)

During data transfer (3) the contents of TEMPH are transferred to ABH. But during data transfer (6) ABH is forced to all 0's, since an extended address mode was not indicated by the op code. Thus the quantity 0 is transferred to ABH and from there to INCH during data transfer (3) and (6). During data transfer (4) the data D1 at DBH 47 is transferred to TEMPL. The designation TIN$\phi$ indicates that during $\phi2$ of this machine cycle INCL is inhibited from incrementing. Since the particular op code under consideration is a bit test op code, data transfer (5) provides for the transfer of the contents D1 of DBI 47 to DB 6 and for the transfer of the contents X, Y+2 of INC to PC.

Box 402 labelled GT3 provides the next data transfer as follows:

INCH→ABH→INCH, TEMPH  (7)

TEMPL→ABL→ABL1→INCL  (8)

TIN$\phi$ if $\overline{\text{JMP}}$  (9)

During data transfer (7) the contents 0 of INCH are transferred to ABH and back to INCH as well as to TEMPH. During data transfer (8) the contents D1 of TEMPL are transferred to the eight conductors of ABL and from there to the eight conductors of ABL1 and into INCL. Transfer (9) indicates that INCL is inhibited from incrementing during $\phi2$ of the GT3 machine cycle since the current instruction is not a Jump (JMP) instruction. Also during $\phi2$ of the GT3 machine cycle the data $91 stored at memory location 0,D1 is presented to DBI 47.

Time frame GP50 calls for the following data transfers:

INC→AB→INC; TIN$\phi$  (10)

DBI→DB→TEMPL  (11)

During data transfer (10) the contents 0,D1 of INC are transferred to the eleven conductors of AB and back to INC. The designation TIN$\phi$ indicates that INCL is inhibited from incrementing during $\phi2$ of the GP50 time frame. Data transfer (11) calls for the contents $91 of DBI to be transferred to DB and into TEMPL.

Time frame GP51 calls for the following data transfers:

INC→AB→INC; TINφ (12)

TEMPL→ABL1 (13)

$\overline{\text{BIT CODE}}$ (1 of 8)→DB (14)

If TEST: $\overline{\text{DB}}$→ADDA; AND (15)

In data transfer (12) the contents 0,D1 of INC are transferred to AB and back to INC. The designation TINφ indicates that INCL is inhibited from incrementing during φ2 of the GP51 time frame. In data transfer (13) the contents $91 of TEMPL are transferred to the eight conductors of ABL1. Data transfer (14) indicates that DB is set to a state wherein each line is high (i.e., a 1) except for the line corresponding to the particular bit being tested (i.e., bit 4). Thus in data transfer (14) DB is set to 11101111 ($EF in hexadecimal notation). Data transfer (15) indicates that if a bit test operation is involved the inverse of the information on DB is transferred to the "A" input of the ALU 28. The inverse of the information $EF on DB is $10. The designation "AND" in data transfer (15) indicates that the information $10 at the "A" input of the ALU is logically ANDed with the information $91 at the "B" input of the ALU 28. The logical result is $10, as indicated in the "SUM" column of FIG. 9.

Time frame GP52 provides the following data transfer operation:

INC→AB→INC (16)

Σ→DB (17)

If TEST: Affect C7F (18)

Data transfer (16) indicates that the contents 0,D1 of INC are transferred to AB and back to INC. Data transfer (17) indicates that the output $10 of the ALU 28 is transferred to DB. Data transfer (18) indicates that since a bit test operation is involved the carry flag C of the CCR 30 is set to the same state as bit 4 in the memory word tested. Since bit 4 was set, the carry flag C is also set, as indicated in the column designated "C7F" in FIG. 9.

Time frame GP53 provides the following data transfer:

PC→AB→INC (19)

Data transfer (19) requires that the contents X, Y+2 of PC be transferred to AB and then to INC. During φ2 of time frame GP53, the data D2 at memory location X, Y+2 is presented to DBI 47, and the content of INCL is incremented by one to the value Y+3.

Since a bit test instruction is being executed, the "TEST" query in decisional box 426 has been fulfilled, and the instruction execution sequence proceeds to time frame BCH0.

Time frame BCH0 provides the following data transfers:

INC→AB→INC, PC (20)

DEC; TINφ (21)

DBI→DB→ADDA (22)

ABL→ABL1→ADDB (23)

TINH if DB7=1 (24)

Data transfer (20) provides for the contents X, Y+3 of INC to be transferred to AB and back to INC as well as to PC. The designation "DEC" in data transfer (21) indicates that both INCH and INCL are to be decremented by one during φ2 of time frame BCH0. However, the designation "TINφ" of time frame (21) indicates that INCL is to be inhibited from decrementing by one during φ2 of time frame BCH0. Thus, only INCH is decremented. Data transfer (22) indicates that the contents D2 of DBI 47 are transferred to DB and from there to the "A" input of ALU 28. Data transfer (23) indicates that the information Y+3 on ABL is transferred to ABL1 and from there to the "B" input of the ALU 28. Implicit in data transfer (23) is a normal summation operation by ALU 28 of the information present at its two inputs, and the resulting sum is Y+3+D2 as indicated in the "SUM" column of FIG. 9. Data transfer (24) indicates that if line 7 of DB is high, then INCH must decremented by one. Since the most significant bit of information D2 is a one in this example, DB7=1, and INCH must decrement by one during φ2 of the BCH0 time frame.

Time frame ID2 provides for the following data transfers:

INC→AB→INC; TINH (25)

ABH→TEMPH (26)

Σ→DB→TEMPL (27)

Data transfer (25) provides for the transfer of the contents X−1, Y+3 of INC to AB and back to INC. The designation "TINH" in data transfer (25) indicates that INCH must increment by one during φ2 of the ID2 time frame regardless of whether INCL overflows. Data transfer (26) provides for the transfer of the information X−1 on the lines of ABH to TEMPH. Data transfer (27) transfers the sum Y+3+D2 to the lines of DB and from there to TEMPL. During φ2 of the ID2 time frame, INCH is incremented by one to X, and INCL is incremented by one to Y+4.

The ID3 time frame provides for the following data transfers:

If BRANCH: TEMPL→ABL1→ABL→INCL (28)

If B7C 1BD=φ: TEMPH→ABH→INCH (29)

Data transfer (28) provides, since a branch operation is involved, that the contents Y+3+D2 of TEMPL be transferred to the conductors of ABL1 and from there to ABL and into INCL. Data transfer (29) provides for a transfer in the event that a bit seven carry (B7C) is generated as a result of the next preceding ALU operation. Let us assume that the magnitude of D2 is such that when it is combined with the contents Y+3 of PC a negative branch into the preceding page X−1 occurs. The summation operation does not generate a "carry" and the sum is in two's complement form. Since no carry was generated (i.e., B7C=0) the contents X−1 of TEMPH is transferred to the conductors of ABH and into INCH. During φ2 of the ID3 time frame the address X−1, Y+3+D2 is used to fetch the contents of the associated memory location in page X−1, which contents represent the next op code.

From time frame ID3 the instruction execution proceeds along line 311 to decisional box 427. Since a branch instruction sequence is present, the instruction execution sequence returns to time frame GT0 via line 428. The processor operation then proceeds with the execution of the next instruction in accordance with the operation set forth in the instruction flow chart associated with the op code of the next instruction.

Detailed Logic Diagram

FIGS. 7A-7EEE constitute individual sections of a preferred embodiment of the microcomputer of the present invention. The individual figures may be fitted together in the manner shown by FIG. 8 to form the complete logic schematic of the microcomputer. Given the logic schematic of FIGS. 7A-7EEE, one of ordinary skill in the art is enabled to implement the microcomputer of the present invention by using existing circuit technology, such as MOSFET (Metal Oxide Semiconductor Field Effect Transistor) technology. A detailed recitation of the interconnections between the logic and circuit elements shown in FIGS. 7A-7EEE would only serve to encumber the description. However, various of the structures shown in block diagram form in FIGS. 1 and 2 will now be highlighted in the detailed logic schematic of FIGS. 7A-7EEE.

Figure 7B:
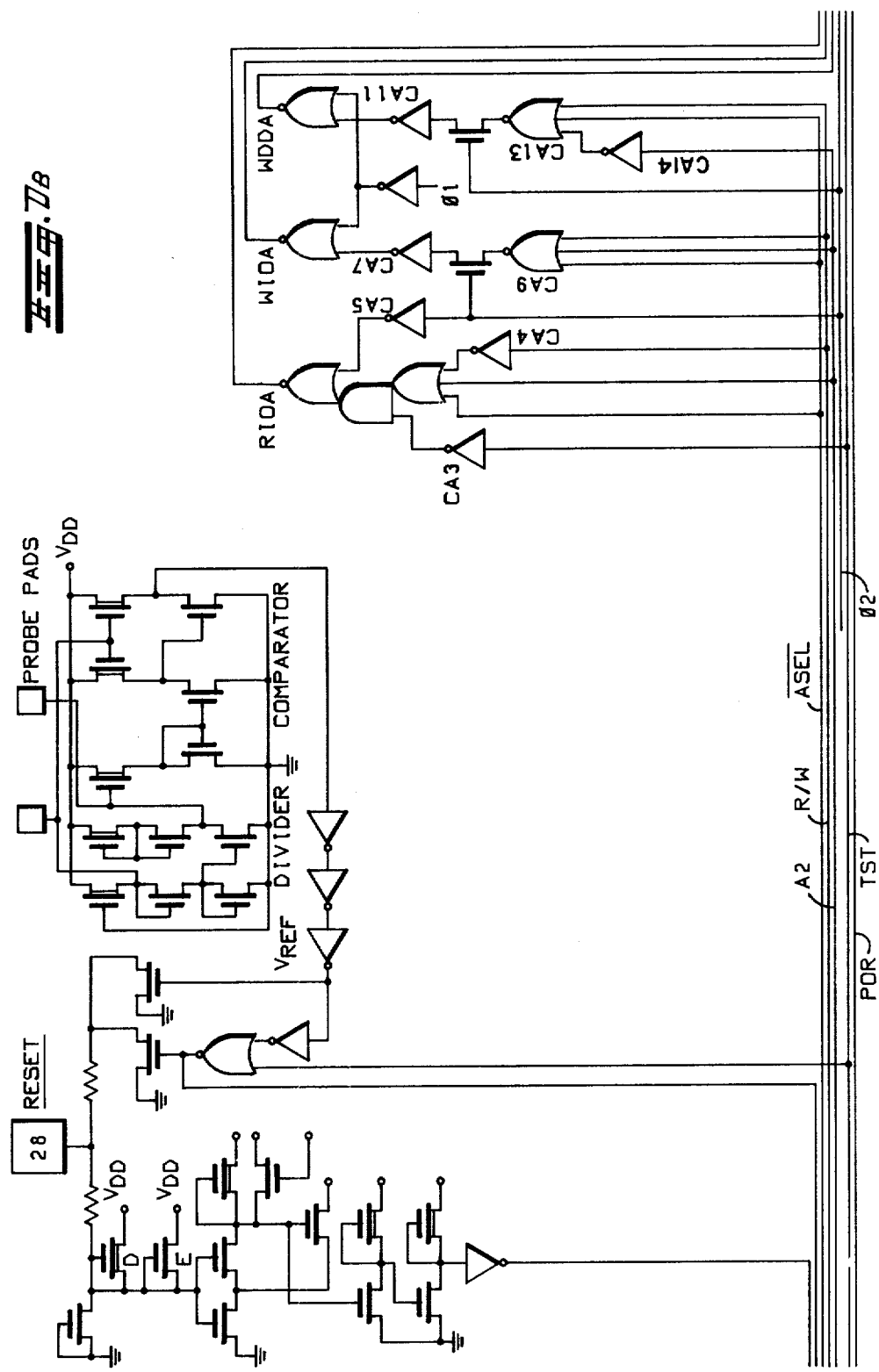
FIGS. 7A–7EEE constitute a detailed logic diagram for the microcomputer of FIG. 1.
Figure 7F:
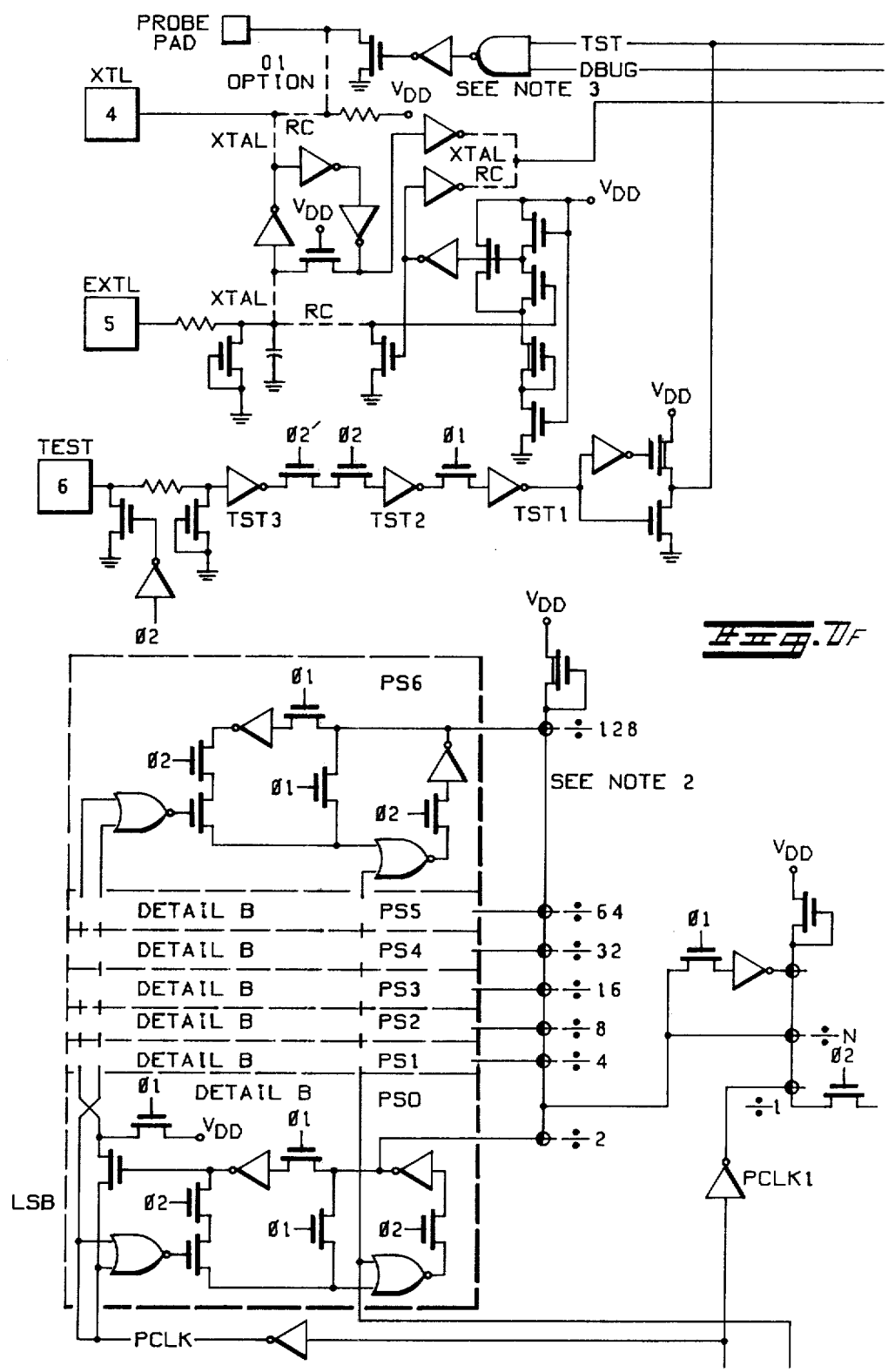
Figure 7O:
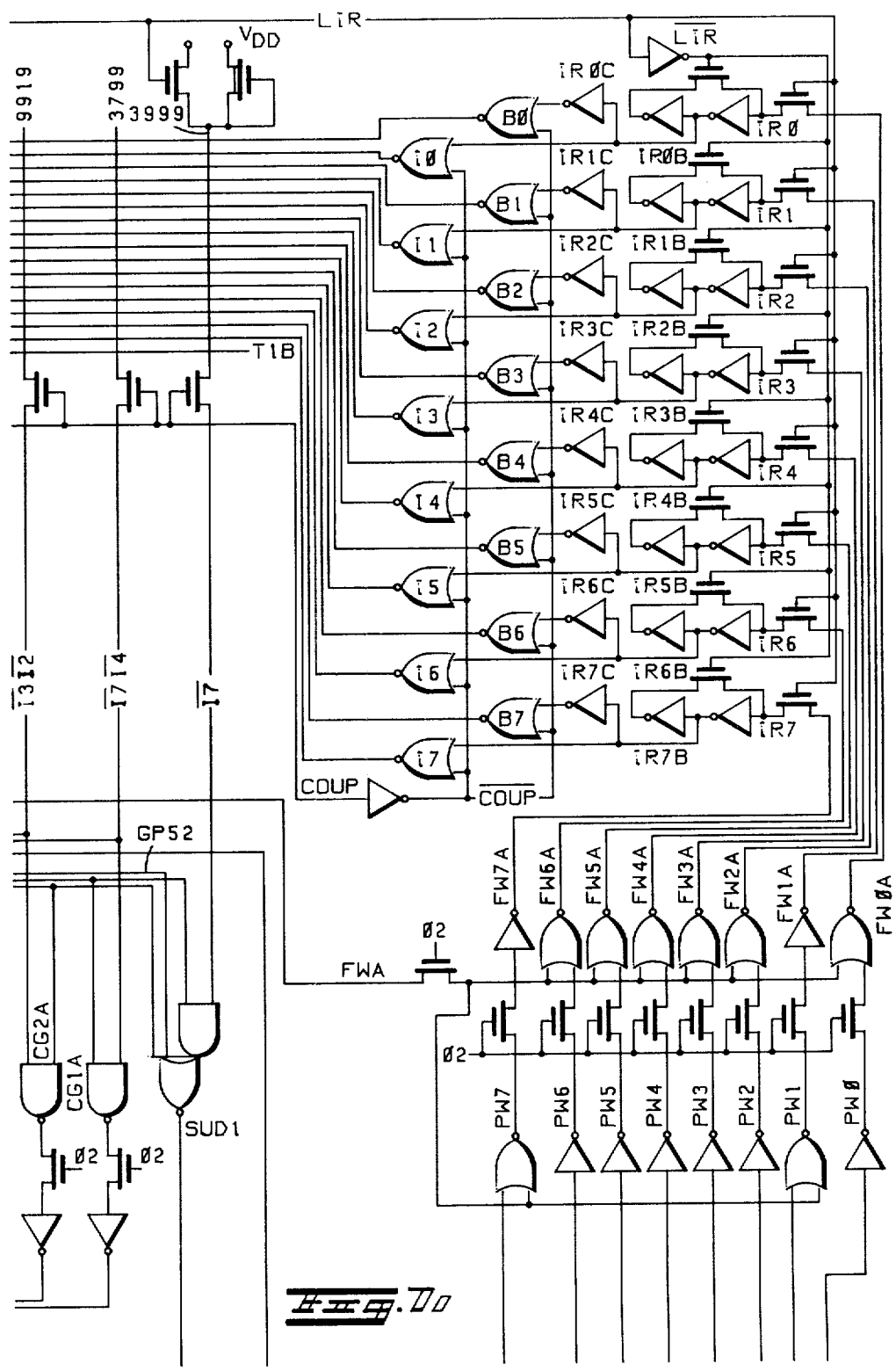
Figure 7R:
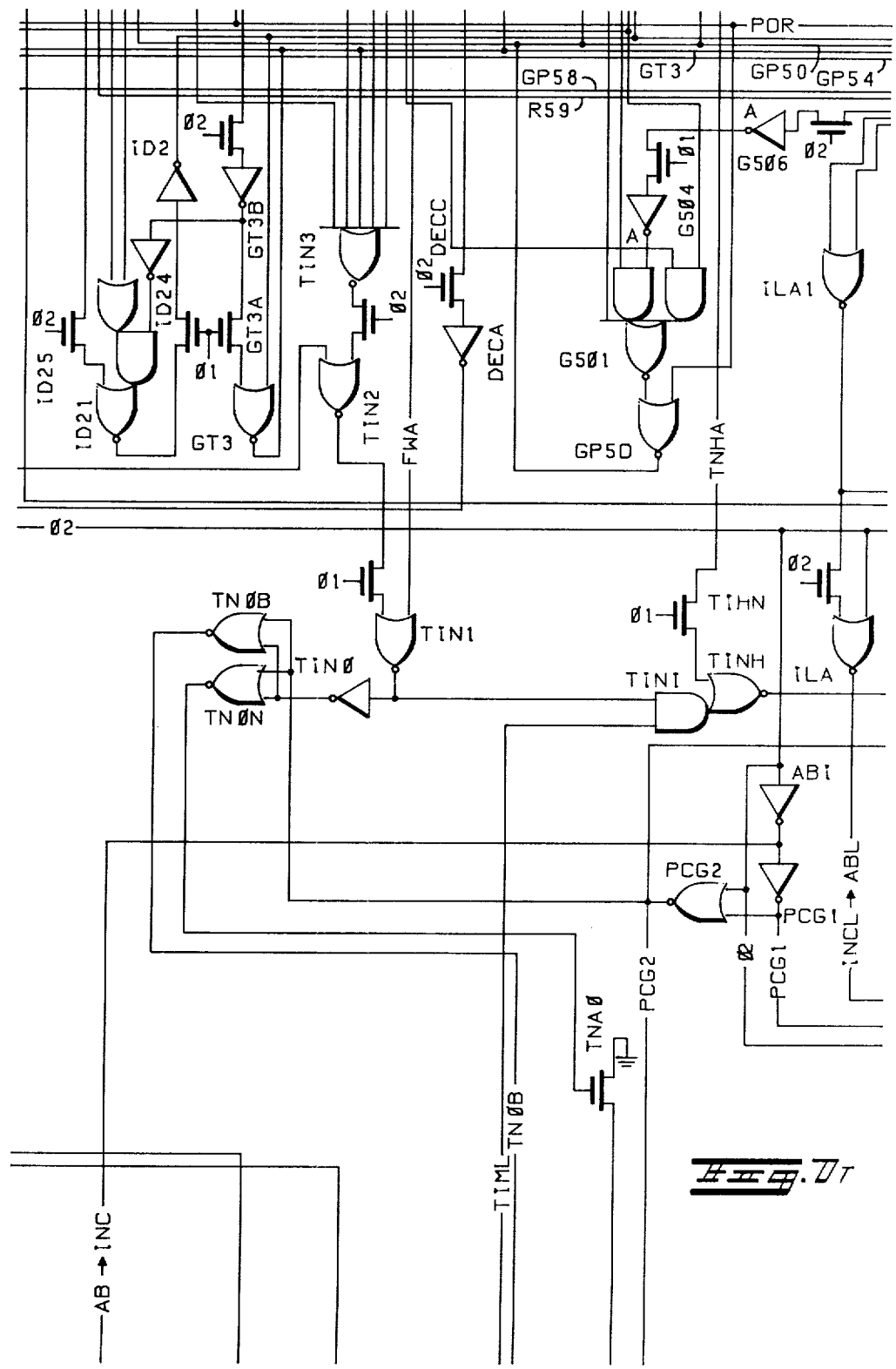
Figure 7W:
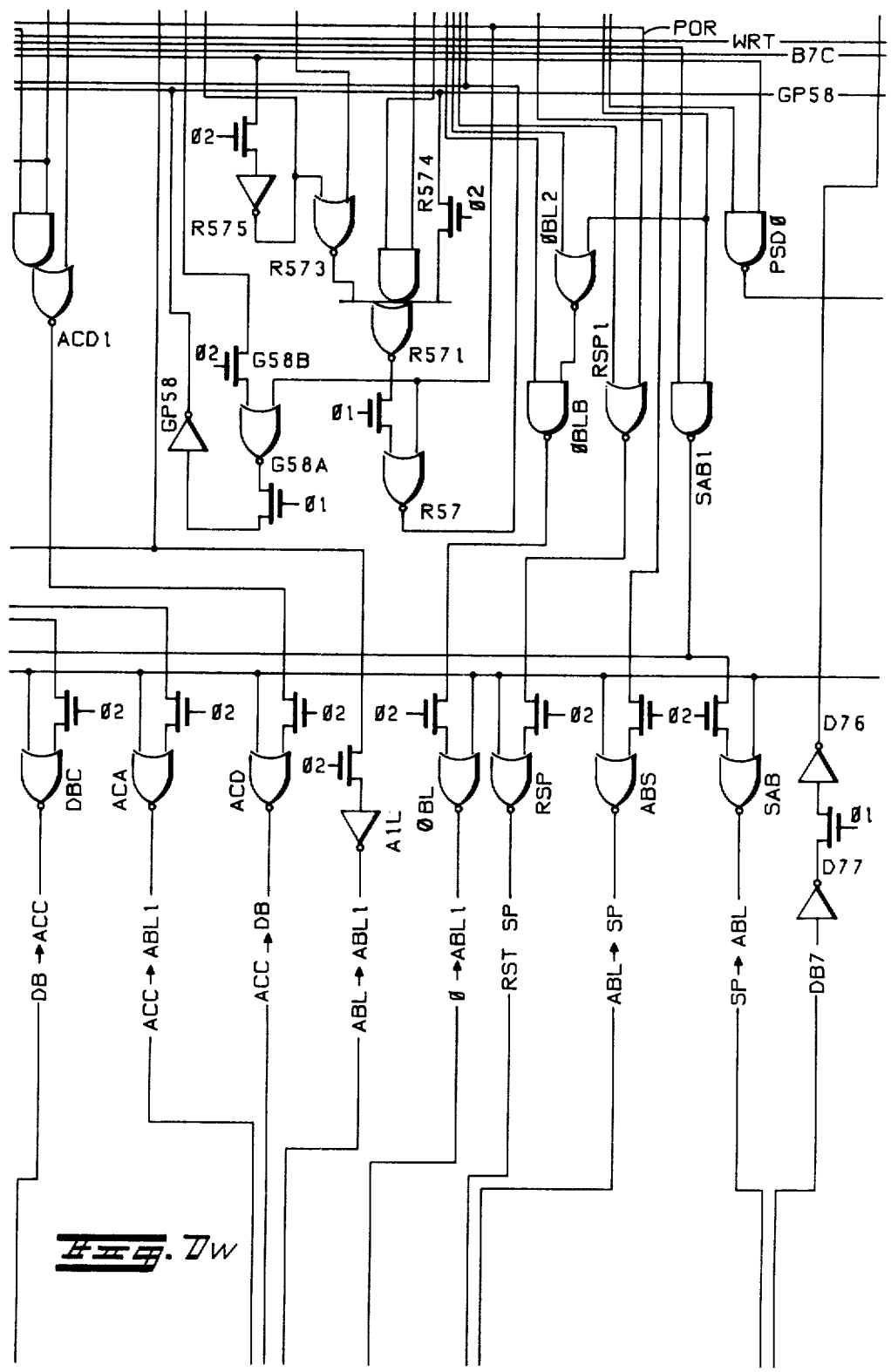
Figure 7A:
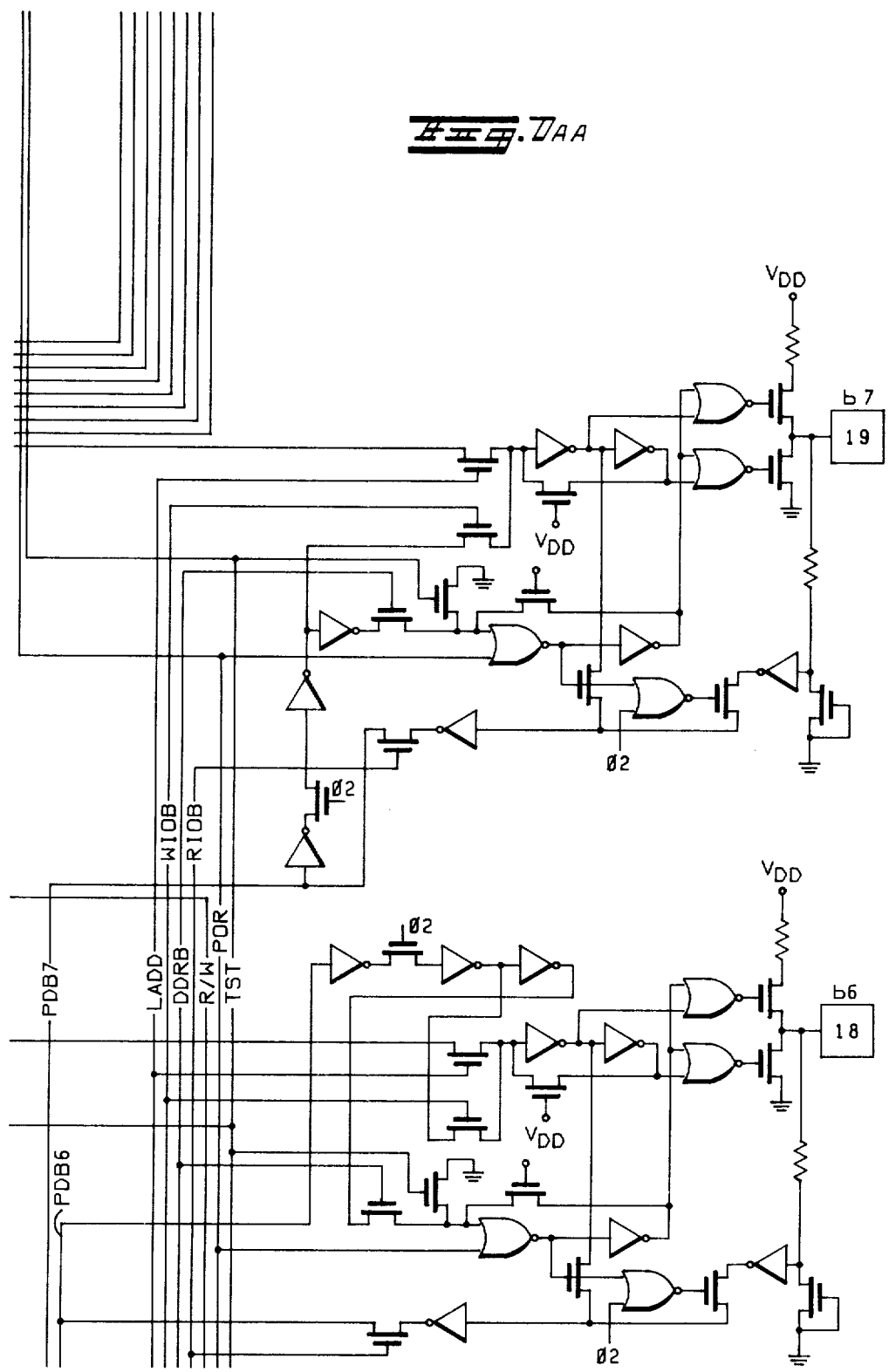
Figure 7C:
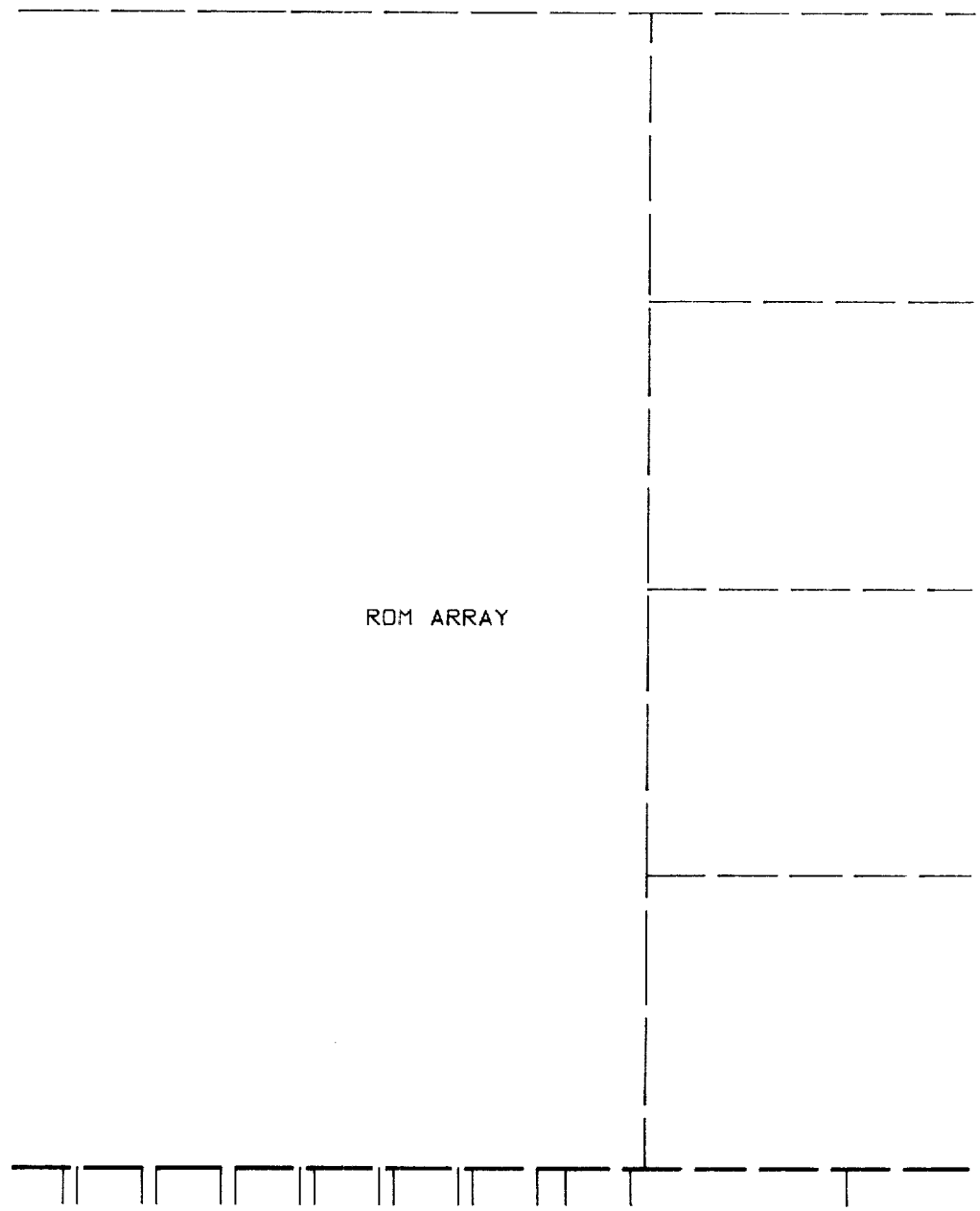

FIG. 7A shows the INT (Interrupt), $V_{SS}$ (ground), and $V_{DD}$ (supply voltage) pads. A portion of the interrupt circuitry is shown in the left-hand portion, and a portion of the reset circuitry is shown in the right-hand portion. It will be understood that lines (not shown) distribute the $V_{SS}$ and $V_{DD}$ signals throughout the microcomputer logic where they are required.

FIG. 7B shows the RESET pad. In the left-hand portion part of the Reset circuitry is shown. In the upper center portion two probe pads are shown which are employed for test purposes. In the right-hand portion is shown part of the Read/Write circuitry.

FIGS. 7C-E and 7P show the I/O pads a0-a7 of Port A and their associated I/O port circuitry. Also shown are the individual conductors IDB0-7 of the internal data bus 195 (FIG. 1).

FIG. 7F shows the XTL, EXTL, and TEST pads, as well as a probe test pad. Also shown in the lower portion is the prescaler 132 (FIG. 1).

FIG. 7G shows in the upper portion part of the φ1 and φ2 clock generation circuitry. It will be understood that the φ1 and φ2 clock signals are distributed throughout the microcomputer logic over lines (not shown) as required.

FIGS. 7H-O and 7S-Z show the instruction decoding and control logic 40, the instruction register 52, and the data bus instruction register (DBIR) buffer 49. I/R 50 and DBIR 49 are shown in FIG. 7-O. The instruction decoder control logic shown in FIGS. 7H-O and 7S-Z generates and transmits the various internal timing signals to the microcomputer registers, buses, buffers, memories, and other logic as required to control the operation of the microcomputer. It should be noted that the various timing control signals are indicated which appear in the small boxes in the lower right-hand corner of each φ1 time frame in the instruction flow chart of FIG. 5. Bit I of CCR 30 is shown in FIG. 7X, and bits N, Z, H, and C are shown in FIG. 7Y.

FIG. 7Q shows the TIMER pad and I/O pads c0-3 associated with Port C 160 (FIG. 1). Also shown is the I/O port circuitry associated with I/O pads c0-3.

FIGS. 7AA, MM, and WW-YY show the I/O pads b0-7 associated with Port B 150 (FIG. 1) as well as the corresponding I/O port circuitry. In FIG. 7XX the individual conductors PDB0-7 of the peripheral data bus 190 are labelled.

FIGS. 7BBB, CCC, DDD, and EEE show various of the conductors employed to convey information and control signals between the various components of the microcomputer.

FIGS. 7BB-DD, NN, OO, ZZ and AAA show the ROM array 120 (FIG. 1). FIG. 7-OO shows the word select circuitry in detail "D". FIG. 7-OO also shows sample ROM bits and a detail of same in the lower left-hand portion thereof. As shown, detail "D" of FIG. 7-OO is replicated in FIGS. 7DD and 7AAA.

FIG. 7EE shows the output buffer low (OBL 32, FIG. 1) circuitry in the right-hand portion thereof.

FIG. 7FF shows the low-order portion INCL of the incrementer.

FIG. 7GG shows the low-order portion PCL of the program counter.

Figure 7H:
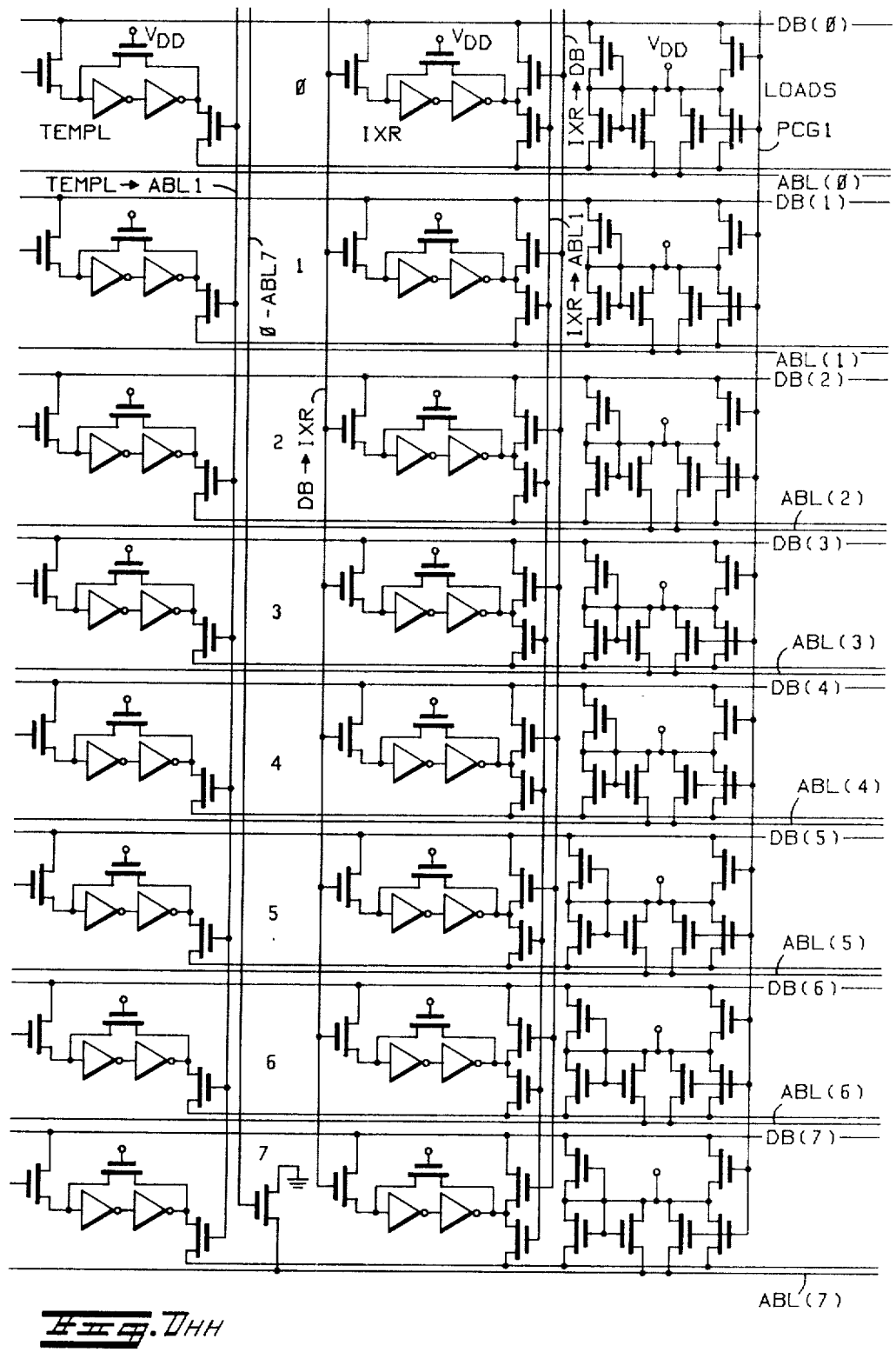

FIG. 7HH shows the low-order portion TEMPL of the temporary register and the index register IXR.

FIG. 7II shows the accumulator ACC and the stack pointer SP.

Figure 7J:
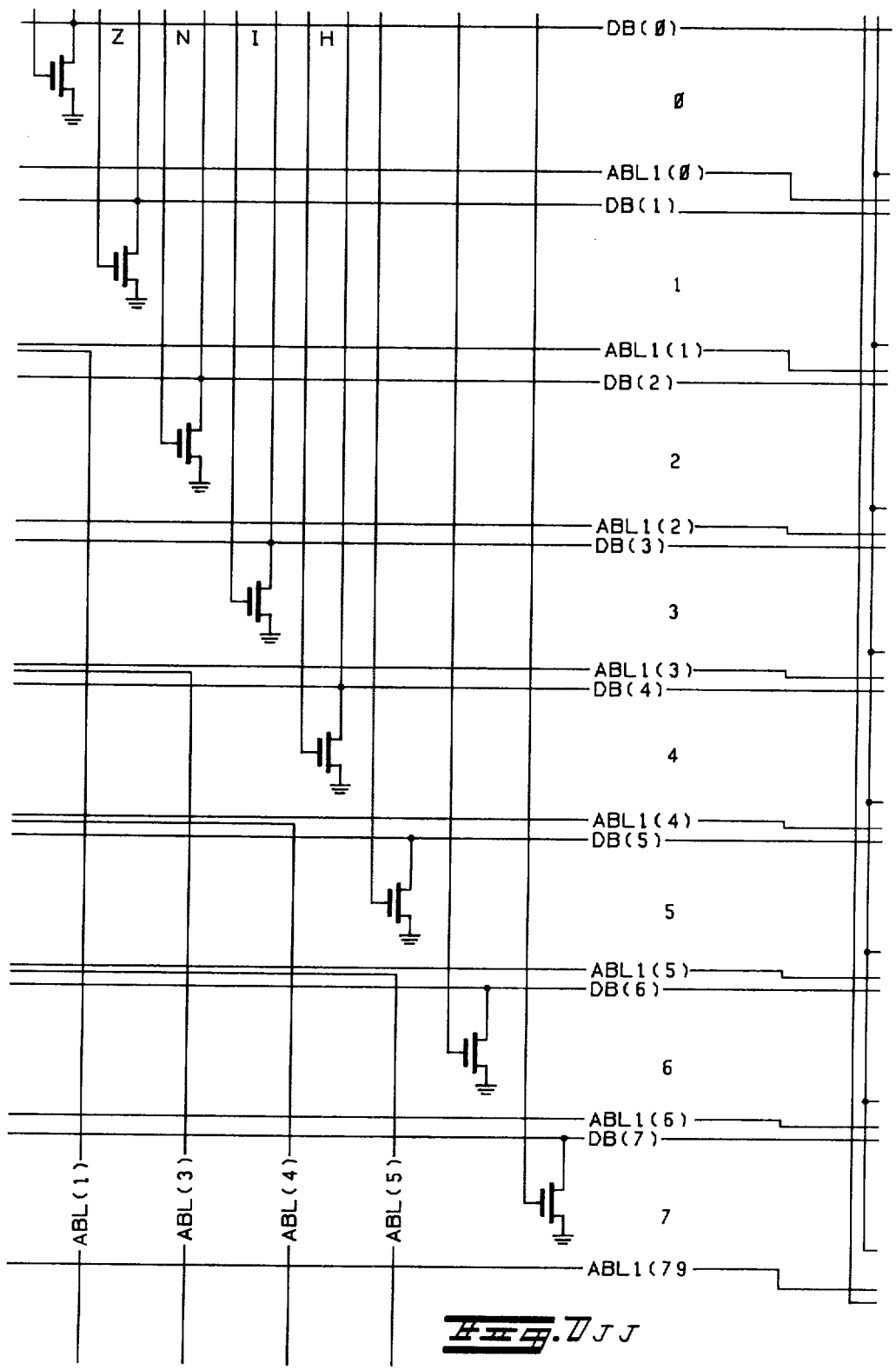
Figure 7N:
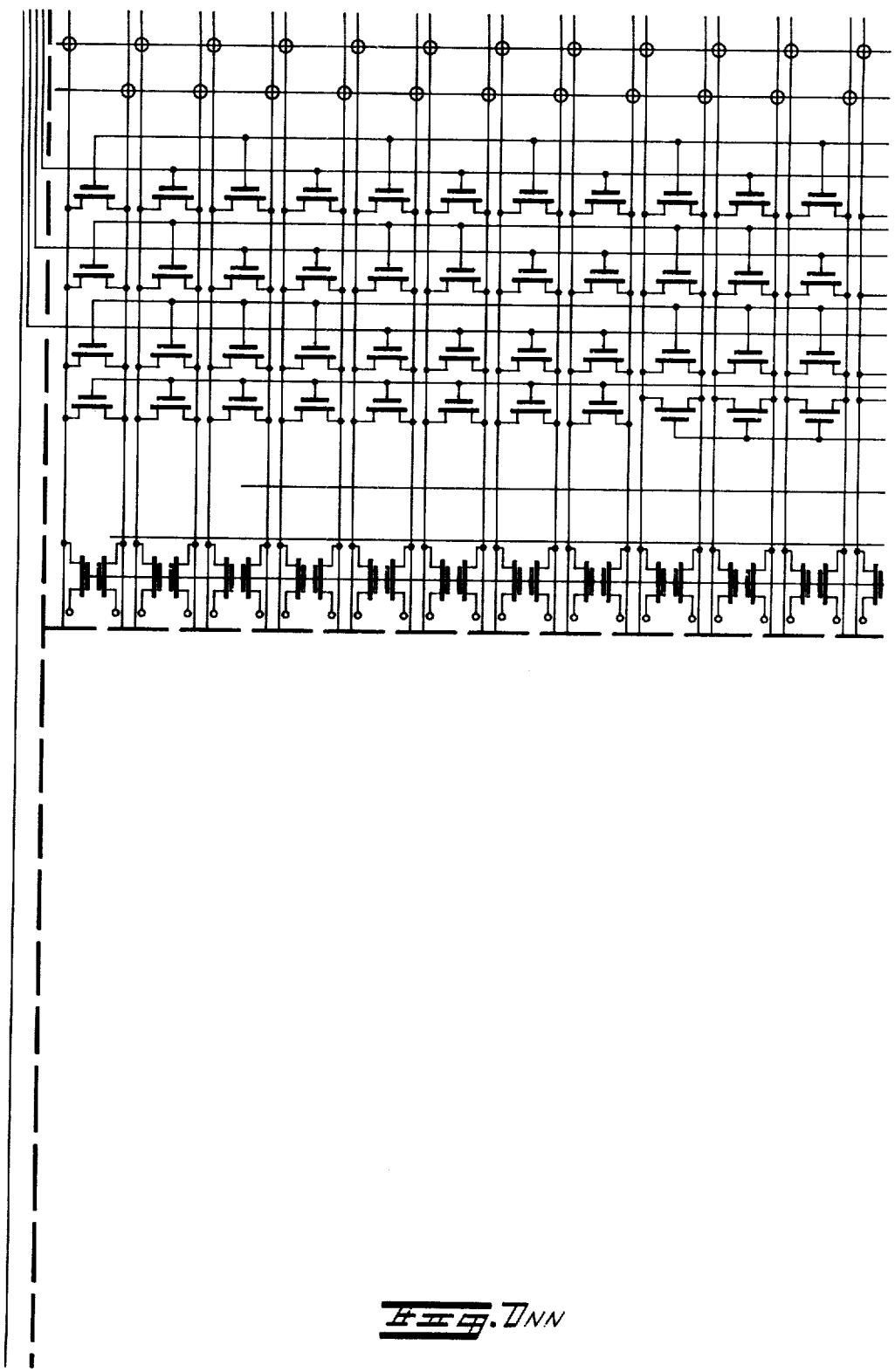
Figure 7O:
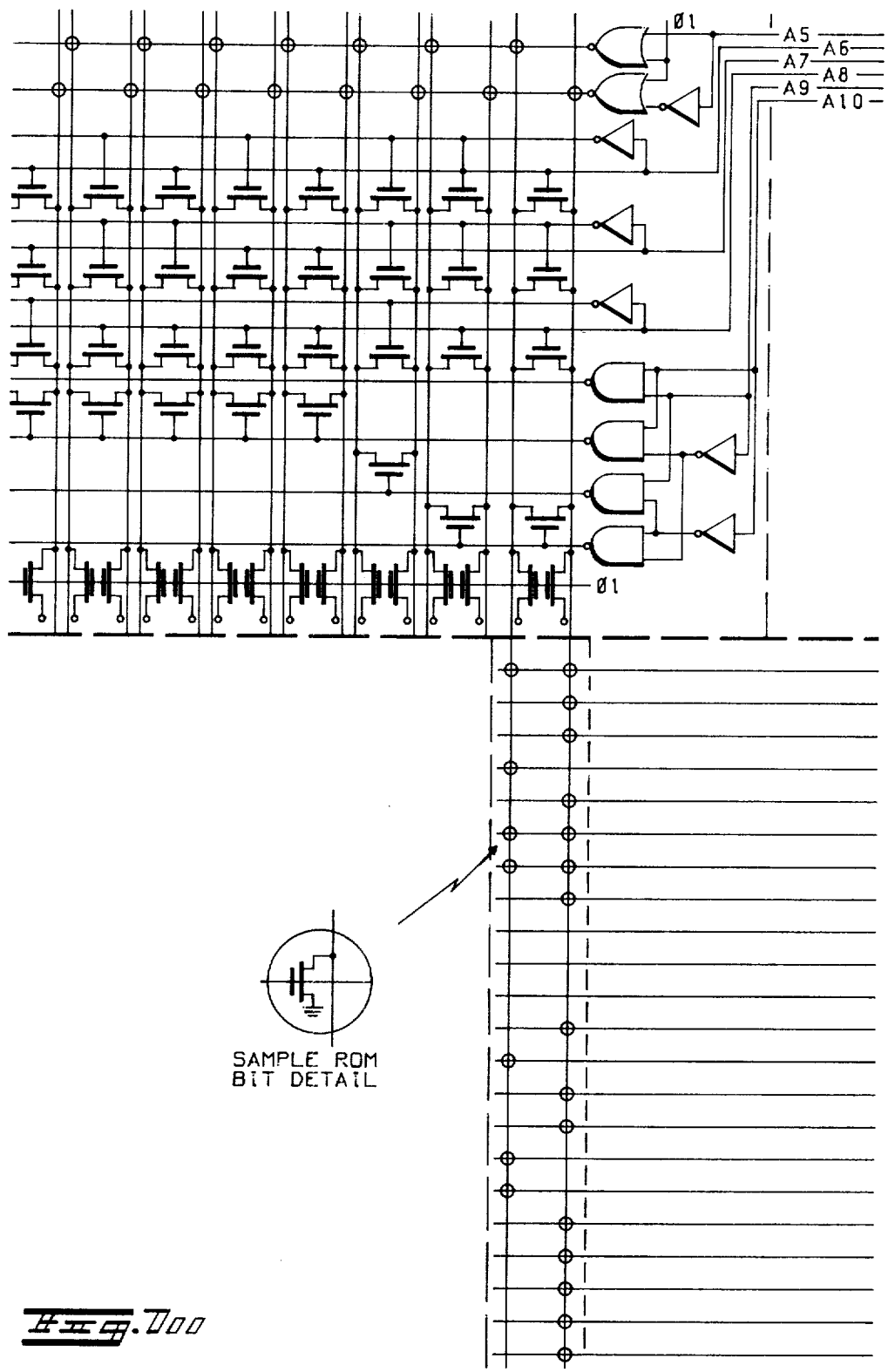
Figure 777:
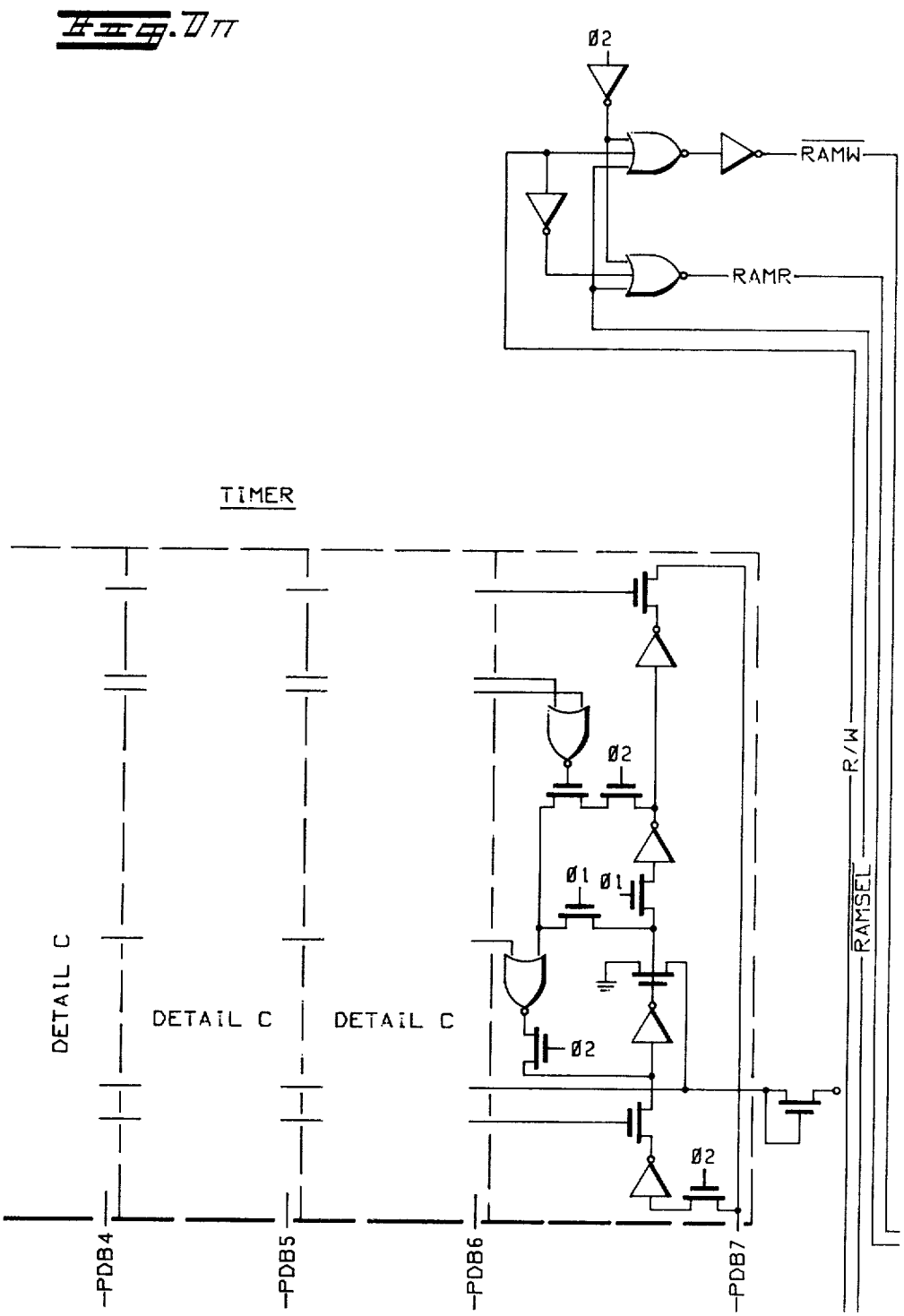
Figure 7W:
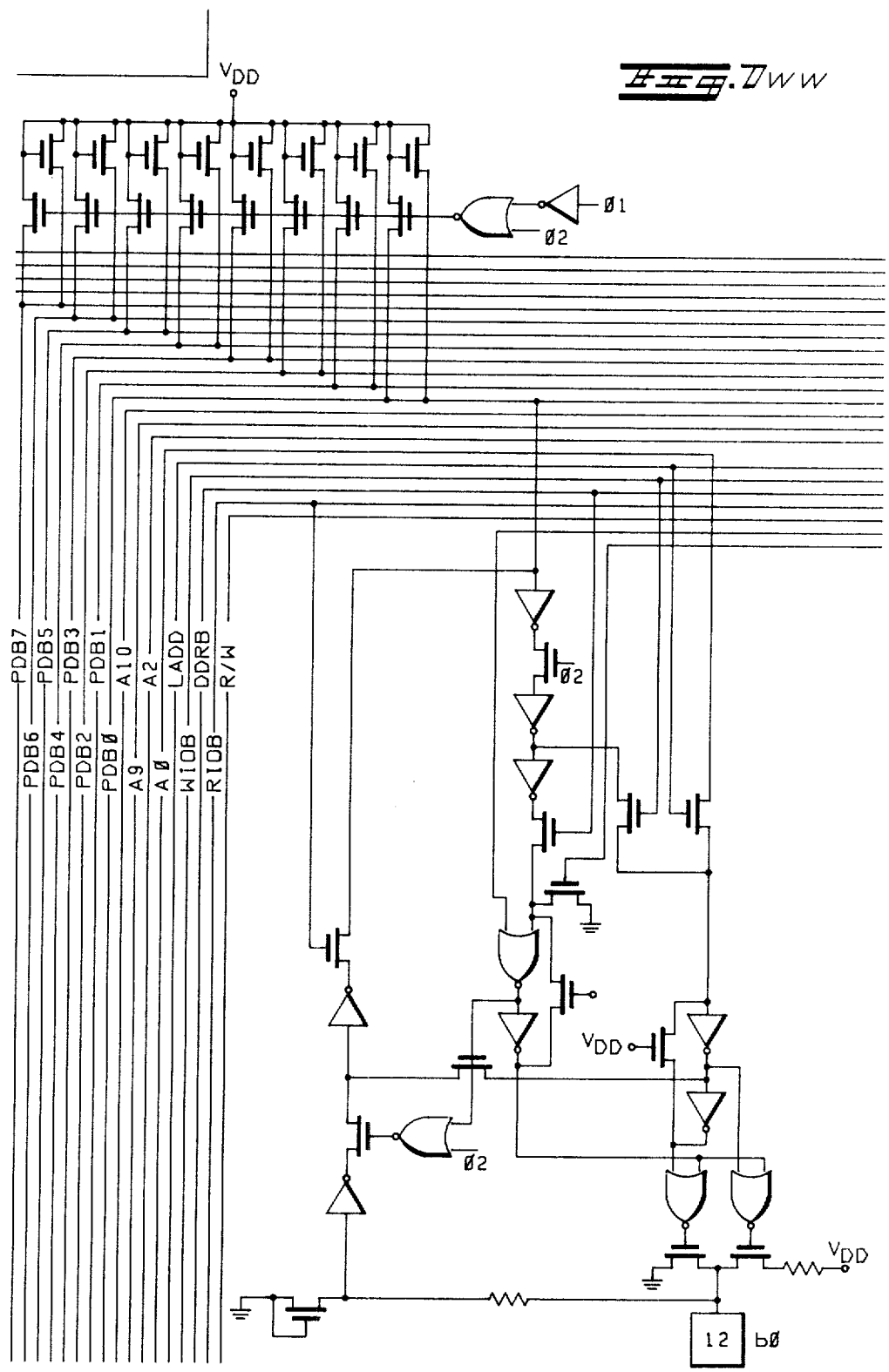
Figure 7X:
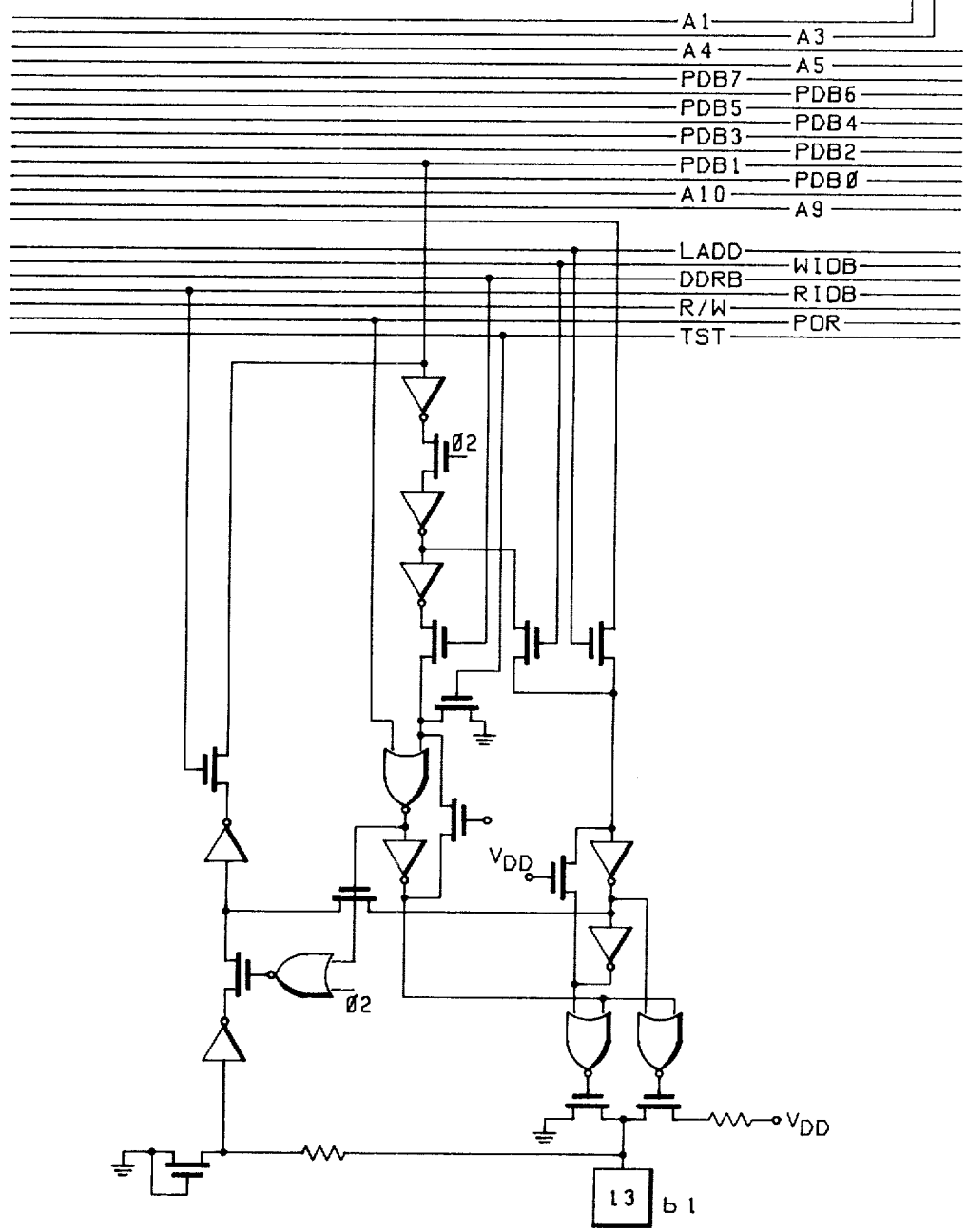
Figure 7Z:
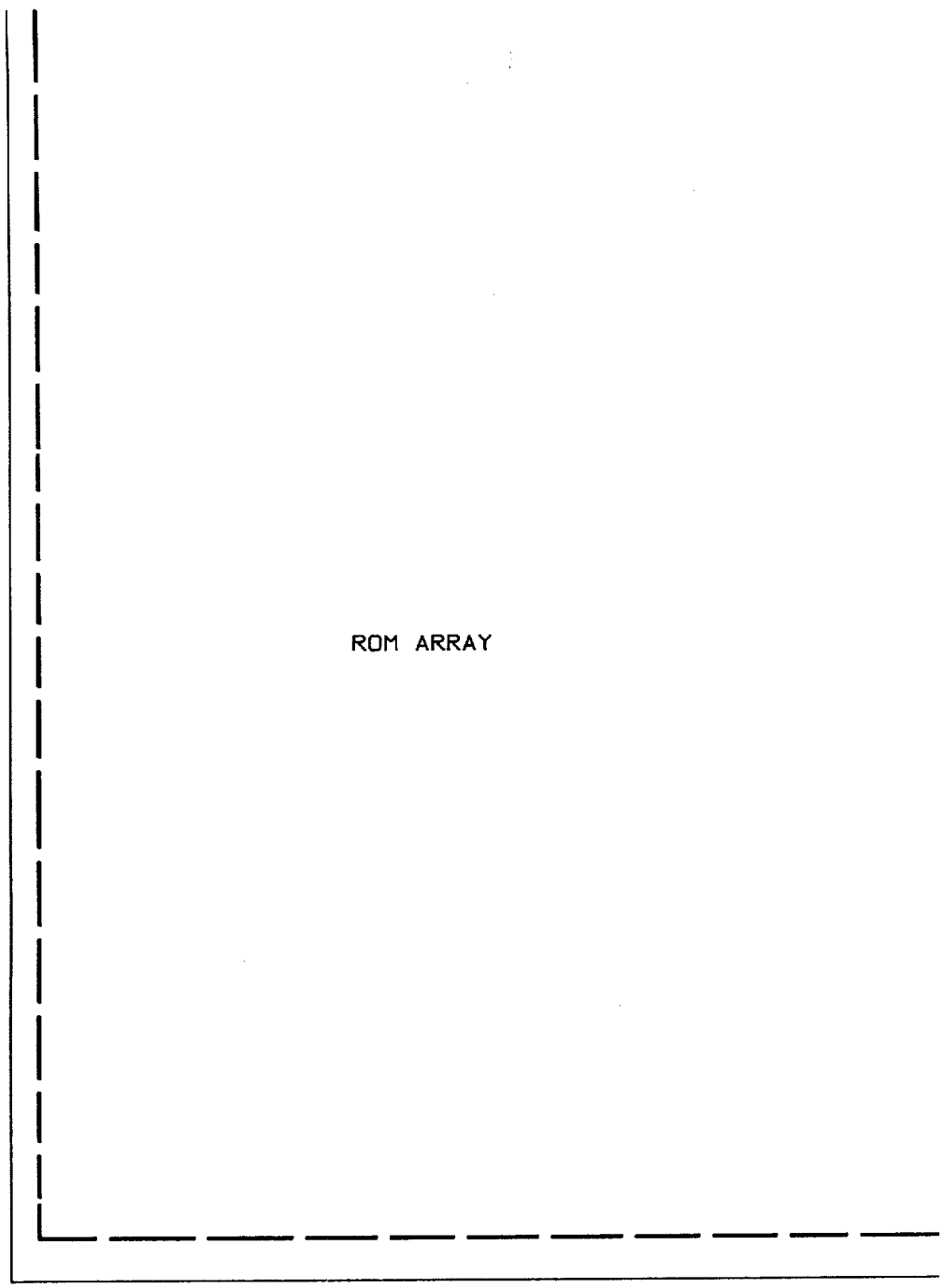
Figure 70D:
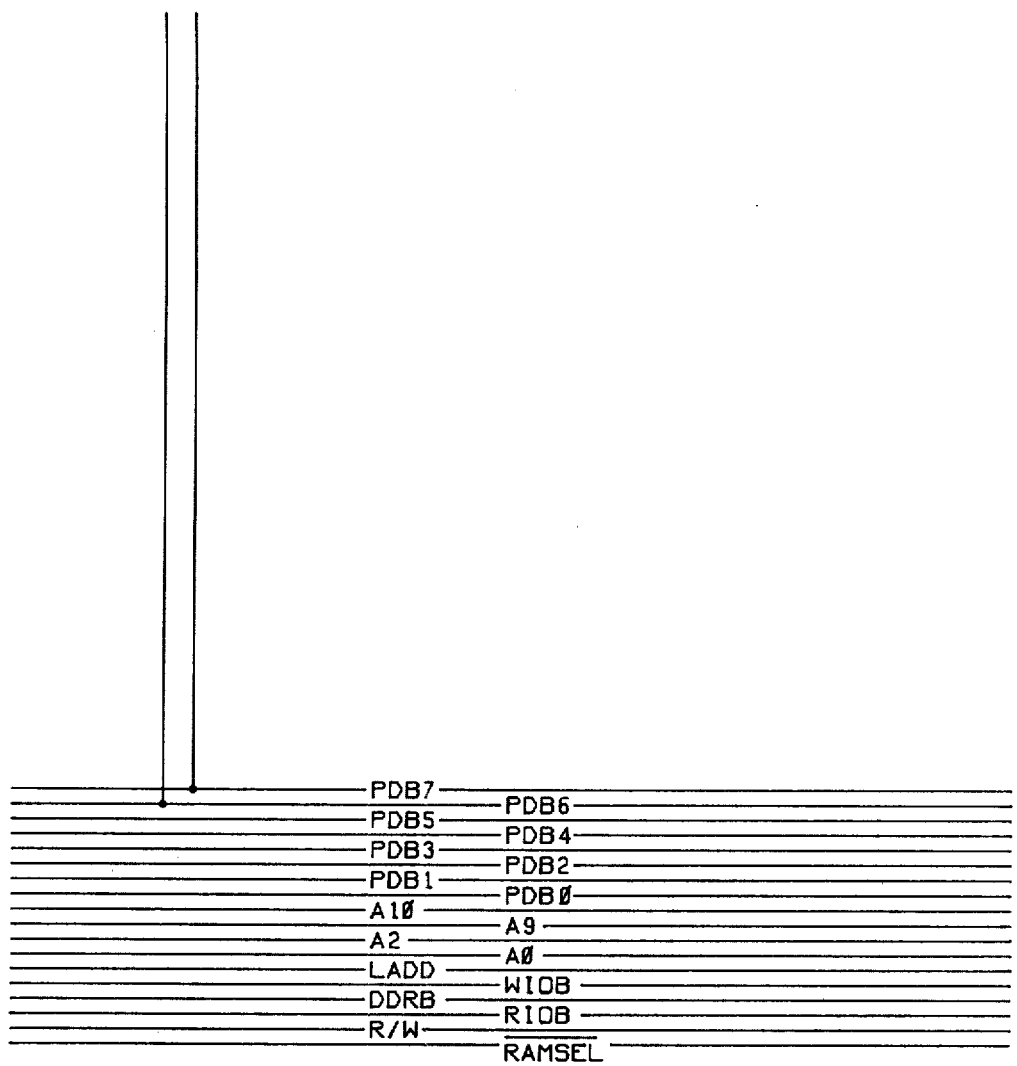

FIG. 7JJ shows some of the internal data, address, and control conductors of the microcomputer.

FIGS. 7KK and 7LL show the arithmetic logic unit (ALU 28, FIG. 2).

FIG. 7PP shows some of the internal conductors as well as a portion of the ROM selection circuitry in the center portion thereof.

FIG. 7QQ shows the high-order portion INCH of the incrementer in the right-hand portion and the output buffer high (OBH 31, FIG. 2) in the left-hand portion.

FIG. 7SS shows the high-order portion PCH of the program counter and the high-order portion TEMPH of the temporary register.

FIG. 7RR shows the timer control in the upper portion and the control circuitry for Port B in the lower portion.

FIG. 7TT shows the timer circuitry. The portion identified as detail "C" is replicated as shown.

FIGS. 7UU and 7VV show the random address memory (RAM 110, FIG. 1). The detailed logic of the sense amp is provided by detail "A" in the upper portion of FIG. 7UU and is replicated through FIG. 7UU and 7VV as indicated.

It will be apparent to those skilled in the art that the disclosed Microcomputer With Branch On Bit Set/Clear Instructions may be modified in numerous ways and may assume many embodiments other than that specifically set out and described above. Accordingly, it is intended by the appended claims to cover all modifications of the invention which fall within the true spirit and scope of the invention.

TABLE 1

| REGISTER/MEMORY INSTRUCTIONS | | BRANCH INSTRUCTIONS | |
|---|---|---|---|
| ADC | Add Memory and Carry to Accumulator | BRA | Branch Always |

TABLE 1-continued

| | | | |
|---|---|---|---|
| ADD | Add Memory to Accumulator | BCC | Branch if Carry Clear (Same as BHS) |
| AND | And Memory to Accumulator | BCS | Branch if Carry Set (Same as BLO) |
| BIT | Bit Test Memory with Accumulator | BEQ | Branch if Equal |
| CMP | Compare Accumulator with Memory | BHCC | Branch if Half Carry Clear |
| CPX | Compare Index Register with Memory | BHCS | Branch if Half Carry Set |
| EOR | Exclusive or Memory with Accumulator | BHI | Branch if Higher |
| JMP | Jump Absolute | BHS | Branch if Higher or Same (Same as BCC) |
| JSR | Jump to Subroutine | BIH | Branch if Interrupt Line is HIGH |
| LDA | Load Accumulator from Memory | BIL | Branch if Interrupt Line is Low |
| LDX | Load Index Register from Memory | BLO | Branch if Lower (Same as BCS) |
| ORA | Or Memory with Accumulator | BLS | Branch if Lower or Same |
| SBC | Subtract Memory and Borrow from Accumulator | BMC | Branch if Interrupt Mask is Clear |
| STA | Store Accumulator in Memory | BMI | Branch if Minus |
| STX | Store Index Register in Memory | BMS | Branch if Interrupt Mask is Set |
| SUB | Subtract Memory from Accumulator | BNE | Branch if Not Equal |
| | | BPL | Branch if Plus |
| | | BSR | Branch to Subroutine |
| READ/MODIFY/WRITE INSTRUCTIONS | | CONTROL INSTRUCTIONS | |
| ASL | Arithmetic Shift Left (Same as LSL) | CLC | Clear Carry Bit |
| ASR | Arithmetic Shift Right | CLI | Clear Interrupt Mask Bit |
| CLR | Clear | NOP | No-Operation |
| COM | Complement | RSP | Reset Stack Pointer |
| DEC | Decrement | RTI | Return from Interrupt |
| INC | Increment | RTS | Return from Subroutine |
| LSL | Logical Shift Left (Same as ASL) | SEC | Set Carry Bit |
| LSR | Logical Shift Right | SEI | Set Interrupt Mask Bit |
| NEG | Negate | SWI | Software Interrupt |
| ROL | Rotate Left thru Carry | TAX | Transfer Accumulator to Index Register |
| ROR | Rotate Right thru Carry | TXA | Transfer Index Register to Accumulator |
| TST | Test for Negative or Zero | | |
| BIT MANIPULATION INSTRUCTIONS | | | |
| BCLR | Bit Clear Bit n in Memory | | |
| BRCLR | Branch if Bit n is Clear in Memory | | |
| BRSET | Branch if Bit n is Set in Memory | | |
| BSET | Bit Set Bit n in Memory | | |

We claim:

1. In a data processing system comprising a memory having a plurality of storage locations for storing data and instructions and a processor for executing such instructions, a method of executing a conditional branch instruction, said instruction comprising an op code and a bit number, a first address portion designating a first storage location in said memory, and a second address portion designating a second storage location in said memory, said method comprising the steps of:
fetching the data stored in said first storage location using said first address portion of said instruction;
testing the state of the bit in the data fetched from said first storage location corresponding to said bit number; and
branching to said second storage location using said second address portion of said instruction if said bit is in a predetermined state.

2. In a data processing system comprising a memory for storing data and instructions in a plurality of storage locations therein, and a processor for executing instructions in said memory addressed by a program counter portion thereof, a method of executing a conditional branch instruction, said instruction comprising an op code, a bit number, an address portion designating a first storage location in said memory, and an offset, said method comprising the steps of:
fetching the data stored in said first storage location using the address portion of said instruction;
testing the state of the bit in the data fetched from said first storage location corresponding to said bit number;
combining said offset with the contents of said processor program counter to provide a branch address; and
branching to a second storage location using said branch address if said bit is in a predetermined state.

3. The method of executing a conditional branch instruction as recited in claims 1 or 2, wherein said memory includes a storage location for storing information relating to the operation of at least one I/O device coupled to said data processing system.

4. The method of executing a conditional branch instruction as recited in claims 1 or 2, wherein said memory includes a random access memory.

5. The method of executing a conditional branch instruction as recited in claims 1 or 2, wherein said memory includes a read only memory.

6. The method of executing a conditional branch instruction as recited in claims 1 or 2, wherein said branching step is performed only if said bit is set.

7. The method of executing a conditional branch instruction as recited in claims 1 or 2, wherein said branching step is performed only if said bit is clear.

8. The method of executing a conditional branch instruction as recited in claims 1 or 2, wherein said data processing system is a microcomputer.

9. In a data processing system comprising a memory having a plurality of storage locations for storing data and instructions and a processor for executing such instructions, said processor including a program counter, an instruction decoding and control unit, and an arithmetic logic unit, the improvement wherein said memory includes a first storage location for storing a conditional branch instruction, said conditional branch instruction comprising an op code and a bit number, a first portion designating a second storage location in said memory, and a second portion designating an offset, wherein said instruction decoding and control unit, responsive to said op code and said first portion of said conditional branch instruction, locates said second storage location, wherein said arithmetic logic unit, responsive to said bit number, provides a control signal if the bit in said second storage location corresponding to said bit number is in a predetermined state, and wherein said arithmetic logic unit, responsive to said control signal, combines said offset with the contents of said program counter to provide a memory address, whereby if said bit is in said predetermined state a branch is made to the location in said memory specified by said memory address.

10. The data processing system as recited in claim 9, wherein said data processing system is a microcomputer.

11. In a data processing system comprising a single-chip integrated circuit microcomputer including a memory having a plurality of storage locations for storing data and instructions and a processor for executing such instructions, said processor including a program counter, an instruction decoding and control unit, and an arithmetic logic unit, the improvement wherein said memory includes a first storage location for storing a conditional branch instruction, said conditional branch instruction comprising an op code and a bit number, a first portion designating a second storage location in said memory, and a second portion designating an offset, wherein said instruction decoding and control unit, responsive to said op code and said first portion of said conditional branch instruction, locates said second storage location, wherein said arithmetic logic unit, responsive to said bit number, provides a control signal if the bit in said second storage location corresponding to said bit number is in a predetermined state, and wherein said arithmetic logic unit, responsive to said control signal, combines said offset with the contents of said program counter to provide a memory address, whereby if said bit is in said predetermined state, a branch is made to the location in said memory specified by said memory address.

12. The data processing system as recited in claims 9 or 11, wherein said memory includes a storage location for storing information relating to the operation of at least one I/O device coupled to said data processing system.

13. The data processing system as recited in claims 9 or 11, wherein said memory includes a random access memory.

14. The data processing system as recited in claims 9 or 11, wherein said memory includes a read only memory.

* * * * *